United States Patent [19]

Blackborow et al.

[11] Patent Number: 5,065,262

[45] Date of Patent: Nov. 12, 1991

[54] REMOVABLE AND TRANSPORTABLE HARD DISK SUBSYSTEM

[75] Inventors: Richard J. Blackborow, Cupertino; Peter S. Hahn, Fremont; Claude E. Camp, Milpitas; Donald C. Westwood, Cupertino; Rodica Florea, San Jose; Eric J. Botto, Palo Alto; Scott E. Richmond, San Jose; David B. Jeppson, Sunnyvale, all of Calif.

[73] Assignee: Quantum Corporation, Milpitas, Calif.

[21] Appl. No.: 585,949

[22] Filed: Sep. 21, 1990

Related U.S. Application Data

[62] Division of Ser. No. 278,006, Nov. 30, 1988.

[51] Int. Cl.[5] ........................ G11B 21/02; G06F 13/00

[52] U.S. Cl. .................................... 360/75; 360/77.03; 360/77.08; 360/98.04; 360/98.05; 395/425

[58] Field of Search ... 360/69, 75, 77.02, 77.03–77.11, 360/78.04–78.14, 97.01, 97.03, 98.01–98.06, 99.06, 99.07, 133, 137; 364/708, 200, 900

[56] References Cited

U.S. PATENT DOCUMENTS 4,979,054 12/1990 McCullough et al. ............... 360/48

*Primary Examiner*—Aristotelis Psitos
*Assistant Examiner*—Steven R. Garland
*Attorney, Agent, or Firm*—David B. Harrison

[57] ABSTRACT

A removable and transportable hard disk subsystem is provided for use with at least one computer and includes at least one hard disk module. The module contains a shock mounted, thin and compact micro-Winchester head and disk assembly which plugs into a base housing which is installable entirely within a well of the computer nominally allotted to receive a 5¼ inch half height disk drive. The base housing includes a head positioning and data module loading/unloading portion of the subsystem control electronics and an electromechanical mechanism for automatically loading and unloading the hard disk module. The base housing provides electrical connections for operating the head and disk assembly when loaded therein. The subsystem further includes an adapter board having a host interface portion of the subsystem control electronics and connected by a cable with the control electronics portion of the base housing, the adapter board for connecting the subsystem directly to address, data and control buses of said computer to enable storage and retrieval in the loaded module of host computer data blocks.

21 Claims, 13 Drawing Sheets

COMMAND ROUTINE
400

RECEIVE COMMAND 422

EXECUTE COMMAND
448

RECEIVE DATA BYTE 466

SEND DATA BYTE 468

REMOVABLE AND TRANSPORTABLE HARD DISK SUBSYSTEM

This is a division of application Ser. No. 07/278,006, filed 11/30/88.

FIELD OF THE INVENTION

The present invention relates to rotating disk data storage devices for computer equipment. More particularly, the present invention relates to an improved hard-disk-based data mass storage subsystem for a small computer system, such as a personal computer, including at least one removable and transportable ruggedized hard disk module.

BACKGROUND OF THE INVENTION

Many data processing and computing environments require that user data be kept securely away from those who should not know, or might otherwise misuse such data. Such sensitive information might relate to national security, consumer creditworthiness, or the grades to be given to high school students. Doctors and lawyers need to secure their files from those who might otherwise seek access to privileged information.

At the same time, there is a continuing need on the part of computer users to have access to vast quantities of stored information on a random access basis and at very high access speeds. While removable floppy disks provide random access to stored user data, such disks provide access relatively slowly. With much faster access and greater storage capacities than floppies, Winchester fixed disk drive storage systems have come into widespread within computing environments, including small, portable single user workstations and personal computer systems.

Physically small computer systems are proliferating throughout all walks of life, and such systems are being applied to a virtually unlimited variety of tasks and within untold environments. These small, often portable computing systems have evolved into a generally standard variety of sizes and shapes, and have come to recognize as a "form factor" standard the height, width and depth constraints of the ubiquitous 5¼ inch "half height" floppy disk drive. The front panel recess (called a "disk drive bay") formed within these small computers is uniformly sized and configured to receive the full height or more recently the half height floppy disk drive. Typical dimensions for a 5¼ inch diameter, half height disk drive, whether floppy or hard, are 5¾ inches wide, 1⅝ inches high, and 8 inches deep.

One recognized drawback of small computing systems is the relative difficulty in securing all of the data stored and used in conjunction with such small systems. This difficulty has required that the premises containing the system be secured against all intrusion. Such is not practical in large office buildings where janatorial workers and maintenance personnel require access during evening and weekend hours when the office is closed.

While some smaller data bases and files may be contained on and used with one or a few floppy disks which may be removed from the computer and placed in a safe at night, most present computer programs and related applications files are so large as not to fit within the capacity of the floppy disk. It is very time consuming to transfer large files from large capacity hard disk drives to a number of floppy disks, and then erase the large files from the hard disks, merely to secure the data at the end of each work day, and then to reload the large files from floppy disks in order to begin work the next day. Also, it is not efficient to lock the entire computer within a safe at night.

Another heretofore unsolved need has been to provide a convenient way to enable a personally configured hard disk based operating environment to accompany the user from computer to computer, including providing an operating system bridge, from such operating systems as DOS to O/S 2 and back, and from such computing systems as the IBM Personal Computer AT to and from the IBM Personal Computer P/S 2, for example.

Thus, a need has arisen for a practical way to provide the storage capacity and fast data access and transfer rates of a compact, ruggedized hard disk drive subsystem with the portability and securability of a floppy disk in a "form factor" not any larger than occupied by the standard half height floppy disk drive form.

The assignee of the present invention has pioneered the introduction and widespread market acceptance of the micro-Winchester disk-on-a-card concept, sold under the HARDCARD trademark, and has patented that concept in U.S. Pat. No. 4,639,863. Modular unitary disk file subsystems as taught in that patent have worked very well as data transporters, i.e., they may be readily installed and removed and placed in a safe by the user at night, for example, without need for special tools or any cabling whatsoever. IBM proposed a similar modular plug-in floppy disk drive subsystem in an article entitled "Diskette Drive Single Connector Low Power Interface" appearing in the *IBM Technical Disclosure Bulletin,* Vol. 28, No. 9, Feb. 1986, pp. 3877–3878.

One inconvenience in using the disk-on-a-card subsystems as securable/transportable high capacity data storage devices is the need to open, or actually remove the computer cabinet in order to insert and remove the hard-disk-on-a-card to and from its plug-in attachment to the motherboard socket or backplane. Also, the edge connector traces and their plugs are not designed or intended for many insertions and removals.

Heretofore, it has been thought that the task of providing adequate shock mounting for a micro-Winchester (3½ inch disk diameter) head and disk assembly for use within a portable computer environment has required at least the volume of space occupied by a conventional 5¼ inch half height floppy disk drive, or a larger space. One representative teaching following this thinking is to be found in the McGinlay et al. U.S. Pat. No. 4,568,988, assigned to Rodime PLC, Glenrothes, Scotland (see FIG. 6 and the discussion in connection therewith).

Other manufacturers have proposed portable Winchester hard disk modules. One manufacturer of a hard disk module for use with a personal computer is Tandon Computer Corporation, 405 Science Drive, Moorpark, Calif. 93021. Tandon has developed a product known as the "Personal Data Pac" which includes a 30 Megabyte RLL formatted micro-Winchester hard disk within a plug-in module. However, that product is consistent with the teaching of the McGinlay et al patent, in that it employs a "stepper motor like" interface with the disk drive controller and in that it has not been effectively size-reduced so as to provide a shock resistant micro-Winchester module which may be plugged into a base unit which itself fits entirely within the recess form factor provided for the standard half height floppy disk. Thus, the Tandon Personal Data Pac product has required an external base unit and exposed cables in order to attach to and be used with conventionally sized personal computers. A similar, cable-connected, external base unit product, known as the "Datamodule" is being offered by Inmac, 470 Mercury Drive, Sunnyvale, Calif.

Another manufacturer of another proposed micro-Winchester-based fixed disk module is JVC Information Products Company of America, 1011 West Artesia Blvd., Compton, Calif. 90220. The JVC product proposed an enclosed head and disk assembly, either type JD-3824R or JD-3812M Series, which plugged into a base housing containing control and interface electronics. A ruggedized "suitcase" type carrying case was proposed in commercial literature for transporting the head and disk assembly.

There are several rigid disk cartridge based products which will plug into base units occupying standard floppy disk drive half height form factors. One such product is made by Syquest Technology, 47923 Warm Springs Blvd., Fremont, Calif. 94539 under the model number SQ312RD. A plated, rigid disk is rotatably contained within a plastic cartridge, model number SQ200, which is received within a base unit containing a spindle motor and a head assembly and actuator.

The problems associated with cartridge-type products are the same difficulties long associated with disk packs, namely, disk spindle rotational eccentricities which vary from base unit to base unit, and the non-trivial task of purging impurities from the disk cartridge which otherwise come between the low flying head and the disk surface. A similar product, Model 360, was announced by DMA Systems, Goleta, Calif., in an article written by David Sutton, entitled "Removable Cartridge Winchester Triples Performance-To-Volume Ratio" appearing in *Mini Micro Systems* magazine, March, 1984 issue, pages 245, 246, and 248.

Another removable disk cartridge is the "Bernoulli Box" product line offered by Iomega Corporation of Ogden, Utah, as generally depicted and discussed in U.S. Pat. No. 4,458,273, for example. This product supports a floppy disk upon a Bernoulli plate within a cartridge and thereby enables use of flying head technology. Another disk cartridge concept is presented in an article by Hatchett entitled "Dual-Use Data Cartridge" in the *IBM Technical Disclosure Bulletin,* Vol. 23, No. 4, September 1980, pages 1652 and 1653. The problems associated with disk cartridges discussed above in conjunction with the Syquest product and with the DMA Systems product are also presented with the disk cartridge approach to mass storage.

SUMMARY OF THE INVENTION

A general object of the present invention is to provide a removable and transportable hard disk drive subsystem which overcomes limitations and drawbacks of the prior art approaches to transportable data storage modules.

A specific object of the present invention is to provide a compact, reinforced, shock mounted hard disk module which is easily grasped and handled for loading, unloading, transportation and storage within the hand of an adult user.

Another specific object of the present invention is to provide a micro-Winchester hard disk drive head and disk assembly within a fully enclosed generally rectangular box shaped module providing shock mounting to the head and disk assembly, wherein the module has external dimensions such as to fit within a base housing occupying no more space than that allotted to a conventional 5¼ inch, half height floppy disk drive.

Another specific object of the present invention is to provide a base housing for a micro-Winchester hard disk module wherein the base housing occupies no more space than that allotted to a 5¼ inch half height floppy disk drive and further includes a load/unload electromechanical mechanism therein for automatic power loading and unloading of the module relative to the base housing.

Another specific object of the present invention is to provide efficient and effective distributed processing electronics control circuitry between adaptor/supervisor board, base unit and hard disk module units of a removable and transportable hard disk drive subsystem so as to optimize the adaptability of the subsystem to a wide variety of host computers with which the subsystem may be installed and used for data storage.

Another specific object of the present invention is to provide distributed process electronics control circuitry including a plurality of control microprocessors, a first master microprocessor controller included within circuitry located on an adaptor board, and at least one second slave microprocessor included within circuitry located in at least one base housing and wherein the microprocessors coordinate their respective activities via a high speed dedicated communications channel extending directly between the microprocessors.

In accordance with the principles of the present invention, a removable and transportable hard disk subsystem is provided for use with at least one host computer, such as a personal computer. The inventive subsystem includes one or more hard disk modules, each including a micro-Winchester head and disk assembly. The subsystem includes a base housing installable entirely within a well of the host computer nominally allotted to receive a 5¼ inch half height disk drive, the base housing including a data transducer head positioning and data module handling portion of the subsystem control electronics for automatically loading, unloading and operating the hard disk module therein and for providing electrical connections to the head and disk assembly when loaded. The subsystem further includes an adapter board including a host computer interface portion of the subsystem control electronics and connected by a cable with the control electronics portion of the base housing, the adapter board for connecting the subsystem directly to address, data and control buses of said computer.

These and other objects, advantages, aspects and features of the present invention will be more fully understood and appreciated upon consideration of the following detailed description of a preferred embodiment, presented in conjunction with the accompanying drawing.

DETAILED DESCRIPTION OF THE DRAWINGS

Figure 1:
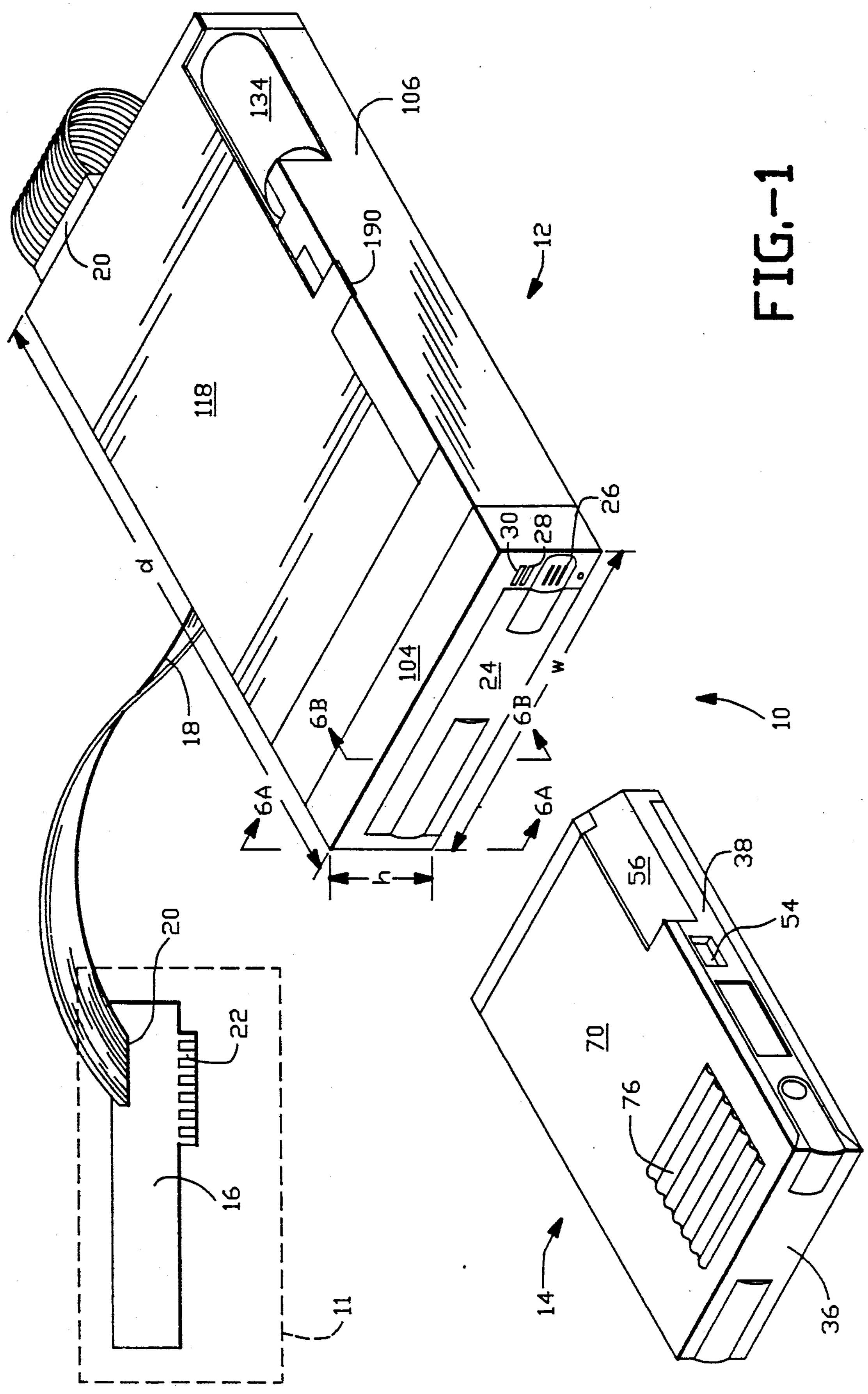
FIG. 1 is a somewhat diagrammatic, isometric drawing illustrating a hard disk module, and a base unit and adaptor board which together comprise a transportable hard disk subsystem in accordance with the principles of the present invention and intended to be installed within a personal computer.
Figure 7A:
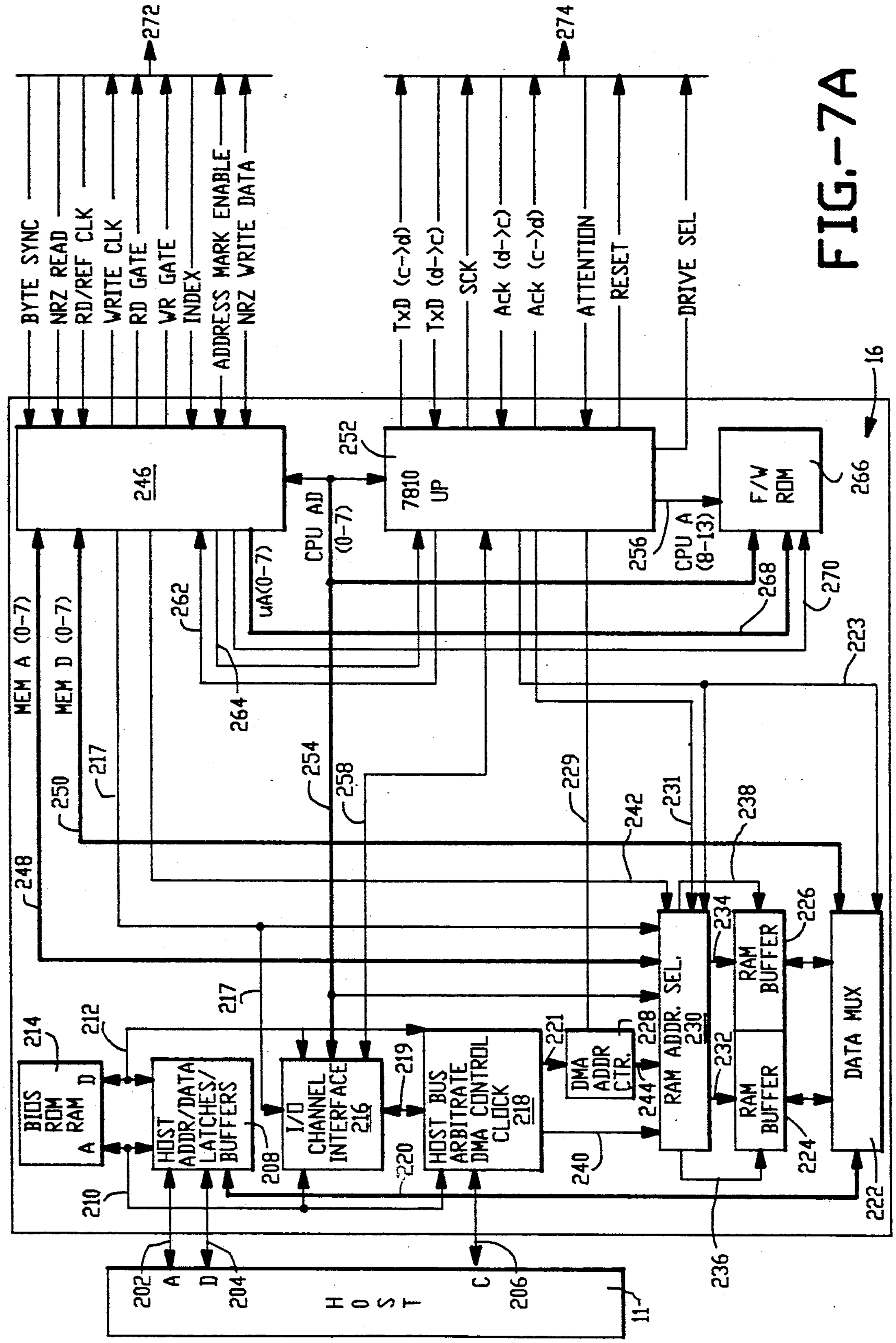
Figure 7B:
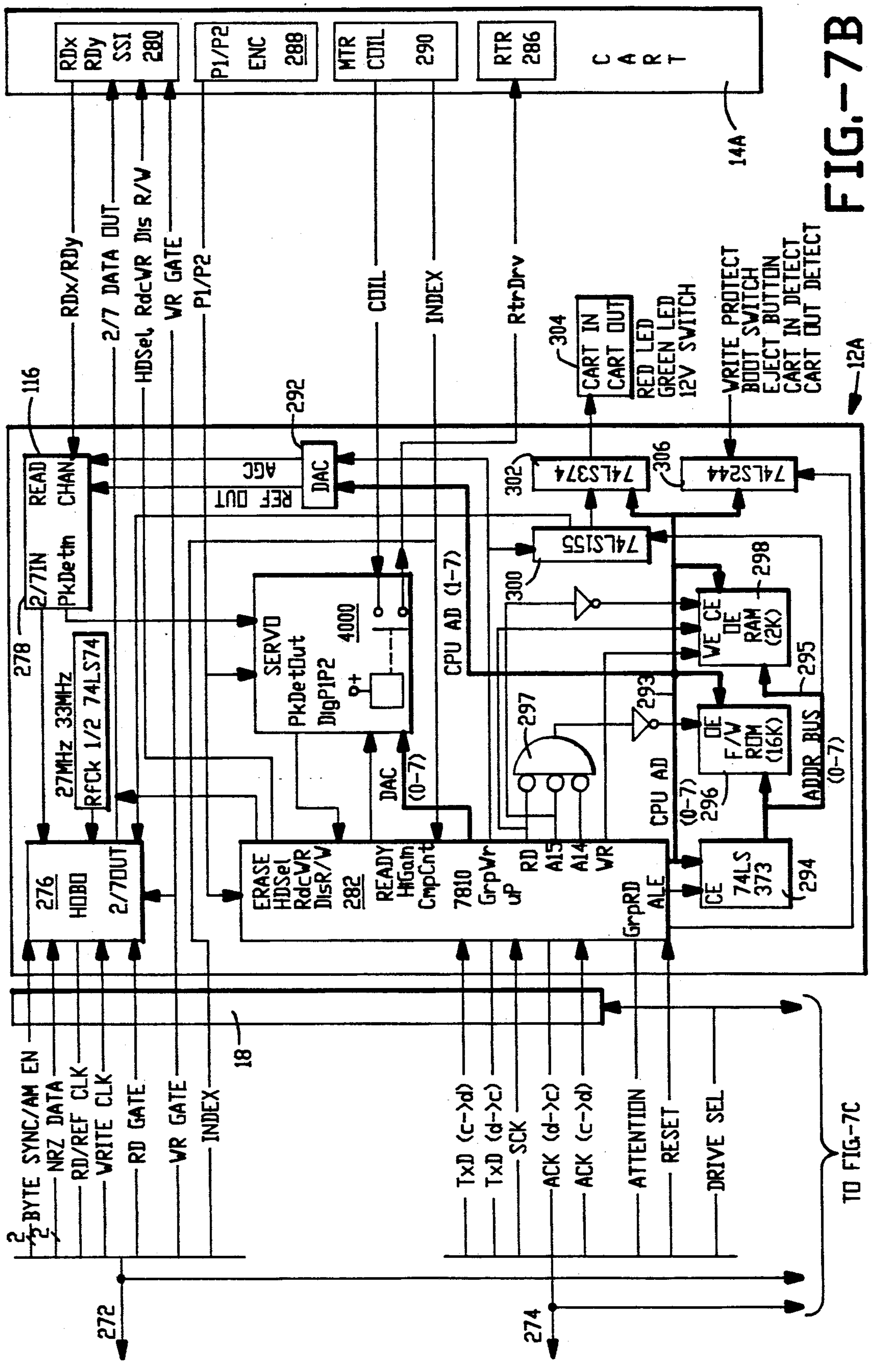
Figure 7C:
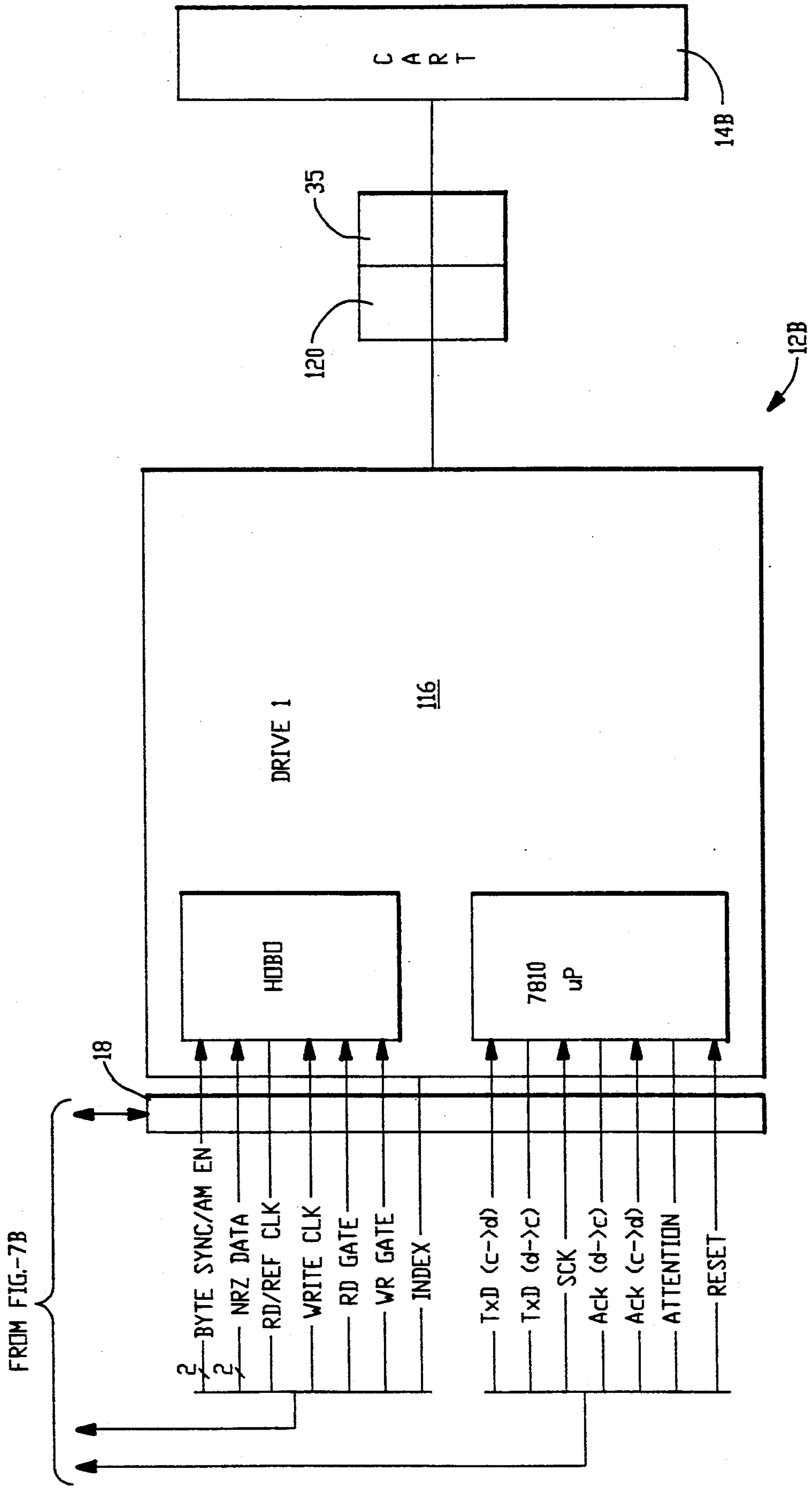

FIGS. 7A, 7B and 7C provide a block diagram of control circuitry of the subsystem of FIG. 1 adapted for a host computer employing a microchannel architecture, for example.

Figure 8:
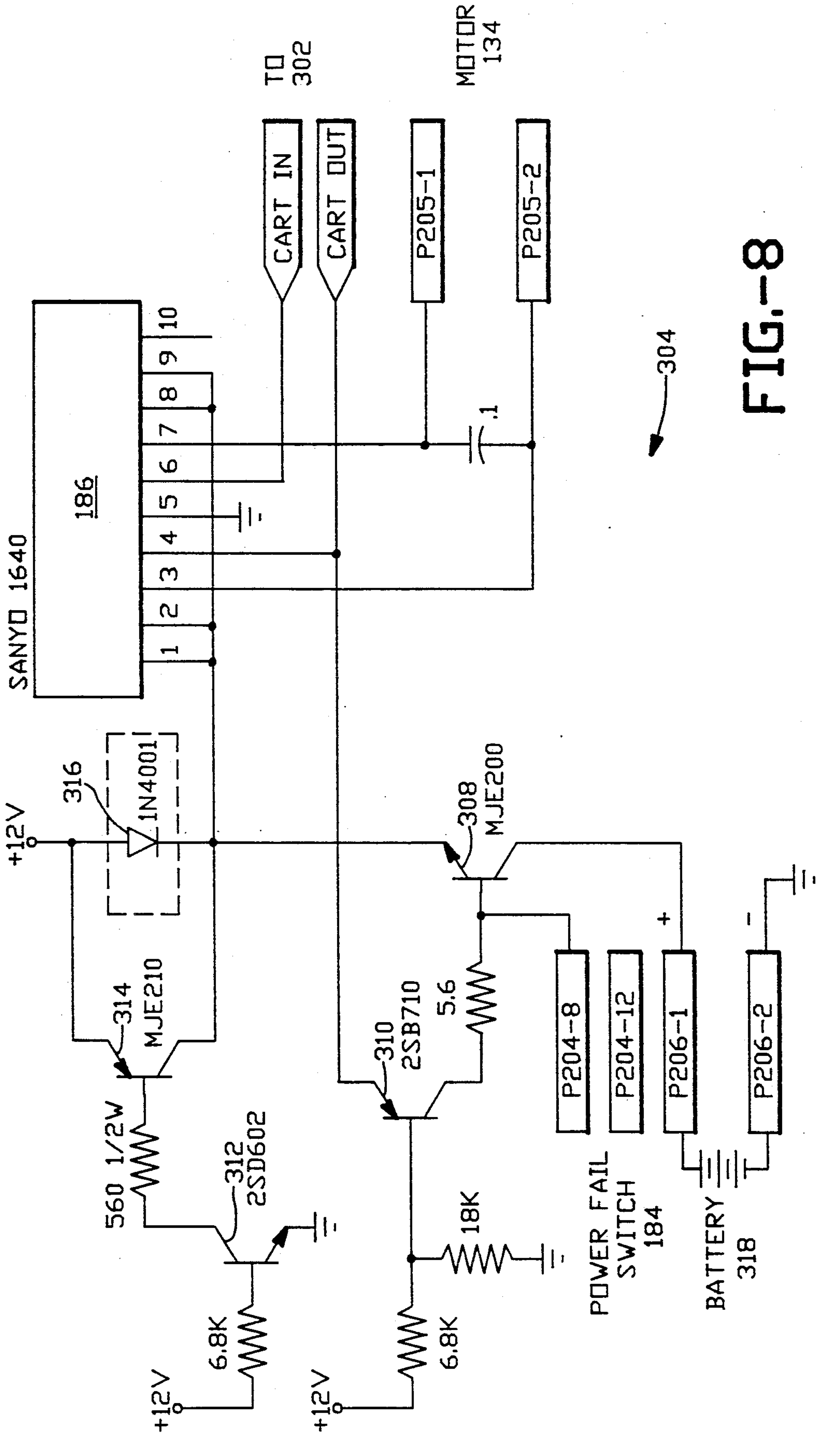

FIG. 8 is a schematic circuit diagram of a load/unload motor control circuit for the base housing depicted as part of the FIG. 1 subsystem.

Figure 9A:
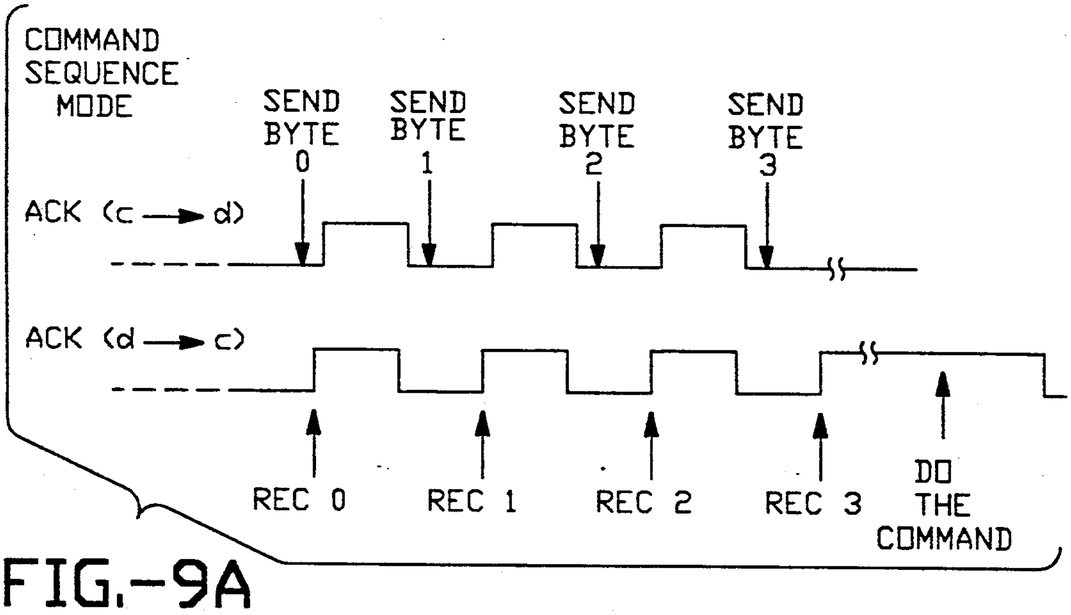
Figure 9B:
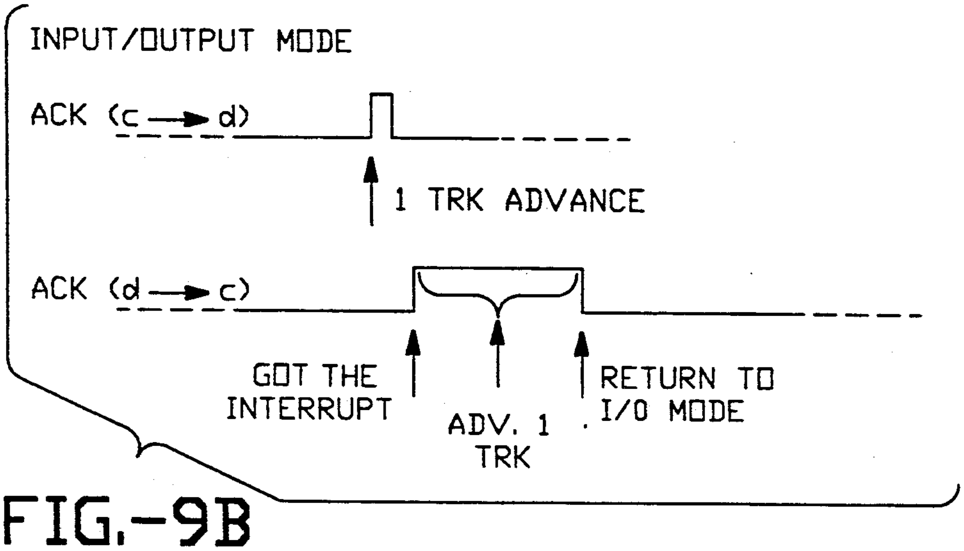

FIGS. 9A and 9B are a series of timing diagrams illustrating command transfer handshake coordination between the supervisory microprocessor of the adaptor/supervisor board and the base unit slave microprocessor during both command sequence and input/output modes.

Figure 10:
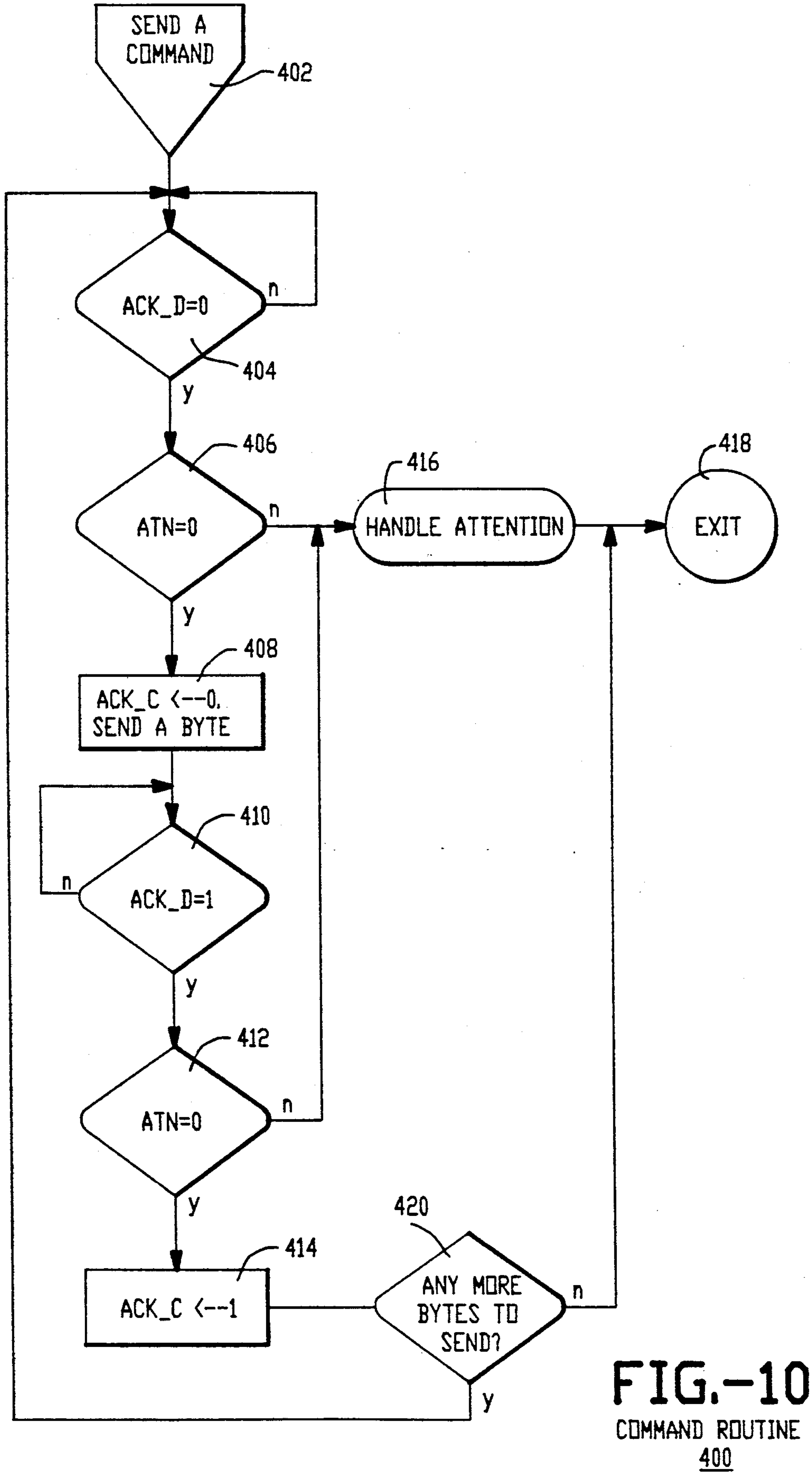

FIG. 10 is a flow chart illustrating the supervisory microprocessor command issuance process.

FIGS. 11A, 11B, 11C, and 11D are flow charts illustrating command execution by the base unit slave microprocessor.

DETAILED DESCRIPTION OF A PREFERRED EMBODIMENT

Overview of Subsystem 10

As shown in FIG. 1, a transportable hard disk subsystem 10 includes a base unit 12, a hard disk module 14, and one of a variety of adaptor/supervisor boards 16 which is connected to the base unit 12 via a forty conductor ribbon cable 18 having plugs 20 at each end thereof. The adaptor/supervisor board 16 includes an edge connector 22 enabling it to be plugged into a bus of a personal computer 11, such as the IBM Personal Computer PS/2 series, for example. Another form of adaptor board (not shown) enables the base unit 12 to be connected to a bus of the IBM Personal Computer AT series, or equivalent, for example.

The base unit 12 is formed to have height (h), width (w) and depth (d) dimensions to occupy a standard 5¼ inch, half height floppy disk drive well or recess defined within the enclosure of the personal computer with which the transportable hard disk subsystem 10 is to be used. A spring loaded door 24 on the front of the base unit 12 is hinged to swing upwardly and inwardly against the force of a bias spring 194, thereby to admit the hard disk module 14 to be manually loaded part way into the interior space of the base unit housing. An automatic load, unload mechanism 133 then senses partial insertion of the module 14 and thereupon automatically engages the module 14 and automatically loads it into the base unit 12 in order to establish all of the requisite electrical connections via a single plug/jack arrangement.

An eject button 26 located to the right of the door 24 enables the user to activate the load, unload mechanism 133 and thereby cause a module 14 to be unloaded from the base unit 12. A status lamp 28 indicates that a module 14 is loaded and operating within the base unit 12 or that the module 14 is not loaded or not operating, and an activity lamp 30 indicates occurrences of actual disk drive data transfer activities within the system 10 once a module 14 is installed and operating within the base unit 12.

Hard Disk Module 14

Each hard disk module 14 includes a thin and compact micro-Winchester head and disk assembly 32 preferably formed in accordance with the micro-Winchester head and disk assembly described in the assignee's U.S. Pat. No. 4,712,146, hereby incorporated by reference (see also the assignee's U.S. Pat. No. 4,639,863 also incorporated by reference which utilizes the referenced head and disk assembly in a hard disk expansion board subsystem).

The head and disk assembly 32 may include one or more data storage disks, each having a capacity of storing ten megabytes or more of user information on each data storage surface thereo. For example, the module 14 may be configured with a single data storage disk to handle 20 megabytes of user information or may be configured with two data storage disks to handle 40 megabytes of user information. Increased data storage capability is made possible by use of techniques described in the assignee's co-pending U.S. Pat. No. 4,914,530, for Modular Unitary Disk File Subsystem Having Increased Data Storage Capacity, the disclosure of which is hereby incorporated by reference. A/B servo burst information is written in a single sector area of each data surface, and the data surfaces are divided into five contiguous servo zones of data tracks with a timer for each zone, as taught for example in U.S. Pat. No. 4,419,701, the disclosure thereof being incorporated herein by reference.

One important feature of the head and disk assembly 32 is that it includes an automatic aerodynamic latching mechanism, known as AIRLOCK TM, which places and locks the data transducer heads thereof at a landing zone in the absence of disk rotation, so that any shock forces incident to handling of the module 14 will be transmitted to the data storage surfaces of the disks at the landing zone regions which are not available for storage of useful information. In this regard, see the referenced U.S. Pat. No. 4,639,863, and the assignee's U.S. Pat. No. 4,647,997, incorporated herein by reference.

The thin film connection substrates leading from the head and disk assembly 32 plug into a small circuit board 33 at which all of the electrical connections required to be made with the head and disk module are concentrated into a single e.g. 40 receptacle jack 35. The circuit board 33 is not rigidly mounted to the module housing, and some degree of relative movement in a plane perpendicular to the housing and the circuit board 33 is freely permitted, so that the receptacle jack 35 will plug into a mating plug 120 without binding up. End pointed alignment posts 122 spanning the plug 120 enter guide holes defined in the receptacle jack structure 35 and thereby move the circuit board 33 and the jack 35 into proper alignment to mate properly with the plug 120. All electrical connections with the module 14 are made through the jack 35 via the single plug 120 of the base unit 12, described hereinafter.

A molded plastic rectangular frame 34 includes a front 36, a right sidewall 38, a left sidewall 40 and a rear wall 42. Recesses 44 and 46 are formed in the front 36 and front portions of the sidewalls 38, 40 to enable ornamental parts 48 and 50 to be received and glued therein. A rectangular well 52 is defined in the right sidewall 38 for the purpose of receiving a pressure sensitive user label 52 upon which the user may place identifying notations appropriate to the particular module 14, it being clearly contemplated in practicing the present invention that the user may have one, several or many modules 14.

A small, generally rectangular recess 54 is provided for engagement by a load latch assembly 162 of the load, unload mechanism 133 described hereinafter. A slanted portion 56 along a rearward portion of the wall 38 is provided to provide clearance with the outside circumferential diameter of a load, unload drive motor 134 within the load, unload mechanism described hereinafter.

The rear wall 42 defines a rectangular opening 58 sized to enable the connector jack 35 to pass through. Two vertical openings 60, 61 are defined in the back wall 42, for respectively receiving two slide toggles 62 and 63. These toggles 62, 63 enable the user to select respectively "write protection" for the module 14 (meaning that when the write protect toggle 62 is "on", user data cannot be written to or erased from the module 14); and whether the module 14 is to act as a "boot" device (meaning that when the toggle 63 is "on", the module 14 will load the basic operating system into the computer system as well as any applications programs that might be needed by the user when the computer system is initially reset or "booted up"). The respective positions of the toggles 62 and 63 are sensed by sensors in the base unit 12.

A series of cylindrical portions 64 are formed in spaced apart relationship on the lower inside periphery of the frame 34; and, threaded metal inserts 66 are press-fit into axial openings defined therethrough. Screws 90 passing through holes defined through a bottom cover plate 84 mate with the threaded inserts 66 and thereby secure the bottom cover plate 84 to the rectangular frame 34. Four rectangular wells 68 are formed in the right and left sidewalls 38, 40. These wells or recesses 68 receive and secure four shock pads 82 which are glued thereto by an adhesive.

A top cover 70, formed out of sheet metal and painted a suitable color includes a right lip 72 and a left lip 74. The right and left lips 72, 74 seat in recesses 73 and 75 formed along the upper edges of the right and left sidewalls 38, 40. The lips 72 and 74 enable the top cover 70 to be glued with a suitable adhesive to the frame 34 along the top peripheral recesses 73 and 75. A grip array 76 of gently undulating, parallel corrugations is formed in a front region top cover 70 (and a similar array of corrugations, not shown, is formed in a front region of the bottom cover 84 in vertical alignment with the corrugations 76) so that the module 14 may be securely gripped by the user during insertion and withdrawal of the module 14 from the base unit 12.

Four shock pads 78 are glued with a suitable adhesive to the inside of the top cover 70. These shock pads 78 are biased by thickness dimensions and position to come into contact with the top plate of the head and disk assembly 32 when it is installed within the frame 34, in a manner to be described shortly.

Figure 2:
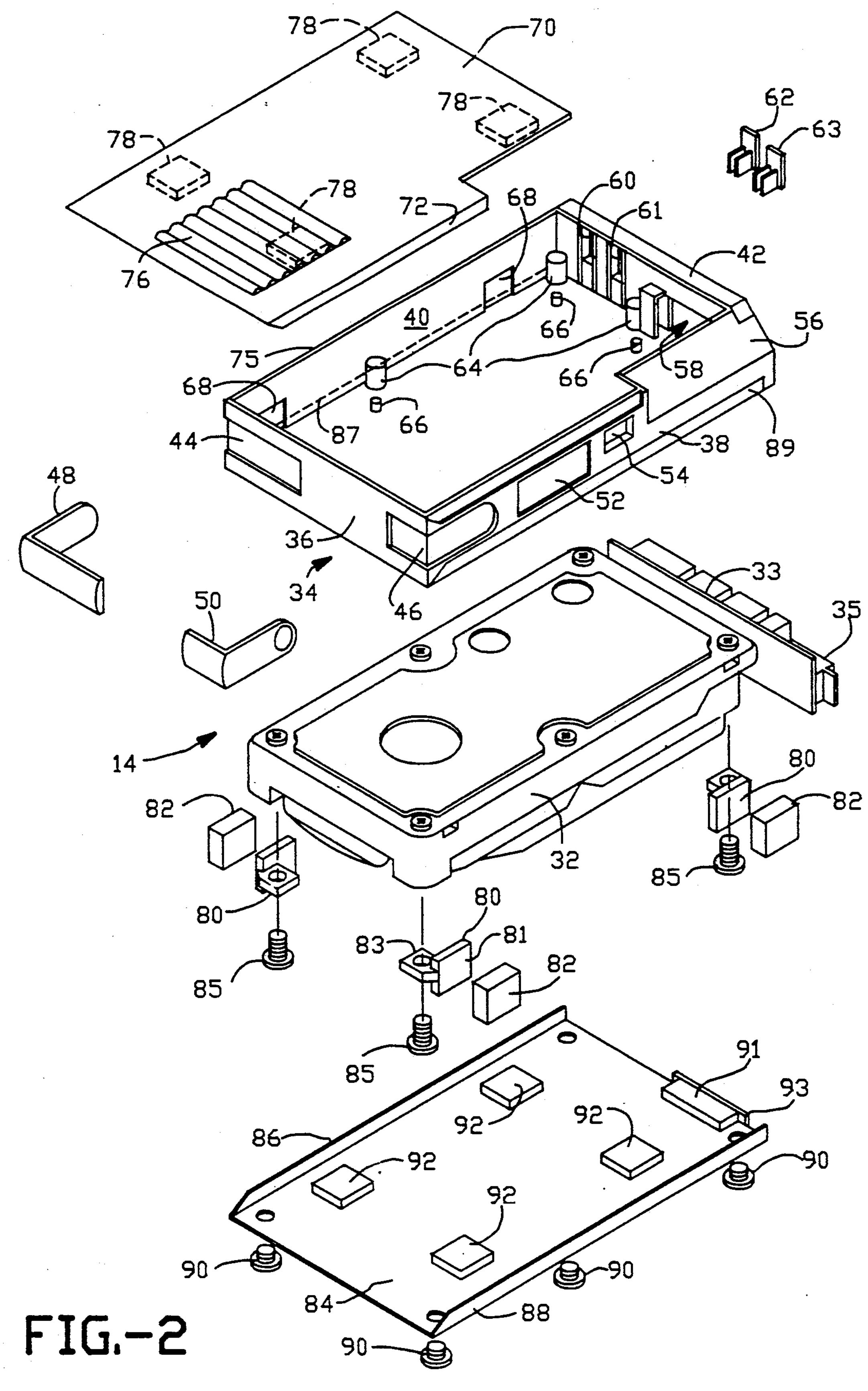
FIG. 2 is an exploded isometric view of the hard disk module of the subsystem set forth in FIG. 1.

Four mounts 80 are formed of cast aluminum, and each includes a shock pad surface 81 to which a rectangular shock pad 82 is glued with a suitable adhesive. An arm portion 83 extends at right angles from the shock pad surface 81, and it defines an opening through which a mounting screw 85 passes. The screws 85 mate with threaded openings formed in the four corners of the generally rectangular base casting of the head and disk assembly 32, as shown in FIG. 2.

The bottom cover 84, also formed of sheet metal and painted the same color as the top cover 70, has two upwardly extending side lips 86 and 88. These lips engage recesses 87 and 89 formed along the lower outer edges of the left and right sidewalls 40 and 38. An elastomeric spacer pad 91 is attached by adhesive to the inside of the bottom cover 84 against a lip 93 extending upwardly long a portion of the back edge of the cover 84 in the vicinity of the jack 35. The spacer 91 thereby spaces the jack 35 away from the bottom edge of the module 14 otherwise formed by the bottom cover 84. Four shock pads 82 are glued to the inside surface of the bottom cover 84, and these shock pads 82 are likewise biased by thickness and position to come into contact with the head and disk assembly 32.

The shock pads 82 are preferably formed of a visco-elastic polymer having a density in pounds per cubic foot of 80; a durometer/hardness rating of 50; a compression set of 6.2%; a compressive modulus in pounds per square inch of L2.5 at 20% compression, and 89.0 at 50% compression; a tensile strength of 120 pounds per square inch; a tensile modulus of 30 pounds per square inch at 100%, and 90 pounds per square inch at 300%; a tear strength of 22.8 pounds per inch; an absorption efficiency of 61%; a specific damping of 74%, and a specific absorption of 6642 foot pound-foot per pound; and, a rebound resilience of 13.0%. A preferred material for the pads 82 is Sorbothane TM Medium visco-elastic polymer, supplied by Sorbothane, Inc., 2144 State Route 59, P.O. Box 178, Kent, Ohio 44240. The use of the visco-elastic polymer for the pads 82 has enabled development of the module 14 so that it will withstand very severe shock forces, on the order of 150 G's, without damage or destruction of the head and disk assembly 32.

The shock pads 78 affixed to the top cover 76, and the shock pads 92 affixed to the bottom cover 84 are preferably formed of small flat blocks of a suitable foamed elastomeric material, such as polyether, having a density of 15 kg/m$^3$, and they function to smooth and dampen any impact forces otherwise resulting from shock contacts between the head and disk assembly 32 and the covers 70 and 84.

Figure 2A:
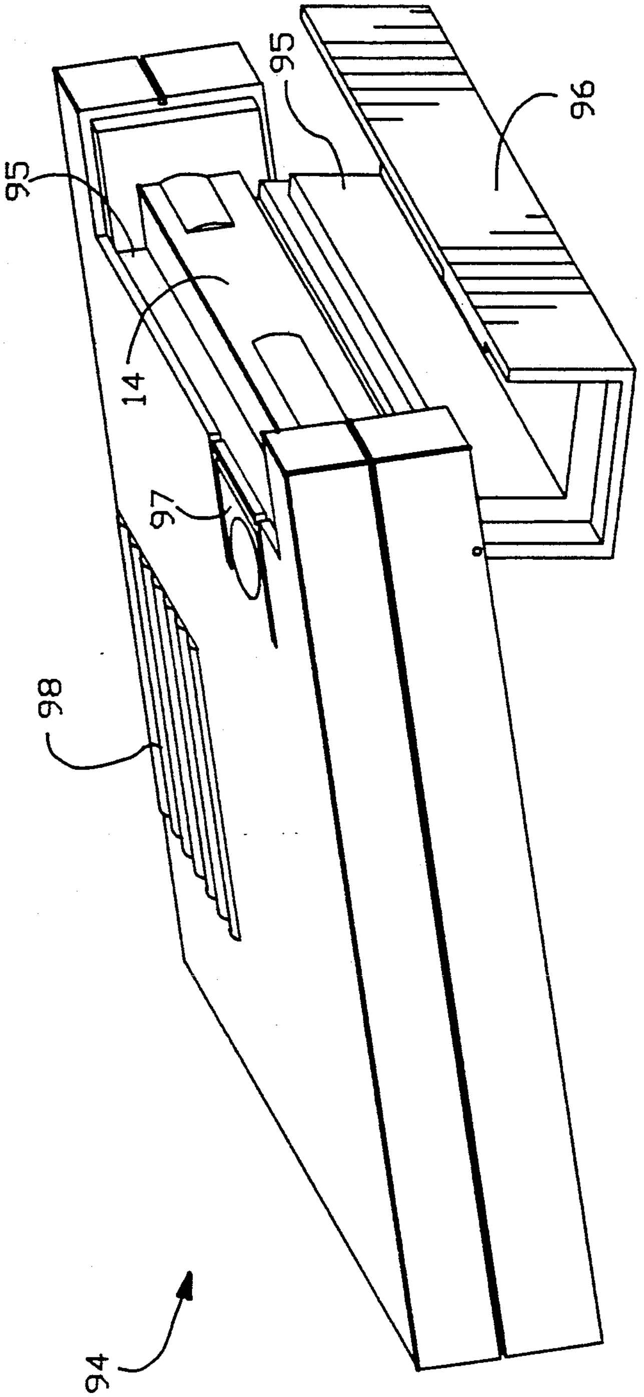
FIG. 2A is an isometric view of a shock-resistant carrying case for the hard disk module depicted in FIGS. 1 and 2.

Further resistance to shock forces is provided by a module carrying case 94 depicted in FIG. 2A. The case 94 is generally rectangular and is formed of high impact resistance plastic material. The case 94 defines an interior rectangular well for receiving a module 14. The interior of the case 94 adjacent to the well is lined with a shock absorbing foam material 95. A hinged, snap-locking end closure 96 covers the open insertion/withdrawal end of the carrying case 94. A snap-lock mechanism 97 employs the resilience of the plastic material forming the case 94 for hinge action enabling lock and release of the closure 96.

When open, the hinged closure 96 provides a convenient pedestal for the case 94. A recessed, corrugated surface grip region 98 (and an aligned, similar region formed on the underside of the carrying case 94) provides a convenient gripping surface for handling the case 94 with or without the module 14 therein. The padded case 94 adds further significant shock resistance to a module 14 contained therein. Tests have established that the module-containing carrying case 94 may be dropped from a height of twenty one inches upon an unyielding surface without adverse effect upon the module 14 and its shock mounted HDA 32 carried therein.

Base Housing 12

Figure 3:
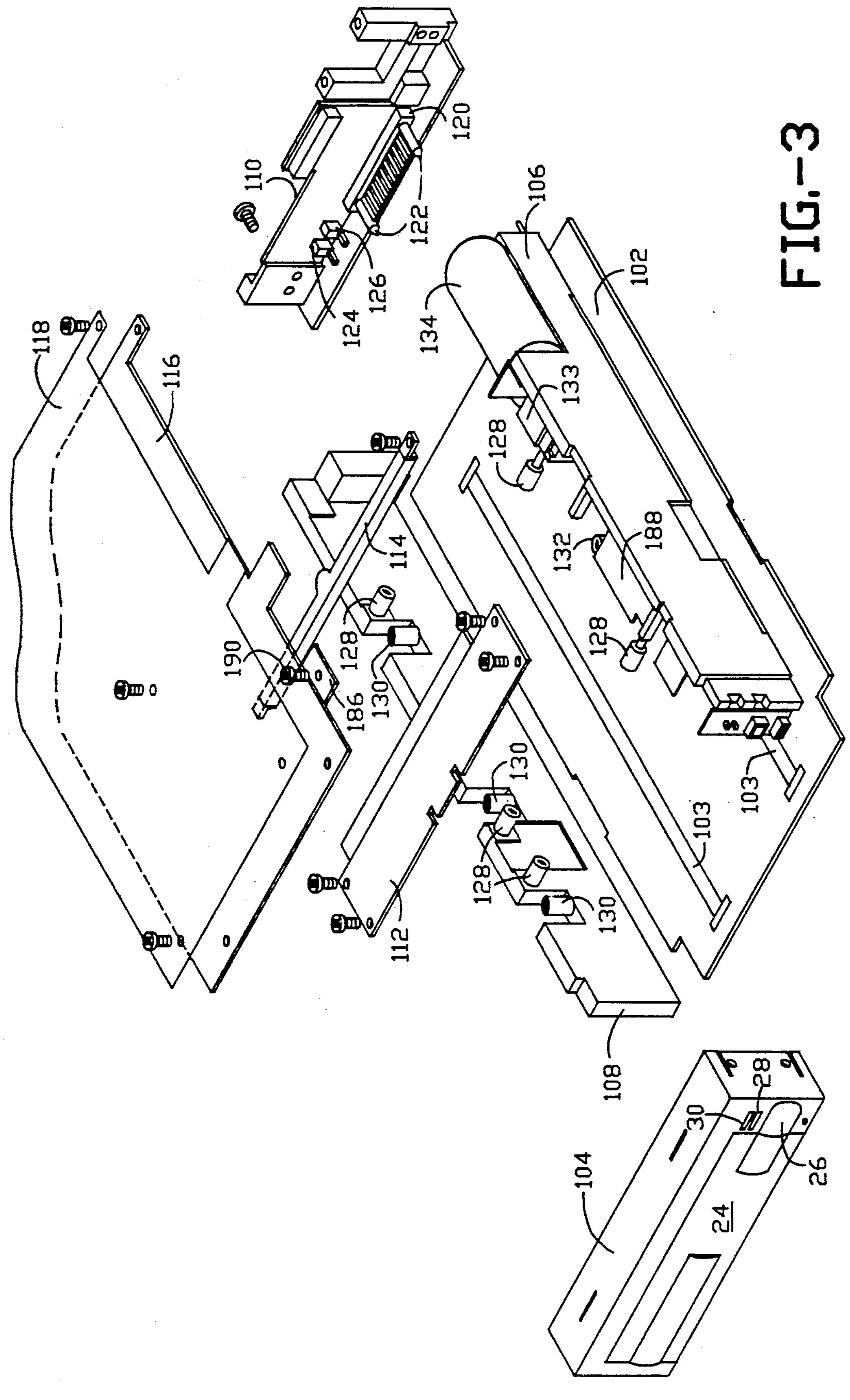
FIG. 3 is an exploded isometric view of the base unit of the subsystem set forth in FIG. 1.

The base housing 12 depicted in FIG. 1 is shown in greater structural detail in the FIG. 3 exploded view. Therein, the base housing 12 is shown as including a bottom plate 102 having two parallel raised portions 103 which are covered with strips of thin polyethylene films affixed thereto by adhesive. The polyethylene strips on the raised portions 103 provide bottom rails upon which the module 14 will slide as it is loaded and unloaded in the base housing 12. The base housing 12 also includes a molded plastic front panel assembly 104 including the hinged closure 24, user switch 26, and indicator lights 28 and 30.

The base housing includes a right wall assembly 106 including the load, unload mechanism 133; a left wall assembly 108 and a rear wall assembly 110. The assemblies 106, 108 and 110 are formed of aluminum castings. A front top cover bar 112 and a support bar 114 are provided to support and secure a printed circuit board 116 carrying some of the actuator positioner electronics required for properly positioning the head-arm assembly relative to the data storage disk during operation of the module 14. The circuit elements are carried in large measure upon the underside of the circuit board 116. A thin plastic insulation sheet 118 overlays the upper surface circuit traces and components of the circuit board 116 in order to protect them from contact with other elements within the host computer enclosure that may be in proximity with the base housing 12.

A plug 120 is rigidly mounted to the back wall 110 and includes two alignment posts 122 which mate with complementary openings formed on the jack 35 of the module 14. These posts guide the receptacles of the jack 35 into proper mating relationship with the contact pins of the plug 120. Two switch sensors 124 and 126 sense the relative positions of the toggles 62 and 63 of the module 14 and generate responsive electrical logic signals.

The sidewalls 106 and 108 are provided with a series of guide rollers. One set 128 of guide rollers on each wall aligns and guides the module 14 in proper vertical orientation. The guide rollers 128 are spaced apart in order to prevent the module 14 from coming into contact with downwardly depending electrical components mounted to the underside of the printed circuit board 116. Two sets of guide rollers 130, 132 align and guide the module 14 in proper horizontal orientation. The guide rollers 130 on the left sidewall 108 are fixed in place, while the two guide rollers 132 on the right sidewall are spring-loaded and force the module 14 into contact with the left wall guide rollers 130.

Figure 4:
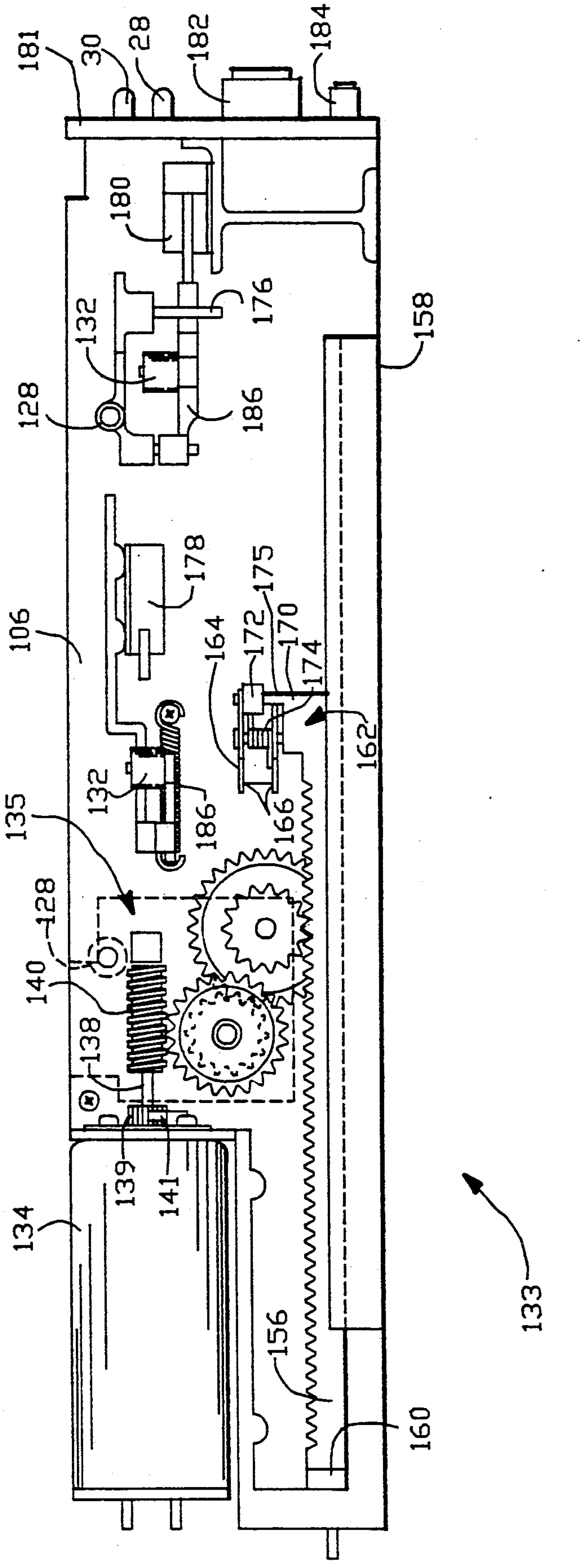
FIG. 4 is a somewhat diagrammatic view in inside elevation of the load-unload mechanism contained in the right sidewall of the base housing set forth in FIGS. 1 and 3.
Figure 5:
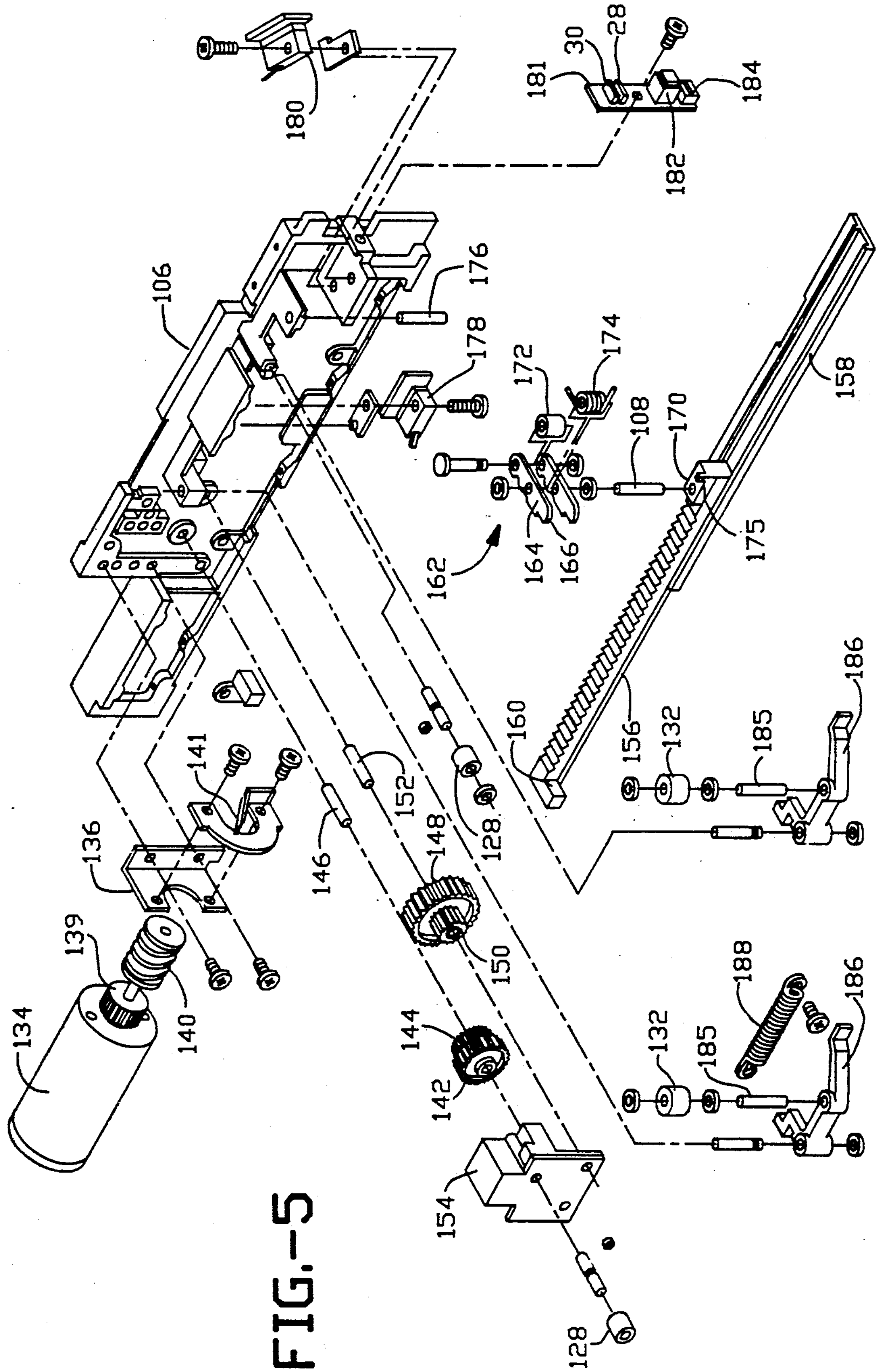
FIG. 5 is an exploded view of the load-unload mechanism depicted in FIG. 4.

The load/unload mechanism 133 is depicted in the FIG. 4 inside view in elevation of the right sidewall 106, and in the FIG. 5 explosion view of the same structure. The sidewall 106 is formed as an aluminum casting and has the shape depicted in FIG. 5. The mechanism 133 includes a DC motor 134 which is mounted to the sidewall 106 via a motor mount bracket 136. A motor shaft 138 nominally rotates at 3800 rpm and develops a torque of 150 gm-cm under load, requiring one ampere at 11.2 volts DC.

The armature of the DC motor 134 tends to vibrate within its bushings and create undesirable noise while in operation. To dampen these acoustic vibrations, a bushing 139 is slipped over the motor shaft 138. A leaf spring 141 biases the bushing 141 against the motor shaft 138 and thereby greatly reduces the vibration and resulting noise. The bushing is preferably formed of sintered brass which has been impregnated with silicone oil for lubrication. The outer surface of the bushing 139 which is contacted by the leaf spring 141 is splined. The leaf spring 141 is preferably formed out of a sheet of beryllium copper alloy as part of a bracket which is mounted by the same screws which secure the motor 134 to the sidewall 106, as shown in FIG. 5.

The motor shaft 138 drives a worm 140. The worm 140 engages the teeth of a helical gear 142 contained within a spur gear transmission 135. The helical gear 142 is molded of an aceytal copolymer plastic material, such as Duracon TM manufactured by Poly Plastics Ltd., of Japan. It includes an integral spur gear 144 and rotates about an axle pin 146 which is press-fit into an opening formed in the sidewall casting 106. The spur gear 144 meshes with a larger diameter spur gear 148 within the transmission 135 which is also molded of aceytal copolymer material. The large spur gear 148 is integrally formed with a pinion gear 150, and the spur gear-pinion gear rotates on an axle pin 152 press-fit into an opening formed in the sidewall casting 106. A gear box cover 154 provides an outside end support for the axle pins 146 and 152. It also aligns and supports one of the vertical guide rollers 128.

The pinion 150 meshes with upwardly extending teeth of a rack 156, also molded of an aceytal copolymer material. The reduction ratio achieved by the spur-gear transmission 135 is 81.4 with an efficiency of about 27%. It takes about two seconds for the rack 156 to traverse the entire range of its locus of movement. The rack 156 slides in a slot formed in a rack race 158 which is screwed into the bottom of the sidewall casting 106. An unload finger 160 is integrally formed with and extends outwardly from the rear of the rack 156. The unload finger 160 comes into contact with the lower corner of the endwall 42 of the module 14 as the rack 156 moves in a forwardly direction, thereby causing the module 14 to be pushed out of the base housing 12.

A spring biased, retractable load latch assembly 162 includes a latch member 164 having a pair of teeth 166 which engage the generally rectangular sidewall recess 54 formed in the module 14. The latch member 164 retractably pivots about a vertical pin 168 which is press-fit into a vertical opening formed in a raised plateau front end portion 170 of the rack 156. A roller 172 enables the latch member 164 to follow a race along the inside surface of the cast sidewall 106 along a locus of movement following the movement of the rack 156. A bias spring 174 engages a finger 175 extending upwardly from the plateau 170 and also engages the latch member 164 to bias the roller 172 against the race along the sidewall 106. A vertically depending pin 176 comes into contact with the latch member 164 at the forwardmost extension of travel of the rack 156 and retracts the teeth 166 from engagement with the module sidewall 38 at the recess 54. When the latch assembly is in the retracted position, the module 14 may be freely withdrawn from base housing 12 without any mechanical impediment.

Two module sense switches 178 and 180 are provided to sense when a module 14 has been partially inserted into the base housing 12 by the user to an extent permitted by the unload arm 160 when the rack 156 is in the forwardmost position. Both sense switches 178 and 180 must be closed before the motor 134 can operate. The sense switches 178 and 180 are provided as a safeguard, so that the user cannot inadvertently signal presence of a module 14 e.g. merely by sticking a finger or object other than a module 14 into the base unit 12.

A small printed circuit board 181 contains a micro-switch 182 which provides the electrical contact portion of the user switch 26. The board also supports and connects the two indicator lamps 28 and 30, and also a recessed micro-switch 184 which can only be activated by e.g. a pin, stylus or paperclip, etc. The switch 184 is to enable user to cause the module 14 to be ejected under battery backup power in the event of a system power failure of the host computing system. A small 9 volt transistor radio battery may be plugged into the base unit 12 in order to provide requisite module-unload back up power.

The spring loaded guide rollers 132 rotate about vertical axle pins 185 which are mounted into openings formed in pivot arms 186 journalled to the sidewall structure 106. A load spring 188 biases the rearward roller 132, while engagement with the switch 180 provides a bias force for the forward roller 132.

Aside from the load/unload motor which has a 20.5 mm diameter, the thickness of the sidewall 106 as including the load/unload mechanism 133 requires a thickness of only about 16 mm (⅝ inch). This thickness (thinness) enables the base unit 12 to fit within a standard 5¼ inch half height floppy disk well of a personal computer host and still have ample room to receive the hard disk module 14 entirely within its interior space.

A heat dissipation tab 186 of a bidirectional motor driver amplifier mounted on the printed circuit board 116 is attached to a horizontal shelf 188 integrally formed as part of the sidewall casting 106. This arrangement permits any heat generated within the integrated circuit driver amplifier to be sumped for dissipation into the aluminum sidewall casting 106 in the vicinity of the shelf portion 188. A side extension 190 of the printed circuit board 116 secures a plug (not shown) which attaches to a jack wired to a cable extending to the sensors 178 and 180, and to the circuit elements contained on the small circuit board 181.

In operation, directional power is applied to the motor 134 by the driver amplifier for a predetermined time period calculated to cause the rack 156 to traverse the extent of its permitted travel. During travel in a rearward direction (module loading direction), power is applied to the motor 134 until the plug 35 of the module 14 comes into contact with the jack 120. Then, a slight additional amount of power is applied for a short time (e.g. 300 milliseconds) in short pulse intervals in order to be sure that the rack 156 has reached the end limit of its permissible travel. Then, a very short reverse direction interval of current (e.g. 20 milliseconds) is applied to the motor 134 in order to release the binding forces otherwise present in the worm 140, transmission 135 and rack 156 when the motor 134 stalls at the physical limits of travel of the rack 156.

During travel in a forward direction (module unloading direction), power is applied to the motor 134 for a predetermined time period calculated to cause the rack 156 to traverse the extent of its permitted travel. Then, a very short reverse direction interval of current (e.g. 10 milliseconds) is applied to the motor 134 in order to release the binding forces, as explained above in connection with rearward travel.

Figure 6A:
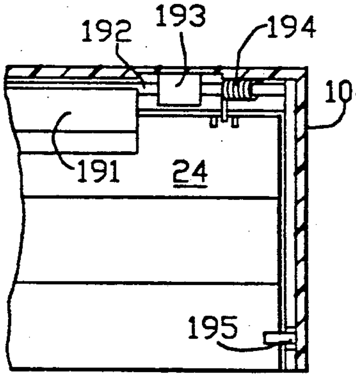
FIG. 6A is a transverse view of a front portion the base housing in section and elevation along the line 6A—6A in FIG. 1 illustrating the construction of the front closure.
Figure 6B:
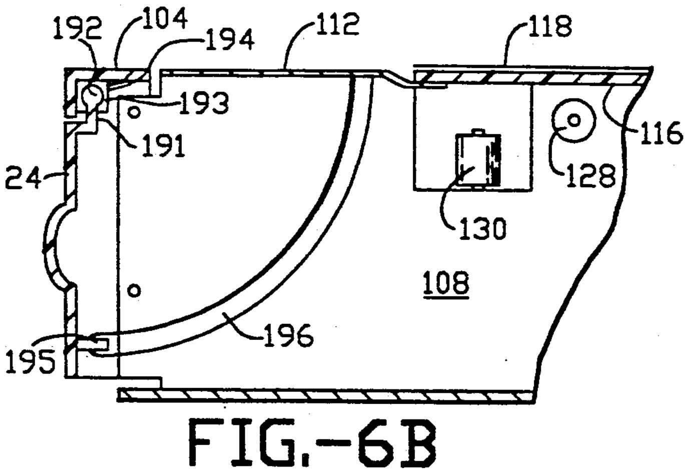
FIG. 6B is a longitudinal view of the base housing in section and elevation along the line 6B—6B in FIG. 1 illustrating further aspects of the construction of the front closure.

As illustrated in FIGS. 6A and 6B, the front closure 24 is hinged to the top of the molded front wall assembly 104. The closure includes a recessed hinge bar 191 which has two hinge pins 192 extending from each end thereof. Two clamps 193 clamp the hinge pins 192 to the top of the front wall assembly 104. A helical spring 194 biases the closure 24 to its downwardly dependent position whenever a module 14 is not present within the base housing 12. A tongue 195 freely moves within an arced sidewall groove 196; and the tongue provides a stop for the closure at its downwardmost position. When the closure 24 is retracted, it nests in a space directly below the front top cover bar 112 which supports the front edge of the printed circuit board 116.

Control Electronics 200

The control electronics 200 for the subsystem 10 are illustrated in one preferred embodiment in the block diagram formed by FIGS. 7A and 7B. The FIG. 7A portion shows the structural blocks of the adaptor/-supervisor board 16, while the FIG. 7B portion shows the structural blocks of each of two base housing printed circuit boards 116; and also shows the electrical elements of two head and disk assemblies (HDAs) 32. It is clear from the FIG. 7B drawing that the subsystem 10 may simultaneously support two base housings 12 and two hard disk modules 14 as a single operating unit. All requisite control processes are distributed among the adaptor/supervisor board 26, base unit 12 and HDAs 32, as explained in greater detail hereinafter.

Adaptor/Supervisor Board 16

The host computer 11 provides e.g. motherboard edge connectors enabling plug-in connection of electronics accessory cards, such as the microchannel adaptor/supervisor board 16. The host 11 provides buffered connections to its address bus 202, data bus 204, and control lines 206. The adaptor/supervisor board 16 includes a host address/data latch and selector 208, so that eight bit data words within the subsystem 10 may be assembled into e.g. 16 bit data words expected at the host data bus 204.

A buffered internal host address bus 210 and a buffered and selected internal host data bus 212 lead from the host address/data latch and selector 208 to a memory 214 including a read-only portion containing BIOS code and a read/write portion (RAM) for storing dynamic system values generated during initialization and reset procedures. The BIOS code comprises additional memory directly addressable and readible by the host computer, so that the host computer may use the subsystem 10 without need for hardware modifications or installation of any additional software device driver routines.

An eight bit interface array 216, (such as the chip 419 described in conjunction with FIG. 16 of the referenced U.S. Pat. No. 4,639,863, or equivalent) is included within the adaptor card 16. This array 216 is adapted to communicate command and status bytes to and from the interface. It is tightly coupled to a data sequencer/memory controller circuit 246 and a supervisor microprocessor 252 via a multiplexed data/address bus 254. It is also coupled to high speed host bus arbitrate and direct memory address (DMA) control and clock generator logic via lines symbolized by the path 219.

A group read/write control path 217 controls transfer of data between the I/O channel interface 216 and the microprocessor 252 via the data sequencer/memory controller circuit 246; and also between a buffer RAM address selector 230 and the microprocessor 252 via the sequencer/controller 246 and a microprocessor controller address bus 254.

The high speed host bus arbitrate and DMA control and clock generator logic 218 is connected to the microchannel control lines of the host computer 11. This logic circuitry 218 generates and distributes control and clocking signals to other circuit elements of the adaptor board 16, including an I/O read/write control signal via a line 219 to the I/O interface 216. The type, number and timing requirements of the microchannel interface signals are described in detail in Volume 5, No. 3 of the *IBM Personal System/2 Seminar Proceedings*, May, 1987.

An eight bit internal host data bus 220 leads from the host address/data latch and buffer 208 to a data multiplexer 222. The data multiplexer multiplexes eight bit data words between two RAM buffers 224 and 226 configured as a "ping-pong" buffer (i.e. one buffer may be written to while the other is being read, and vice versa). Each RAM buffer 224, 226 is capable of holding 16 blocks of 512 eight bit data words. In operation, one of the RAM buffers, e.g. the buffer 224, may be engaged in reading out data at high speed to the host 11 via a DMA channel operation, while the other buffer 226 may be engaged in receiving data from the hard disk module 14 via a data sequencer/memory controller circuit 246 of the adaptor card 16 which directly supervises disk drive data transfer operations. Once readout to the host from the buffer 224 is completed (and the buffer 226 is loaded with the next blocks in sequence as called for by the host), the roles of the buffers 224 and 226 are reversed; and the data blocks in the buffer 226 are read out at high speed over the DMA channel, while the buffer 224 is written with the next blocks in order as received from the hard disk module 14.

A bidirectional host-adaptor DMA start and done control path 229 enables the microprocessor 252 to start a single 512 byte block DMA transfer between the host DMA channel and the selected buffer memory 224 or 226. When the DMA transfer is completed, a done signal is generated by the DMA address counter 228 and sent to the microprocessor 252 to indicate that the current DMA transfer has been completed.

A RAM select line 223 leading from a microprocessor controller 252 directs the circuitry within the data multiplexer 222 and circuitry within a RAM address selector circuit 230 to select which buffer RAM 224 or 226 is actually connected to the host DMA data channel, and which is connected to the data sequencer data channel.

A modulo-512 DMA address counter chain 228 receives a DMA clock signal generated by the logic 218 via a line 221; and, once started, the counter 228 progressively counts out 512 successive addresses for the 512 individual bytes of each block to be transferred via the DMA channel. These addresses are supplied over a bus 244 to a RAM buffer address selector circuit 230. The selector circuit 230 passes memory addresses to the RAM buffers 224 or 226 via two buses 232 or 234, the bus 232 leading to the RAM buffer 224; and the bus 234 leading to the RAM buffer 226. Two read/write control lines 236 and 238 extend from the RAM address selector circuit 230 to the RAM buffers 224 and 226 respectively. These lines control whether the particular RAM buffer 224, 226 will be read or written to during a particular access operation.

A control line 240 from the logic circuit 218 causes the circuit 230 to select and pass the host DMA addresses on the bus 244 to the RAM address selector 230; and a control line 242 from the data sequencer/memory controller chip 246 causes the circuit 230 to select and pass drive addresses generated by the circuit 246 and put out over a drive address bus 248 to the RAM address selector 230. A bidirectional drive data bus 250 extends from the data sequencer/memory controller circuit 246 to the data multiplexer circuit 222.

An adaptor/supervisor board controller microprocessor 252 is connected to an eight bit lower byte address/data byte multiplexed bus 254 which extends to the interface 216, the RAM address selector 230, the data sequencer/memory controller 246, and to a read only memory array 266 which contains the control program executed by the microprocessor 252 during its control operations. The microprocessor 252 is preferably implemented as an NEC type 7810 integrated circuit processor.

The microprocessor controller 252 presets the RAM block addresses (high order bits of the host DMA channel RAM address and high order bits of the data sequencer data channel RAM address to identify 512 byte blocks in each RAM 224, 226) using the group write function of the data sequencer/memory controller 246. The sequencer/controller 246 transfers the four bit addresses via a line 217 and the address bus 254 to the RAM address selector circuit 230. Thus, the microprocessor 252 may directly address a predetermined one 512 byte block in each buffer RAM 224, 226, before initiating a data transfer operation.

The address/data lines extending over the bus 254 to the RAM address selector circuit 230 enable the microprocessor 252 to preload a block start address before start of high speed DMA operations at an appropriate block location within the RAM buffer 224 or 226. Once the starting address is supplied, the DMA address counter 228 thereupon generates high speed byte addresses progressively sequenced in order from the starting address; so that data is read into or out of the particular RAM buffer 224 or 226 over the host DMA channel at high speed without any need for further intervention by the processor 252.

The low order microprocessor address bits are separated within the data sequencer/memory controller 246 and are sent to the firmware ROM 266 via a low order address bus 268. A high order address bus 256 extends directly from the microprocessor 252 to the program memory 266. A program memory select line 270 extends from the data sequencer/memory controller 246, and when active enables control program sequences addressed by the bit states of the buses 256 and 268 to be read out of the memory 266 via the bus 254 and into program registers of the microprocessor 252.

Two control buses are carried on the cable 18 extending between the adaptor board 16 and the base housing 12. A first bus 272 includes a byte synch line, an address marker enable line, a read NRZ data serial by bit data line, write NRZ data serial by bit data line, a read/reference clock line, a write clock line, a read gate line, a write gate line and an index line. The NRZ write data mode is active when the write gate line is active and causes serial data to be sent from the sequencer 246 to the data separator 276 to be encoded and written onto a storage disk of the HDA 32 within the module 12. This data is clocked by the write clock signal on the write clock line. The NRZ read data mode is active when the read gate line is active and causes decoded data read from a selected disk of the module 14 serially from the data separator 276 to the sequencer 246. This data is clocked by the signal on the read reference clock line.

A second bus 274 comprises a microprocessor to microprocessor serial communications channel and enables the adaptor board microprocessor 252 to act as a master CPU in supervising up to two slave CPUs located at up to two base housings 12A and 12B, as illustrated in FIG. 7B. The serial channel 274 includes a transmit line from adaptor to base housing "TxD (c→d)", a transmit line from base housing to adaptor "TxD (d→c)", a serial data clock line (the microprocessor 252 generates the clock signal, and the slave processors on the base housings 12A and 12B use this clock signal as a reference during serial port control operations), an acknowledge line ACK (d→c) from base housing to adaptor, an acknowledge line ACK (c→d) from adaptor to base housing, an attention line to enable each slave processor to obtain the attention of the master processor 252 and a reset line by which the master 252 may reset each slave processor. A single drive select line is also included. A logical high value selects one of the base housings, while a logical low value selects the other one.

The drive select line, controlled by the controller 16, is used to select which of the two modules 14A, 14B is being addressed by the controller 16, since only one of the modules may have the attention of the controller at any one time.

The reset line is set up by the controller 16 and leads to the non-maskable interrupt (NMI) pin of the base unit microprocessor 282. It is used by the controller to reset the base unit in order to put it into a predetermined, known state. The line is normally kept high.

Handshaking between the controller processor 252 and the base unit processor 282 is accomplished over the acknowledge lines and the attention line. If the ACK (c→d) line is low while the reset line is pulsed, a full reinitialization of the base unit 12 firmware takes place, which requires about 3 milliseconds. While the base unit 12 is busy, the ACK (d→c) line will be high; when reinitialization is complete, the ACK (d→c) line will change to low.

If a module 14 is present in the base unit 12, the base unit will raise the attention line and, when requested by the controller processor 252, will deliver a LOAD message over the Tx (d→c) line, in which case the module 14 will be powered up again and reinitialized by execution of LOAD and INTAGC commands. This NMI procedure is used as a last resort to establish or reestablish communications between the controller 16 and the base unit 12.

If the ACK (c→d) line is high when a NMI occurs, the base unit will not perform a complete reinitialization, but will instead return to the normal default state, which is ready to receive the next command from the controller 16. This NMI takes about 100 microseconds and is used primarily to switch the base unit 12 out of the Input/Output or I/O mode.

Base Housing Circuit Board 116

The buses 272 and 274 extend from the adaptor board 16 via the cable 18 and plug 20 to the circuit board 116 of a base housing unit 12, there being two such housings depicted electrically within FIG. 7B. The first bus 272 makes connection to a data separator circuit 276 which converts NRZ data into variable length, run length limited (2,7 RLL) format data for recording on the data storage surfaces of the disk. 2,7 RLL data is put out directly from the data separator circuit 276 via a 2/7 Data Out line extending via the plug 120 and jack 35 to the head and disk assembly 32 within a hard disk module, such as the module 14A depicted in FIG. 7B.

This particular data separator circuit 276 supports a dual data rate, with a faster data rate for outer data cylinder locations, and with a slower data rate for inner data cylinder locations. Further details of the circuit 276 are described in the referenced U.S. patent application Ser. No. 07/052,709, filed on May 20, 1987, for Modular Unitary Disk File Subsystem Having Increased Data Storage Capacity.

A read channel circuit 278 provides suitable amplification and shaping for the 2,7 RLL data format signal read from the disk surface prior to data separation in the data separator circuit 276. A preamplifier circuit 280, such as the SSI 117, is located within the HDA 32 as taught in the referenced U.S. Pat. No. 4,639,863.

A base housing control microprocessor 282 is loosely coupled to the adaptor board microprocessor 252 via the serial data channel 274 in a slave to master distributed processor configuration (i.e. the slave processor 282 uses an attention line to gain the attention and obtain service from the master processor 252). Basically, the base housing control microprocessor 282 controls track seeking and track following operations of the head and disk assembly 32 within the module 14A. It employs an optical position servo circuit 284 which is periodically updated by once per revolution servo information read from the data surface. Servo signal processing is carried out within the servo circuit 284 acting under control of the microprocessor 282 in response to optical position signals P1 and P2 received from an optical position encoder 288 and from A/B servo burst information received from the data transducers and preamplifier circuit 280. Control signals are sent to the servo circuit 284 via a DAC data bus (DAC 0-7).

Control connections are made via the plug-jack connection between the module 14 and base unit 12 to a rotary actuator positioner 286, an optical position encoder 288 and a spindle motor speed control processor 290 which drives a brushless DC spindle motor, all of which elements are part of the HDA 32 shock-mounted within each module 14.

The base housing control microprocessor 282 includes a multiplexed address/data bus 293 which extends to a digital to analog converter 292 which provides an automatic gain control for the read channel 278. Addresses generated by the microprocessor 282 are separated by an address latch 294 and then presented to a firmware read only memory array 296 and to a random access memory 298. The read only memory 296 includes the control program routines executed by the microprocessor 282, and the random access memory 298 provides temporary storage for values required for positioning and track following servo operations. A logic gate 297 selects between the read only memory 296 and the random access memory 298.

A decoder 300 decodes signals on the three high order address lines put out by the microprocessor 282 (lines A13, A14 and A15) in order to control various operations occurring at the base housing 12A. One operation controlled and monitored by the base housing microprocessor 282 is the status of the hard disk module 14A, i.e. whether it is loaded into the base housing, and whether it is ready for data storage and retrieval operations. In order to determine the status of the module 14A with respect to the housing 12A, a tri-state latch 302 is selected by the decoder 300, and the latch 302 buffers data sent to a load/unload circuit 304 which controls load/unload operations of the base housing 12A and also selectively powers the indicator lamps 28 and 30. The circuit 304 is depicted in FIG. 8 and discussed hereinafter. Another tri-state latch 306 is connected to sense conditions within the base housing 12A, such as positions of the module switches 62 and 63. It also senses operation of the eject button 26, and the cartridge in and out switches 178 and 180.

The circuit 304 includes the motor driver chip 186, and it also includes four transistors 308, 310, 312 and 314, connected as shown in FIG. 8. These transistors, and a diode 316 provide a power path whenever supply voltage is lost to the base housing 12A, so that current from a battery 318 may be selected by operation of the eject switch 184 and passed through the circuit 186 in order to cause the motor 134 to unload the module 14A. In this way, the module 14A may be removed from the base housing 12A and be secured, or be transported to another system even though the primary power supply has failed or ceased for some reason at the base housing 12A.

Operation of Control Electronics

As previously explained, the function of the adaptor/supervisor microprocessor 252 is to supervise data transfers to and from each module 14 which may be included within the system 10. The function of the base unit microprocessor 282 is to control data transducer head positioning operations, and module load, spinup, spindown and eject operations.

The function of each module 14 and its HDA 32 is to provide the rotating data storage disks, provide disk motor speed regulation and speed feedback, provide head transducer positioning and both P1/P2 optical phase position feedback information and disk surface A/B servo burst centerline feedback information.

The serial command/status bus 274 enables command and status signals to be exchanged between the two processors 252 and 282 at a very high data transfer rate (500 kilobits per second). Each command is sent from the master microprocessor 252 at the controller 16 to the slave microprocessor 282 at the base unit 12, one command at a time, over the line TxD (c→d) in a serial by bit format with start and stop bits for each byte. Commands can be one to four bytes in length. The first byte is a function code. If the base unit acknowledge line (ACK (d→c) is high, then the base unit slave processor 282 is ready to receive a command.

In order to send a command, the master processor 252 sends the first command byte to the slave processor 282, which causes an interrupt of the slave processor 282. Then, a handshaking sequence is commenced between the two processors 252 and 282, until all of the command bytes of the sequence are sent. Depending upon the command sent, one of four actions will occur:

1) the slave processor 282 will execute the command and lower the ACK (d→c) line to indicate ready;

2) the master processor 252 will send one or more bytes (depending upon the command) to the slave processor 282; the slave processor 282 thereupon will execute the command and lower the ACK (d→c) line;

3) the slave processor 282 will send one or more bytes (depending upon the command) to the master processor and the slave processor 282 will execute the command and lower the ACK (d→c) line; or 4) the slave processor 282 will perform any tasks required by the command, enter a special I/O mode, and lower ACK (d→c) to indicate ready to read or write.

For example, a read command includes an implied seek command which causes the HDA to seek to a predetermined cylinder location. This command also includes a head select. Once the desired cylinder has been reached and desired head has been selected, the base unit 12 enters the I/O mode which enables interrupts in the slave processor 282 in response to toggles present on the ACK (c→d) line. If the master processor 252 toggles the ACK (c→d) line while the slave processor 282 is in the I/O mode, the HDA will automatically advance to the next head or cylinder, thereby performing a one track seek. When the one track seek is completed, the slave processor 282 will lower its ACK (d→c) line, thereby signalling it is now ready for further read/write operations.

The following 37 commands are available to the master microprocessor 252 and are executed by the slave microprocessor 282 at the base unit:

HNOCMD: 0=Null Command; this command does nothing whatsoever.

HSEEK: 1=Seek Command; this command causes a seek to a specified track. When seek is complete, the base unit HDA 32 enters a normal on-track fine servoing mode wherein head 0 is selected.

HRECAL: 2=Recalibrate to Track Zero; when the mode flag is zero, this command causes a 253 track fast outward seek, finds the outer crash stop, then steps in to the second track which has both A and B servo bursts present, which is nominal track zero. If that track cannot be located, this routine finds the outer crash stop and then steps in six tracks as determined by optical phases of the optical encoder 288. When the mode flag is one, an attempt is made to adjust the read amplitude before the initial seek operation. Also, if track zero cannot be located, this routing first commands a 200 track slow outward seek before looking for the outer crash stop.

INFO: 3=(reserved)

GETMSG: 4=Get Message; This routine returns a one byte attention message. Messages have the following meanings:

0: No message. This response will be returned if there are no messages in this drive's particular message slot or register.

1: Eject Button Pushed. This message indicates that the eject button 26 of the base unit 12 has been depressed.

2: No HDA Present. This message indicates that the controller 16 has issued a command to a base unit 12, but that no cartridge 14 is present. Alternatively, it signals that the HDA has been bumped or shocked so severely that it can no longer servo to a data track centerline and therefore will not perform any drive commands until a LOAD command has been issued and executed.

3: Reset. This message indicates that a catastrophic HDA error has occurred so that the HDA can no longer servo on track. A LOAD command must be issued and executed.

4: Parity or Overrun. This message indicates that a parity error or data overrun has occurred during a command transmission sequence. The command is then reissued.

5: (reserved)

6: Bump. This message is generated only during execution of one of the write commands; and, it indicates that the transducer heads have been bumped too far offtrack. The write gate will thereupon be disabled. The controller 16 must issue a short NMI reset and reissue the I/O command to enter I/O mode.

7: Checksum Error: This message indicates that a drive diagnostics routine has found a checksum error.

8: Load. This message indicates that a module 12 has been detected as properly installed in the base unit 14. The appropriate response is for the controller 16 to issue the LOAD command to spin the storage disks up to operating speed and initialize the HDA 32. Afterwards, an interrupt agc or INTAGC command should be issued in order to initialize the agc for the particular HDA 32.

9: Attention Skipped. This message indicates that the base unit 12 has a message in its message register and that the controller has issued a command other than GETMSG. The controller must then issue another GETMSG command in order to get the original message.

DRDIAG: 5=Diagnostic; this routine performs a checksum of the base unit firmware ROM 296. If the least significant bit of the result is non-zero, the attention line will be raised and a checksum error message will be placed in the base unit message register for pickup by the controller.

RDTS: 6=Read Distance to Stop; this diagnostic routine is used to check the operation of the aerodynamic shipping latch within the particular HDA if a jumper which disables the A/B servo bursts is installed. The routine returns the number of tracks traversed from the inner crash stop to the point of highest resistance against further outward movement of the actuator structure presented by the aerodynamically released actuator. Thus, this routine is available to ascertain that the airlock effectively locks the actuator structure after the disks are spun down.

RREG: 7=Read 256 Registers; this routine returns the 256 byte values contained in the working registers of the base unit processor 282.

MICSTP: 8=Microstep Actuator this routine, if called after execution of a disable servos command (DISSRV) moves the head transducer actuator by a DAC step amount in a particular direction.

READAB: 9=Read "A" and "B" Servo Burst Amplitudes; this routine returns two bytes to the controller. The first byte is A burst amplitude; and, the second byte is B burst amplitude.

WREG: A=Write 256 Registers; this routine accepts 256 byts from the controller 16 and stores them sequentially in the working registers of the base unit microprocessor 282.

---: B=(reserved)

INDTIM: C=Index Timing; this routine returns the index-to-time in microseconds as a two byte value.

RP1P2: D=Read P1 and P2 Encoder Position Phases. The first byte returned is the last saved P1 encoder position value; and, the second byte returned is the last saved P2 encoder position value.

RDPEEK: E=Read Signal Amplitude; this routine takes the average of 128 sample analog to digital conversions of the read signal and returns a one byte average amplitude value.

INTAGC: F=Initialize 5 Zone by 4 Phase AGC Table; this routine initializes the automatic gain circuitry and prediction tables put out by the microprocessor 282 via the DAC 292 for all five data zones and all four derived phases of the optical encoder.

ENASRV: 10=Enable Servos; this routine enables the A/B servo burst fine servo process within the HDA 32.

DISSRV: 11=Disable Servos; this routine disables the A/B servo burst fine servo process within the HDA 32.

DASIZ: 12=Determine HDA Size; this routine determines and reports the data storage capacity of the HDA loaded into the base unit 12 (either 20 MB or 40 MB).

ENAGSW: 13=Enable Quad Phase Switching; this routine enables quad switching among the four phases of the optical encoder.

DISGSW: 14=Disable Quad Switching; this routine disables quad switching.

NXTGD: 15=Go To Next Quad Boundary; this routine causes the actuator to be moved to the next quad phase boundary.

SRVHD: 16=Allow Servoing on Selected Head; this routine enables the A/B fine servo bursts to be read on the data surface and location being followed by the currently selected head.

GRD: 17=Group Read; this routine returns two bytes to the controller 16. The first byte contains the contents of a group read register; and, the second byte contains the contents of a group write register. Bit positions of the group read register indicate whether the HDA is home; whether it is present; the positions of the module switches 62 and 63, the status of the eject button latch and whether a local mode jumper has been installed on the base unit, (which is used during manufacturing). Bit positions of the group write register indicate disk spinup, operation of the LED's 28 and 30, load and unload the module 12, clear the eject latch, and write enable.

GWR: 18=Group Write; this routine places the base unit 12 into a manual mode until another group write command having an argument of 255 is sent. While in the manual mode, fine servoing is disabled (providing an HDA 32 is actually powered up), and all functions supported by the group write register are entirely under manual control by issuing subsequent group write commands during a GWR sequence. Each group write command writes a value to the group write register of the base unit 12.

WDG: 19=Write Data and Protect Servo Wedge; this command places the base unit 12 in the I/O mode. Command execution causes: the fine servos to be disabled, a seek to be made to the specified track, a selection of the specified head, location of the track centerline via the A/B fine servo burst servo process, and protection of the wedge servo areas of the selected surface. At the end of command execution, the ACK(d→c) line is lowered, thereby indicating that the drive is ready for data write operations. This command is executed specifically pursuant to the host format track command.

WDGERA: 1A=Write Data, Protect Wedge, Enable Erase; this command is the same as the WDG command except that the erase line is active so that whatever is attempted to be written will instead be erased. This command is invoked specifically during the host erase data and host erase area commands.

RDDAC: 1B=Read DAC Value for Read Channel; this command obtains a readout of the current value set into the DAC 292 for the present track and zone. The current DAC value establishes read channel gain level.

RDAC: 1C=Write AGC DAC; this command writes a specified value to the DAC 292 and updates the table of DAC values so that every time the heads land in the current track and zone, the same DAC value will be used to set the read channel amplitude.

TRKSET: 1D=Set The Track Number; this command updates the current track counter with the specified new track number. In this manner the controller 16 may read track addresses via the data sequencer/memory controller 246 and inform the base unit 12 of the physical track number of the track actually being followed, in the unlikely event that the base unit 12 loses track of the correct track number.

UNLOAD: 1E=Unload the Fixed Disk Module; this command turns off the spindle motor 290, waits a specified number of seconds until the disks spin down and the actuator structure moves to its inner parking location and is locked by the aerodynamic latch, turns on the load/unload motor 134 for a predetermined time period and then reverses the motor 134 for a brief interval to prevent gear lockup.

LDDEF: 1F=Load HDA Using Default Parameters; this command operates the motor 134 to load the module 14, waiting 500 milliseconds after detecting "home" position before reversing the motor 134 for e.g. 50 milliseconds. Then, the spindle motor 290 is turned on, and the head actuator is moved into alignment with track zero and the A/B fine servo track following process is enabled.

RDDAT: 20=Read Data; this command places the base unit 12 in the I/O mode. The base unit disables the fine servo process, seeks to a specified track, selects a specified head, servos to track centerline using the A/B fine servo process and lowers the ACK(d→c) line to indicate that the HDA is ready for data read operations.

WRDAT: 21=Write Data; this command places the base unit 12 in the I/O mode. The base unit disables the fine servo process, seeks to a specified track, selects a specified head, servos to track centerline using the A/B fine servo process, enables the write gate and lowers the ACK(d→c) line to indicate that the HDA is ready for writing.

LOAD: 22=Load and Spinup a new HDA Module; this command loads a module 14, enables the disk spindle motor and causes the head actuator structure to seek to track zero with the A/B fine position servo process enabled.

RDNSK: 23=Read Data With No Implied Seek; this command places the base unit 12 into the I/O mode; first disables the fine servo process, selects the currently specified head and lowers the ACK(d→c) line to indicate ready for reading. This command is primarily used to facilitate the host read ID command.

WERA: 24=Write Data with Erase; this command places the base unit 12 into I/O mode, first disables the fine servo process, seeks to a specified track, selects a specified head, finds track center via the fine servo process, enables the write gate, enables the erase line, and lowers the ACK(d→c) line to indicate ready for writing. This command facilitates the host erase track command which erases an entire track including the servo burst information in the servo wedge.

BLINK: 25=Blink the LEDS 28 and 30; this command blinks the indicator LED's 28 and 30 in accordance with predetermined blink mode arguments. The lamps may be blinked alternatively, or one at a time or simultaneously, in order to enable diagnostic information feedback, as well as to communicate activity status to the user.

HOME: 26=Quick Recalibration; this command causes the drive to find the outer crash stop, step inward to the second track containing the A/B servo bursts (nominally track zero). This command is much faster than a LOAD command, and is the quickest mechanism for recovery following receipt at the controller of a RESET attention message (e.g. after a severe bump has occurred).

ENAEJT: 27=Enable Check for Eject in I/O Mode; this command is provided to enable the base unit 12 to check for eject switch actuation during the track-incrementing interrupt operational mode. It is possible to keep the base unit 12 so busy reading and writing user data that it has very little time to spend in the main servo loop which monitors the eject switch. This command forces the base unit 12 to monitor a flag set by depressing the eject button 26.

PLOAD: 28=Pulsed LOAD; this command inserts the module 14 into the base unit 12 until home position is detected; cycles the module load line controlling the load/unload motor 134 according to the arguments specified, reverses the load gears to prevent gear lockup and then turns on the spindle motor and causes a seek to track zero with fine servoing enabled. This command cycles or pulses the motor 134 to lessen the motor torque when the socket 35 of the module 14 is being pulled into plug-in engagement with the plug 120 of the base unit 12.

Each of the foregoing commands is decoded at the slave processor 282 into a program memory address value, and the routine pointed to by the address value is then called and executed, one command at a time. A command completion routine is executed at the end of each command routine execution. Only when the command completion routine has been completed does the HDA of the module 14 enter into the I/O mode.

Handshaking between the master controller 252 and slave controller 282 is coordinated by the logic levels of the two acknowledge lines of the control bus 274, for both the command sequence mode and for the I/O mode, as shown in FIG. 9. The reset line of the control bus 274 causes a non-maskable interrupt (NMI) at the slave processor 282. This NMI causes the base unit to leave the I/O mode and enter the command sequence mode. While the base unit 12 is in the I/O mode, the HDA is commanded to remain on track, and data transfers over the NRZ read data and write data lines are handled by the data sequencer/memory controller 246 via the Byte Sync line, the Address Mark Enable line, the Read Reference Clock line, the Write Clock line, the Read Gate line, the Write Gate line and the Index pulse line of the bus 272. Whenever the base unit 12 desires to obtain the attention of the controller 16, it drops the attention line.

Since the controller 16 acts as a master, and the base unit 12 acts as a slave, the controller may send a command byte to the base unit at any time. However, the base unit may send a status or data byte to the controller only after it is requested by the controller to do so. Before sending a command to the base unit 12, the controller 16 must determine if the base unit 12 is on line and ready. If the ACK (d→c) and attention lines are both high, the base unit 12 is not powered up, the cable 18 is not connected, or the base unit has just raised its attention line but has not yet become ready to receive a new command. If the ACK (d→c) line is high, and the attention line is low, the base unit 12 is busy executing a command or is executing its power on routine; when the base unit finishes, it will drop its ACK (d→c) line.

If the ACK (d→c) line is low and the attention line is high, the base unit 12 is ready for the next command and the attention flag is up. The only valid command accepted by the base unit will be "get message". If any other command is sent, the attention line will be set high once again. A subsequent "get message" will produce an "attention skipped" message. One more "get message" will retrieve the original message. After any "get message" command completes successfully, the attention line will be lowered, even if the message is "attention skipped".

If the ACK (d→c) line is low and the attention line is low, the base unit 12 is in its normal ready mode. There is no attention message pending and the base unit 12 is ready to receive a command from the controller 16.

Normally, when a module 14 is present in the base unit 12 and ready, the base unit 12 spends its time in a main loop supervising the A/B burst based fine position servo process and monitoring the status of the eject switch 26. After certain commands are sent, the base unit 12 will enter the I/O mode and will indicate a readiness for reading or writing user data by dropping the ACK (d→c) line. For all other commands, the lowered ACK (d→c) line signals command execution completion. The read commands which place the base unit into I/O mode are Read Data (RDDAT) and Read Data with No Implied Seek (RDNSK). The write commands which place the base unit into I/O mode are Write Data (WRDAT), Write Data and Protect Servo Wedge (WDG), and Write Data, Protect Wedge, and Erase (WDGERA).

While in the I/O mode, the current head is selected, the fine servo process is disabled with servoing performed off of the P1 and P2 phases of the encoder. If writing is being performed, a continual check is made for bumps or shocks which knock the head out of track centerline alignment. The ACK (c→d) line will, when pulsed (active low to high) for at least 3 microseconds, cause an interrupt to the base unit which will raise the ACK (d→c) line to indicate busy, select the next head (or seek to the next cylinder and select head 0), and lower the ACK (d→c) line to indicate ready for read/write operations. This mode greatly reduces the amount of time required to have the base unit ready to read successive tracks.

While in the I/O mode, there are two messages that can occur: "reset" and "bump". Reset will happen if the module 14 in the base unit 12 cannot stabilize during a seek to another cylinder location. Bump will occur only during a write operation and can occur as a result of a very small head movement relative to the cylinder location. The "bump" message, given only during a write operation, results in a seek back to the beginning of the sector and a rewrite of the sector. If the attention line becomes active during an I/O command, the base unit 12 is given a short NMI, followed by a Get Message (GETMSG) command to retrieve the message. If the HDA does not spin up, then an "Eject Button 26 Has Been Pressed" status byte is returned to the master processor 252.

Supervisor Command Routine 400

FIG. 10 sets forth a flow chart of a command routine 400 showing how the master microprocessor 252 sends a command to one of the slave microprocessors 282 located in a selected base unit 12. The command routine 400 is entered at an entry node 402. First, the ACK (d→c) line is checked to see if it is low, indicating that the slave processor is ready to receive a command. If this line is high, the program loops about the node 402 until this line is sensed as low.

If the ACK (d→c) line is low, the attention line is then checked at a node 406 to see if it is low. If the attention line is high, the process handles the attention line at a process 416 and exits the command routine at an exit node 418. If the attention line is low, a process node 408 is reached in which the ACK (c→d) line is dropped low and the first byte of the command is sent serially out over the TxD (c→d) line to the slave microprocessor 282. The master processor 252 then enters a logical node 410 which tests whether the ACK (d→c) line has gone high to signal receipt of the first byte. Until it does, the process loops about the node 410.

After the ACK (d→c) line has been detected as going high at the node 410, the attention line is again checked at a node 412. If the attention line is high, the process handles the attention condition at the node 416 and exits at the node 418. If the attention line is low, as tested at the node 412, the ACK (c→d) line is then driven high at a node 414.

A node 420 tests if there are further command bytes in this particular command to be sent. If so, the command routine returns to the node 404. If not, the command routine is exited at the exit node 418.

Slave Command Response Processes

Figure 11A:
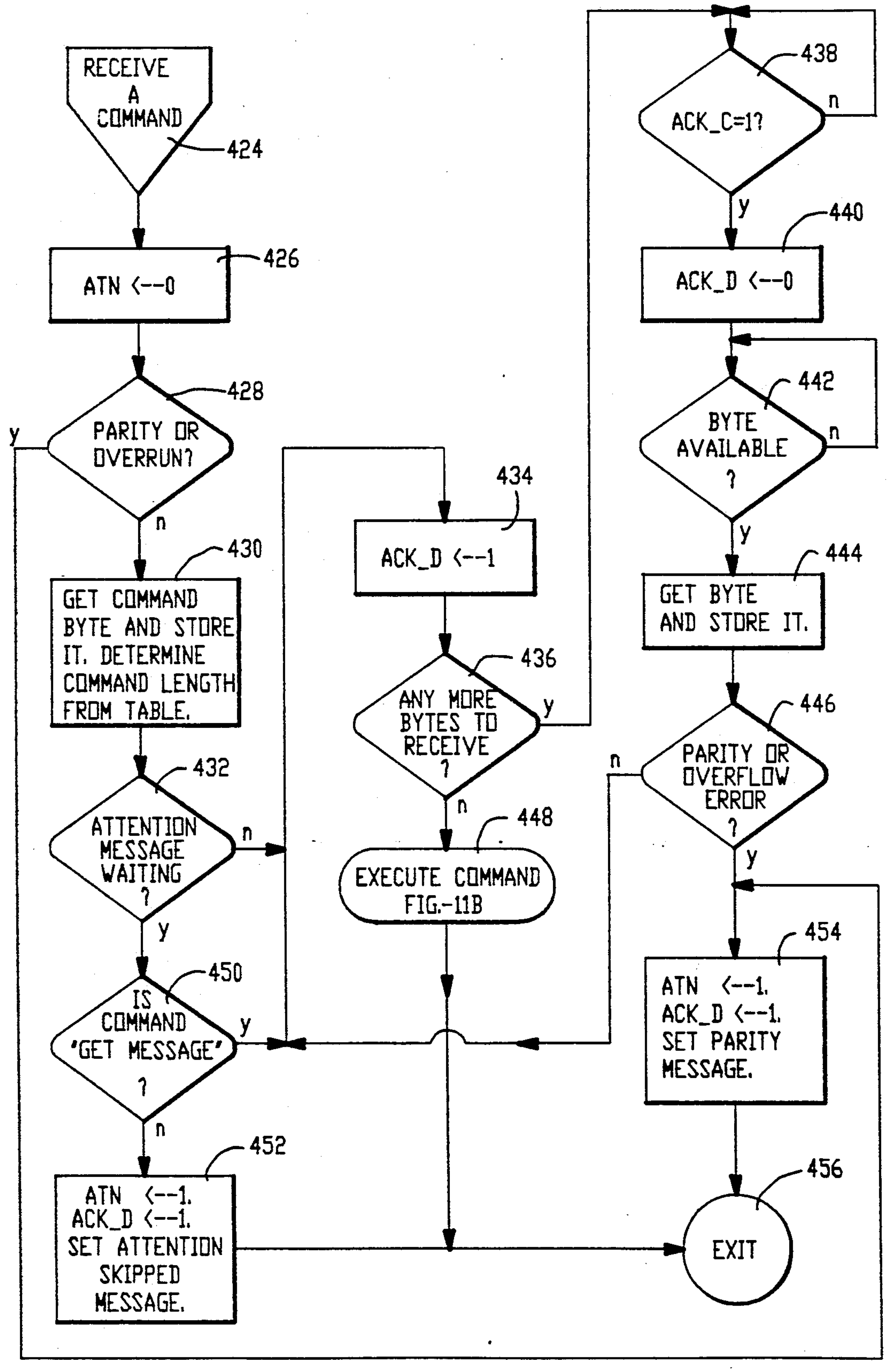

FIGS. 11A, 11B, 11C, and 11D flowchart the command response processes executed by the slave microprocessor 282 in response to each command sent by the master microprocessor 252. FIG. 11A sets forth a receive command process 422.

The command receive process 422 is entered at an entry node 424. The first step in this process 422 is to set the attention line low, and this is accomplished at a process node 426. A logical node 428 tests whether there are parity or overrun errors. If so, a branch is made to a node 454 which sets the attention line high, which sets the ACK (d→c) line high and which sets the parity message. The command receive process is then exited at an exit node 456.

If there are no parity or bit overrun errors as tested at the node 428, a process node 430 then obtains the command byte and stores it in a regiser. It then decodes the first byte and determines from a lookup table the length in bytes of this particular command. Next, a logical node 432 determines whether an attention message is waiting. If not, a process node 434 sets the ACK (d→c) line to a high level, and a logical node 436 then determines if further bytes are to be received in the present command sequence. If there are further bytes to be obtained, a logical node 438 tests if the ACK (c→d) line is high. If it is not high, the process waits at this logical node 438 until it is low. Once the ACK (c→d) line is found to be high, then the ACK (d→c) line is lowered at a process node 440. A logical node 442 determines if the next byte is available and waits until it is. Once the next byte is available, a process node 444 obtains the byte and stores it in a register. The logical node 446 is then entered for to determine if a parity or overflow error has occurred. If so, the node 454 is entered. If not, a return is made to the process node 434, and this loop is repeated until all bytes of the command sequence have been received and stored.

When all of the command sequence bytes have been received, an execute command routine 448 is entered. When it is completed, a return is made, and the process is exited at the exit node 456.

Figure 11B:
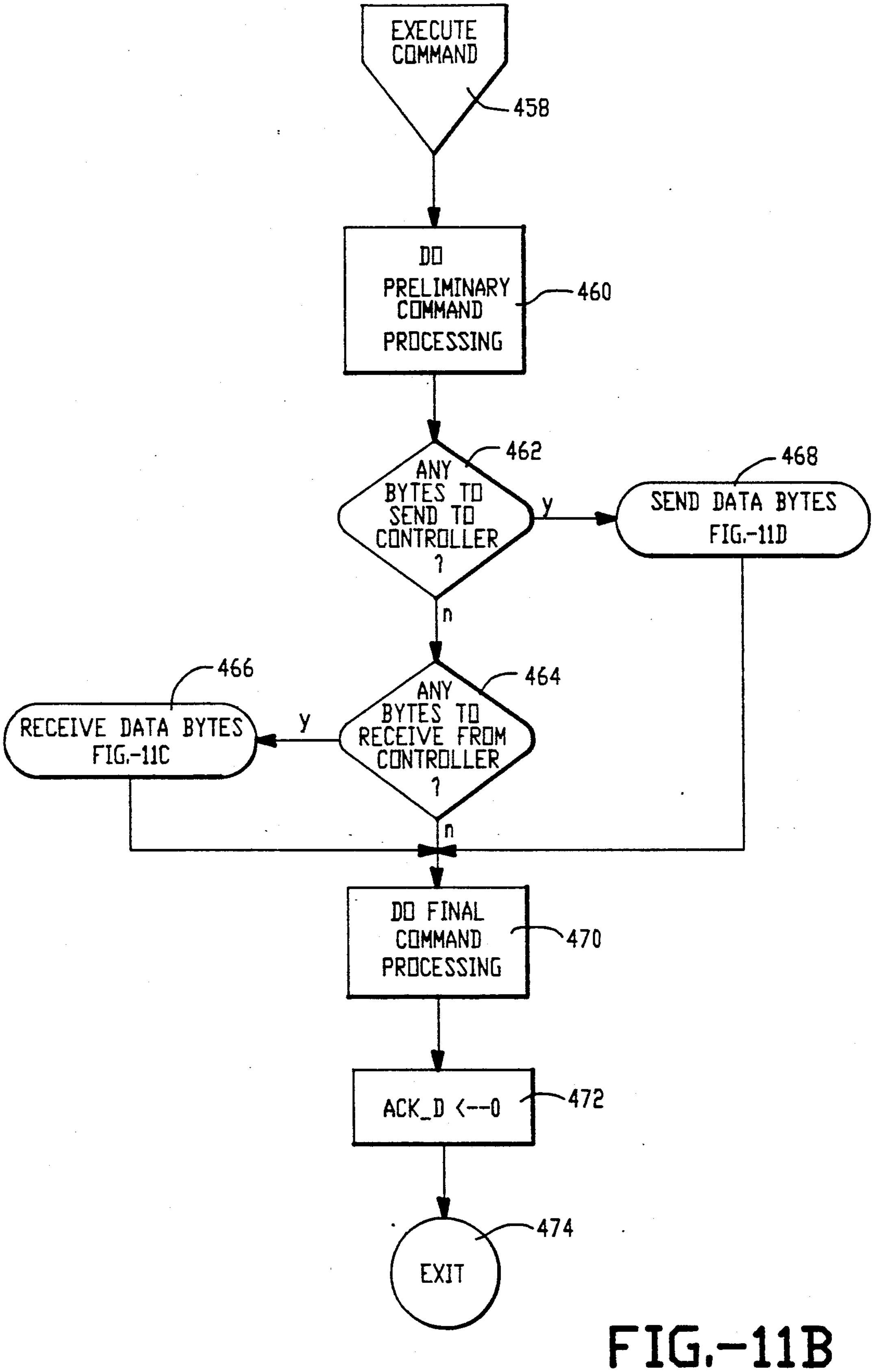

The execute command routine 448, FIG. 11B, is entered at an entry point 458. A process node 460 performs preliminary command processing, such as generating and putting out to the loaded HDA 32 the signals needed to move its actuator structure to a destination cylinder location and to switch to the desired head in order to select a data track. A logical node 462 then tests if there are any bytes to be sent to the supervisory processor 252. If not, then a logical node 464 tests if there are any data bytes to be received from the controller processor 252.

If, as a result of command execution, there are data bytes to be received from the controller board 16, a receive data bytes routine 466 is called. Correspondingly, if there are data bytes to be sent to the controller, a send data bytes routine 468 is called. If there are neither bytes to send nor receive, a process block 470 is entered which performs any final command processing. Once command execution is completed, a process node 472 sets the ACK (d→c) line to a logical low value and the command execution routine is exited at an exit node 474, which causes a return to the receive command routine 422 and an immediate exit at its exit node 456.

Figure 11C:
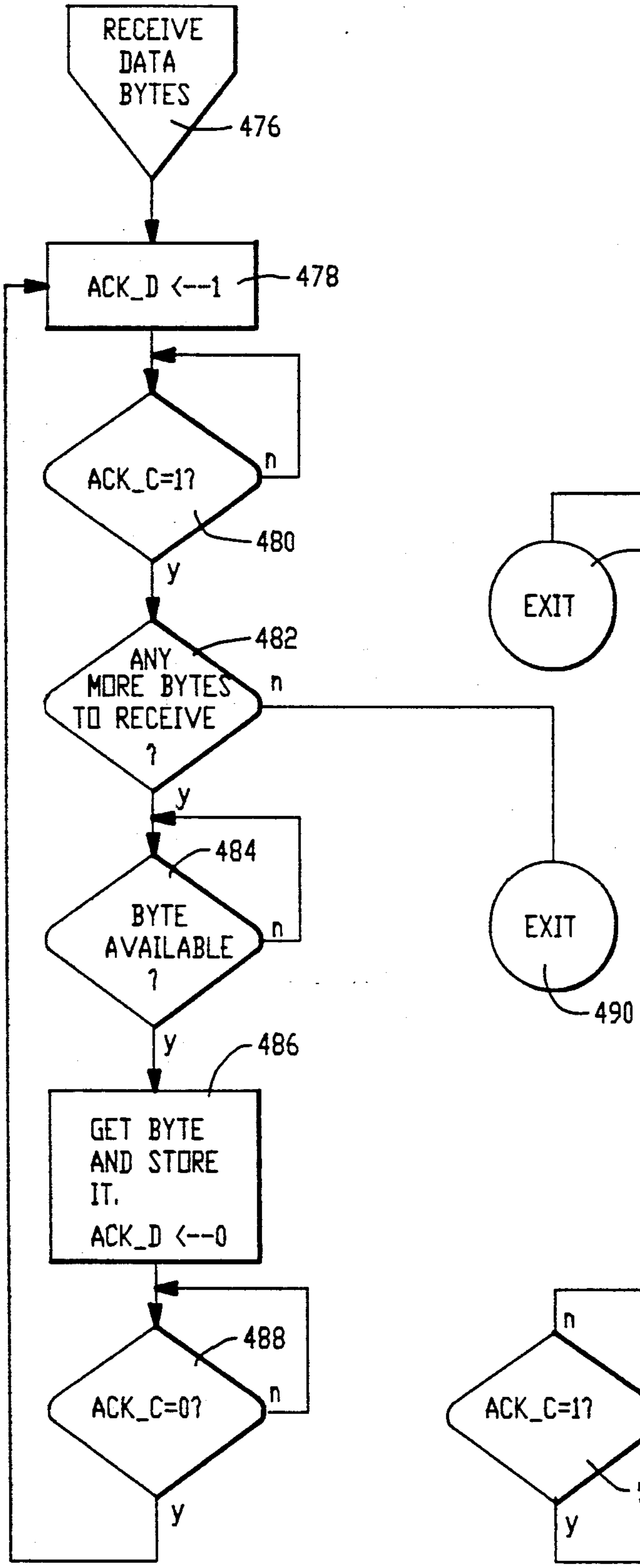

The receive data byte routine 466, FIG. 11C, is entered at an entry point 476. A process node 478 sets the ACK (d→c) line high. A logical node 480 monitors the ACK (c→d) line and waits until it has become high. A logical node 482 tests whether any more bytes are to be received. If not, this routine is exited at an exit node 490. If so, a logical node 484 waits until the next byte is available. A process step 486 then obtains the byte and stores it in a register and then sets the ACK (d→c) line to logical low. A logical node monitors the ACK (c→d) line and when it becomes low, a return is made to the step 478. The receive data bytes routine 466 is repeated until all of the data bytes have been received and loaded into appropriate storage registers of the slave microprocessor 282.

Figure 11D:
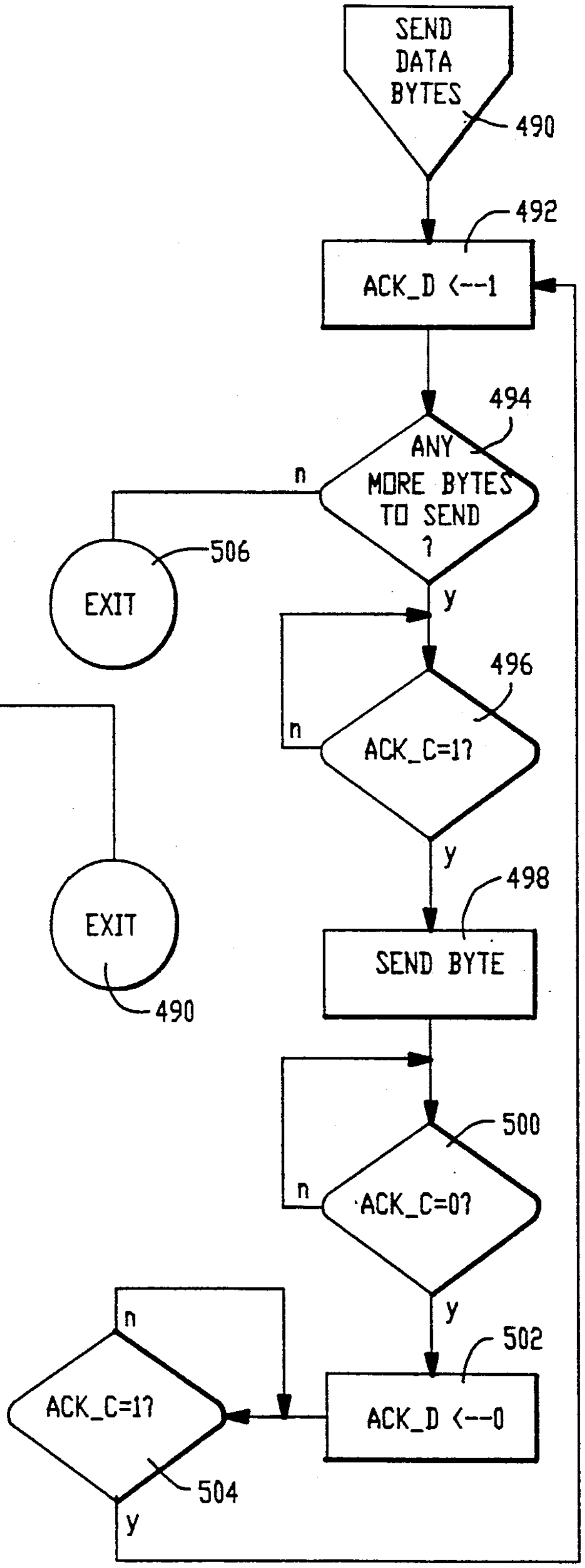

The send data bytes routine 468, FIG. 11D, begins at an entry point 490. A process node sets the ACK (d→c) line to a high level, and a logical node 494 tests whether any additional data bytes are to be sent. If not, this routine is exited at an exit node 506. If so, a logical node 496 monitors the ACK (c→d) line until it becomes logical high. When that happens, a process block 498 sends the next data byte awaiting transmission to the master processor 252. A logical node 500 monitors the ACK (c→d) line until it goes low, whereupon the ACK (d→c) line is set low at a process block 502. A logical node 504 monitors the ACK (c→d) line and returns process flow to the block 492 when this line goes high. The send data bytes routine 468 is repeated until all of the data bytes have been sent to the master microprocessor 252. The following hexadecimal listing is in the Tektronics format and is resident within the firmware ROM 266 of the adaptor unit 16.

Docket H-761-P

The following hexadecimal listing is in the Tektronics format and is resident within the firmware ROM 266 of the adaptor unit 16.

```
/0000100154CF000054380300000000000000000003B
/00101002545FFF00000812880000000000000000056
/002010030000000000000000000000000000000000
/00301004046043 6F70797269676874203139383 7A2
/004010052C383820504C555320446576 2E20436F9D
/0050100672702E641F10641908B0B1B2B3B405029F
/00601007FE645901150201AA400907645F084E46A9
/007010085A034E0C40BE165A034E224844F64E15BD
/008010095F024E191489045E02140B0548295F02A3
/0090100A4E0B4844EF6419084009074FCE1068FFD8
/00A0100B10641F08345300703E60FF0502F9050395
/00B0100CFC581A405B035802C5644901C4C66459BC
/00C0100D01408E2FA4A3A2A1A0BA640FEFAA6264D9
/00D0100E010069604DD3641984690 84DD068FF10B9
/00E0100F68FF1004FFFF69F870790D8071010140CD
/00F010104C050501FEAA640FEF550504F9641F10C8
/01001002408E2F640FEF551B014E716459204E05C3
/011010036449404FE1551B804E0A14030040602F9A
/01201004151B80C8301D4FCE301E4FCA14000170B4
/013010051E1DFF405703140300 40602F6449204F9D
/01401006B5645940DF641F10405E2E4E2A640FEFDE
/01501007151B01051B7F711A00641F104075036485
/016010080FEF4F92641F1040FD2D4E0B640FEF15ED
/017010091B01051B7F4F7F640FEF4F7A641F104CE2
/0180100AC1581A4E3157205402025740D8640FEFB1
/0190100B6900141A0440682DC3540202051BFC7194
/01A0100C1A0054F600051CBF301D4F4A301E4F46B6
/01B0100D151C4054020247 20D357404E42051AC186
/01C0100E641F10406C03640FEF54F6004740DB64B9
/01D0100F0FEF6900148214406 82DC354F6004057AD
/01E010100314030040602F54F600640FEF6900148E
/01F010111A0440682DC354F600051BFC54F60054B0
/02001003F600591AD25E1CC940570314030040 6097
/021010042F711A0054260 3640FEF5A1A4EC76459C5
/02201005404E2E405E2ED27701CF051AC1641F10BE
/0230100640890364 0FEF54F600711A00641F10409E
/024010075703640FEF6900143B0140682D0054F6A7
/0250100800551C404FB2551C024E58641F1040FDAE
/026010092D4FD6640FEF744B01C6711A0054F600C9
/0270100A151A80051BBF745B10151B4040FD304EAB
/0280100B5C645920CD151C0214D449701E1DFF54C7
/0290100CF600551A20051CFD591C4E2B641F1071B7
/02A0100D200F6B0040C22C4F9014342C701E1DFFBA
/02B0100E54F600151B08711000140000701E0EFF88
/02C0100F701E14FF40602A551B02C9151C01051CA2
/02D01010F7151B02051CFD711A0054F600451A18A6
/02E010114F5754F6005B1AD3645940CA405E2E00C1
/02F01012408903 54F600711A004E2B5C1A4E235EAE
/03001004 1ADB051AEF151A04551A804F6F641F10C5
/03101005711A0040C10300640FEF54F600711A008E
/032010064E04711A00C064594054F600051A015489
/03301007BD01405B0354060159054E0F1110A2A18E
/034010086A4BA36F03B3B1B211106204FFFF0501BC
/03501009FE404C0554F500641910C36409EF6419BB
```

/0360100A02B06901407C2FA06409FDB8405E2EC1C5
/0370100BC4711A00B867014E1067084E4467034EA8
/0380100C3C67024E38711A00B8151A096B19B114A7
/0390100D0C0540C710C3A1B8B14057031403004081
/03A0100E602F644920CC645940C8405E2EC4448ECD
/03B0100F03C3449803A1534828711A00B8711A659B
/03C01010C3711A456B32B15D1AD37120266B0040A1
/03D01011C22C4E2714181B701E1DFFA1B8551B02C9
/03E01012CE40FD2D4E33051BDF744B01151B206BCE
/03F01013286A326914408F10C2A1B8A1B1405703A5
/04001005051ADF14030040602F644920CC6459409C
/04101006C8405E2EC444C603C344FC03A1534828C6
/04201007711A00B86419100502F714FFFF701E91B9
/04301008FF1502026409EF6B00644920B853FA05BB
/04401009027FB86459204E276459204E22645920AA
/0450100A4E1D6459204E186459204E136459204EB1
/0460100B0E6459204E096459204E04644920D0059E
/0470100C02FD150204645940540B0505027BB8308E
/0480100D91B83092B805027FB87069108047014EAB
/0490100E4D7069108047014E457069108047014E94
/04A0100F3D7069108047014E357069108047014E92
/04B010102D7069108047014E257069108047014E90
/04C010111D7069108047014E157069108047014E8E
/04D010120D3099B8309AB840501E05023FB80502A9
/04E01013BF5502104E215503014E1C701F10807494
/04F010146B00C24E1201115501084174F8124E078D
/05001006400B2EC354240405027FB855020254438F
/0510100704550301C35C02C405027FB80111550182
/05201008084174E01267004FD76396407A20690BA6
/05301009340000403D1E1502400193070F64580272
/0540100A1710639314FFFF701E99FFB86406FF64F0
/0550100B07FF58014E2864008069014DD26402009D
/0560100C69DA4DD4690F4DD1A46BFE3400FF2401ED
/0570100DFF69003B3104FFFFB47101014E4B68FFE5
/0580100E1068FF106400806409E16419846402008E
/0590100F6B683442FF2443FF69003B3140501E48BA
/05A010104300484400484900484B00484100484272
/05B0101100484500484600484A0005014B71020064
/05C0101271030005048005053E715F543453007072
/05D010133E60FF71AAD5702F3000702E9FFF7162DB
/05E010140B409B3040AC2F69FD4DCA690E4DC955F0
/05F0101501014E44645901408E2F051CC93400008E
/06001007703E24FF703E26FF581B4E27551A084EDD
/06101008225A1AC4405703D56900148A6640682DA6
/06201009CC405B036900143B0140682D00711A0086
/0630100A7134006449014FBFB8F008BD096422FAC6
/0640100B08BC091A1BBC09BC09FE116422F315D6D7
/0650100C2E1609080994096C096422642264226496
/0660100D2264226422642264226422642264226470
/0670100E226422642264226422B60F940CBB0F64A4
/0680100F22E90F0610A10C240F0B105610E50A369B
/069010100B64228510BF1004111F113A1143111376
/06A010111C1A1D4C115411BA1CBC1DD00C5C1165C1
/06B01012116E1177111A1C251D170D801189119B9B
/06C01013119211A411C311CC11D90864226422C292
/06D0101408DD081F1B981B4B0BDF0BC40A0E0B6BE8
/06E010150A970A64226422820C980C210B6422879E
/06F010160A8F0ABF0AF90E450F4A0F4F0F640F94F2
/070010080F990F9E0FAC0FB10F34A3FF14050070D9
/071010091E49FF4038286409F70501FB0504FE34C9
/0720100A06FF01A63D01A51A4835483548350703A6
/0730100B3D01A4070F3D0A073F3B01A7634B5F02B6
/0740100C4E2A5DA4C5644901DDC4645901D801A3CD
/0750100D7708CB7506FF4E507507034E4BC86705D1
/0760100E4E4667004E42406721004E2E5A034E38A6
/0770100F5DA4C5644901D9C4645901D401A3770ABF
/07801010CB7506FF4E227507034E1DC467004E18CB
/0790101140BE16550304F9405B031068FF10641FAC
/07A0101208345300703E60FF40812F701FA3FF74BE
/07B010136B03CE6B00701E24FF701FA5FF701E26DB
/07C01014FF44390601A32747CC44C90637E0C469CC
/07D01015204E0E071F48257041B74883B54829C1B5
/07E01016C815010474982463245505084E2744008A
/07F0101700701FDCFF74FD1505085505084E1601B9
/08001009AA460737DC69AB63AA1D6CFF34A3FF6B0A
/0810100A053101243A01A407205501041702641962
/0820100B08404E2865A3034E8C3427FF5A014E85C6
/0830100C58044E817467026A005B01CA011174F8A2
/0840100D12C430126A800A3D32551B104E16701F97
/0850100E12FF4826742B10C442746311A5B6701FB1
/0860100F14FF4E3D701F14FFA514A00174E5096AD5
/08701010705A1B6A38482E701F12FF6900745A02BC
/088010114638745A01461C70410B70416911483D97
/089010121D69085A1B6904483D1C0944A0017041A4
/08A01013B50B3F0A0703482A48314831483160C5A0
/08B010143F2B609C3B6409F76418806409FB6419CD
/08C0101504B840142AB87120056B0040C22CB84096
/08D01016762D5466227700B8B9718E00B9690034B2
/08E01017000044004070C574FFFB6700B96931B8AE
/08F0101840142AB8591AB96908B83424FF140300B2
/0900100A701E49FF404328B93465FF140000701EB5
/0910100B49FF404328B94060281E4060281F6B05B1
/0920100C40602853FB5901B9703E16FF370C690BC6
/0930100D6362409B30703F16FFA714A00174BDC5BF
/0940100E703E18FFB9743E03F774E5096A885A1BEA
/0950100F6A44482E6A705A1B6A38483E24A00174BA
/09601010C66901747A007041B74FD5B90195718EC2
/09701011001A40C22844000014FFFF6408BF6418AF
/09801012406458014E0A1374FDF7691A6408BFB8D2
/099010136408BFB90195718E001A40C2284400009C
/09A0101414FFFF6408BF6418406458014E0A1374C7
/09B01015FDF7691A6408BFB86408BFB9B940142AF4
/09C01016B8051CF94CC7641F10B071480440422BB5
/09D010174E5767044E8FA04DC7B0340401703E14BA
/09E01018FF641F1040BE2E4E7CA04DC7B0641F10DF
/09F01019712002690158 1A690063216B0140C22C81
/0A00100B4E63A04DC7551A01B9B0690814EB0740BE
/0A10100C682D4E51140000701E0EFF711000701E9B
/0A20100D14FF40602AA04DC7B9403420A04DC7B0C1
/0A30100E581ACB551B08C7151C02A04DC7B9703FD0
/0A40100F0EFFA7340000703E14FF74EF4FEC5A1CF0
/0A501010C24E12151C04641F1040BE2EC24F6B58C1
/0A6010111A405703C0A04DC76904B834A5FF69FCDC
/0A70101270FDC9690A70FDC4483A70FBC4150102D7
/0A801013B90501FD54642259015464225 41F1B59A6
/0A9010140154642254981B590154642240142AB88C
/0AA01015712008 01A76321690145A6015163226B7E
/0AB010160240C22CB8690014A86140682DB8B969B9
/0AC010170C54B00C590154642240142AB87120068A
/0AD010186B0040C22CB840762D546622404E2869AC
/0AE0101900404E28B959015464224 0052AB871208C
/0AF0101A076B0040C22CB86BFF40762D54662240B7
/0B00100C4E2853F56900146900406 82DB8B95901B2
/0B10100D54642214FF00701E49FF3400FF404328B5
/0B20100EB9590154642275A700CC6BEF3400FF40C6
/0B30100F60283D53FAB971200A6B0040C22CB86BBE
/0B401010EF40602840A82DB853F7B959015464 22C1
/0B50101140142AB8692340AB20B8402E21B8718EB2
/0B60101200 40A12B0111634B719601140000 40A062
/0B70101328340000 45A701CC69004DCC44FFFF48CC
/0B801014D2484500645A40FC644A40FC45A701C4BE
/0B90101569044DCC690051FEB371420540972B00B0
/0BA01016A345A701C648C0405B03B9B174470469B2
/0BB01017334022 28A12418800B3A0A3A744702B38F
/0BC01018304B4FD5A3405B0314D100551B1014ADA1
/0BD0101900701E49FF34000014000040 7228B95986
/0BE0101A01546422400529B8750A004E92718E0090
/0BF0101B701F0AFF701E12FF701F0CFF701E14FFF0
/0C00100D40602A148B00551B10147300701E49FF95
/0C10100E34000014000040 8A281501805BA8050163
/0C20100F7F7120197144054E4640B62B706910809C
/0C301010690070791080645A40FC690670791080 9C
/0C40101163426 44A40FC691D407C2F7069128047B7
/0C501012F0D0407C2C4E2455018040E22A645940A8
/0C6010134E1930444E06405B036901B8405B030191
/0C7010142040AB20ED402E21E94FAE405B03B969CB
/0C80101521B8712024590154642240142AB805017A
/0C9010167F54240C71201AED40142AB8690954B0B5
/0CA010170C40142AB871A701404B0BB8B554C70CB7
/0CB0101859015464224 0142AB863206B0040C22C8A
/0CC01019B840DE2D5466220B404E280A404E28B9C3
/0CD0101A59015464227120 2501A7632201A8632175
/0CE0101B6B0240C22CB8701F21FF482248224248B0
/0CF0101C260A747B00C518690019C2482F148813A6
/0D00100E74ADC414FFFFC8B6690B74C651FCB57007
/0D10100F1E1DFF151A11B959015464224 00529B8AF
/QD201010718E00701F0AFF701E12FF701F0CFF70DC
/0D3010111E14FF3420FF01153D01143D01137498A7
/0D401012A73D01123B140000340000240300702E5F
/0D50101349FF2420FF40F128014B63A1405B0369B9
/0D6010141940AB2054EF0E402E2154EF0E40A12BC0
/0D70101571440369 8C634B7196016512004E85719B

```
/0D801016428540972BDA645940CA34EF0EB3409DD7
/0D9010171E00A3EB746B40C8747BC0CE744A08CAE3
/0DA01018011251706B178060EBC7304B4FD154EFBD
/0DB010190E694B4DDA690A4DDB64859064856148E0
/0DC0101A4100484200706916805740150540714269
/0DD0101B8540972BDB645940CB34EF0EB3409D1EE2
/0DE0101C00A34F8F746B40C8747BC0C7744A08C3D7
/0DF0101D4842C430124E5D70691780301274E8119B
/0E00100F63124E50645A40FC644A40FC69414DDACE
/0E101010690A4DDB648590648561484100484200A3
/0E20101171428540972BDD645940CB34EF0EB340CD
/0E3010129D1E00A34FCE746B40CA747BC04E6574E6
/0E4010134A084E604842C24E5B7069178074F811BA
/0E5010144E5263126931340000402228401C2B4073
/0E6010157A20409D205E05CE0505BF341A80691EBD
/0E701016551B10690E3B011270791780341180698D
/0E801017013F690117A03B691E551B106A0E6906AB
/0E9010186B226880645A10FC701E19806310011B9F
/0EA0101968FF4E25693134000040222840 1C2B3496
/0EB0101A19804B20691E551B10690E70791A8064A9
/0EC0101B5A40FC6906707910807069128007F070A1
/0ED0101C6A1280740AF060FAF077E0ED70691B80CB
/0EE0101D7069108040E22A405B0301A1634BB9018F
/0EF0101EA1634B6904405B03B8590154642240058F
/0F00101029B8701F0AFF701E12FF701F0CFF701EEB
/0F10101114FF40BE2EB8403D2BC36910C6406220C3
/0F201012B96915B8590154642271248040142AB8A0
/0F3010133406FF240BFF48852B3C08670369FF18DD
/0F401014489254DA2E690D54B00C690E54E31159CA
/0F5010150154642240052AB871201C01A763216B86
/0F6010160154DE11590154642240142AB871200F8E
/0F7010176B0040C22CB814D60F691040682DB815B5
/0F8010181B0871100014000 0701E0EFF701E14FF9D
/0F90101940602AB9691054D011691154D01159018A
/0FA0101A54642240052AB8691B54EC11691254EB0
/0FB0101B11691354D011691454D01159015464227F
/0FC0101C40142AB86902B0C6B040A00A4E196903A7
/0FD0101D5A1B6901B0631371201A408E0CC8A051A2
/0FE0101EF3A0514FE3B9A1A1B859015464224014B2
/0FF0101F2AB871201501A76321690145A601516386
/10001002226B0254DE11691654D01175A700D3409C
/10101003052AB840FD2DB8741A405D1B740ABF54D6
/10201004C70C75A701CE59015464224CC11B4CC2C4
/103010051A54C70C75A702CF59015464224 0762DB3
/10401006B81B6A0054C70C75A7034FC359015464BB
/105010072240832EB8EB590154642275A7004E10A5
/1060100840052AB871201801A663216B0154DE1190
/1070100975A701C501A64DC1B975A7024FE201A6C5
/1080100A40A82DB8B940052AB801A7701FA5FF59D8
/1090100B03718E0071202844000074ED142832707E
/10A0100C1E21FF6700691463236B0340C22CB814AB
/10B0100DAA38591B14D449701E1DFF151A45B940D0
/10C0100E052AB8701FA6FF551B204E29718E0005C1
/10D0100F1BFD71201E44000074ED140C05701E219E
/10E01010FF6B0240C22CB8148684701E1DFF151AD6
/10F0101109051CFDB9051AE171202571210F7122A1
/110010031854E00C5901546422718E0014FF01709B
/111010041E49FF34000001A71A6B00407228B959A8
/1120100501546422718E0014FF01701E49FF3400A2
/113010060001A71A6B00408A28B95901546422058D
/114010071BBFB95901546422151B40B940142AB8B2
/11501008151B20B940142AB8051BDFB959015464B3
/1160100922150480B9590154642205047FB9590192
/1170100A5464220501BFB95901546422150140B990
/1180100B5901546422405B03B959015464224 05787
/1190100C03B959015464220505FBB959015464229B
/11A0100D150504B95901546422701FA5FF701E20A5
/11B0100EFF701FA7FF701E22FF01A407031B401AD0
/11C0100F2DB8B95901546422051CF7B9151C08B9C7
/11D01010590154642240142AB840EB2DB8B940EFC2
/11E010112DB8B9590154642240142AB863206B00A0
/11F0101240C22CB840762D546622404E28B96A00B0
/12001004401D1E400529C1CD7733B871A33E71A7C1
/1210100500A1541907716500304B00550280D07173
/122010064201484300346915703E60FF640FF740A5
/12301007721A4E9C05027F1A2489FF74C089071FD7
/12401008348EFFBA3C2B60E23BAA340AFF6B0331EB
/125010093469FF0189AC070F639070790F806418C5
/1260100A106408EFBA7069108047014E281503809D
/1270100B01931B018FAA740B0F60FBD45F03C970CE
/1280100C6910805701F64E0D7069108047014E059B
/1290100D05037F4E38AA018974C08E5100071FACC1
/12A0100E41070F70790E806418206408DF639341A5
/12B0100F070F70790E80638F0502EF74E8901502B9
/12C010101055024054B91471420154C914541B147F
/12D010115F02C4406721B81068FF10701F0AFF70C1
/12E010121E12FF701F0CFF701E14FF0502810503C2
/12F01013BE0504EF645901150410692040AB20B8A2
/1300100515020214FFFF701E91FF701F12FF701ED7
/13101006 8AFF701F14FF701E8CFF69006389638EFA
/13201007638F6390639370790E806418206408DFB7
/1330100870790F806418106408EF41638F70790EBB
/1340100980 6408FD5E02541B15548D145D02541BB2
/1350100A1454D7135902545C1354AB13550240548F
/1360100B44135503014E325A02D95B02541B15648F
/1370100C09EF0502F76BFF644920D153FA405B03D1
/1380100D0502FB0502F7692040AB20D01502021486
/1390100EFFFF701E91FF641910544C13644840C7D9
/13A0100F644801FC6408BF718E00B8644920CD05C6
/13B0101002FD150204644940D5541B153091D53094
/13C0101192D24057031403004 0602F0502FD15037C
/13D0101201719B04544C1375A308C964480154549D
/13E010131364 08BF0502DFBA018941071F638930B3
/13F010148EAA348AFF4091215C02CD5502404E08C8
/14001006018F74F8900502EF304B4E0F0503BF5FD0
/1410100704C5406721B8B9150280B9758E00C758B6
/14201008034E6754692201893469FFAC07105502AE
/1430100940CB7700C4641802CB6408FDC77700CDCD
/1440100ABA645802150220AA5D024E3EC9BA6448C3
/1450100B02150220AAF275A3084E03641840BA0194
/1460100C93758E01C6AA070F6390CBAA01894107C6
/1470100D1FAC070F639070790F80644801CC6408BD
/1480100EBF6418106408EF54E413545413706910A9
/1490100F8047014E2430994E7F309A4E7B550301B1
/14A010104E76645A40FC644A40FC690070791080BD
/14B01011701F1080719B024E5C0502BF5503014EA2
/14C010125775420 04E287142010111550108 41746F
/14D01013E8124E2A69C84DDA695A4DDB64859064F3
/14E010148561484100484200150340544C13701F78
/14F010151080746B00C8701E97FF719B03D75F04C8
/15001007CA69035A1B690174E813CD400B2EC354C8
/151010085C13719B01150301544C135502024E4683
/152010095503014E415502104E3C5E03C748424EA0
/1530100A350503BF01115501084174E01267004F81
/1540100BBD6396407A20409D20690B340000403D98
/1550100C1E1502400193070F64580217106393147A
/1560100DFFFF701E99FF544C1368807103017108D1
/1570100E0B68FF5D0264100211107069108057018 7
/1580100F4E21701F1080746B004E1870691780749D
/15901010E812C4714200CC701E97FF150301719BB9
/15A01011034E49018974C08E071F1A3469FF0193C4
/15B01012BD208E2012018F639364580215931001 8F
/15C0101389AC070F1B018F41070F60FBCB150210BC
/15D0101440501E69006342C95F02C6AD070F74E8C1
/15E010158F208F058F0F018F70790E8005037F11C0
/15F0101610AA62400529C1CD7733B871A33F71A7BE
/1600100800A1541907405921B86A08401D1E304B98
/16101009005503 04D5714202106880690110 34D06F
/1620100A18703E60FF640FF74E1B658E004E0C5FE5
/1630100B0540721AC60503FB540E1740BE165503A1
/1640100C04F9405B03010A6312010B6313701F0C86
/1650100DFF701E14FF692140AB20B8140028701EBC
/1660100E91FF1502020502830503C10504EF645997
/1670100F01150410011 2638A0113638B701F14FF86
/16801010701E8CFF69006389638E63946390638FD8
/169010117 0790F806418106408EF70790E806418B1
/16A01012206408DF41638F70790E80641802111 49E
/16B01013DC1811540E175D02540E1754CE165E02B5
/16C0101454201854851759025 4AD18547E186448A8
/16D0101501 54BE16BA018974C08EAA071F1A3469CA
/16E01016FF0193BD208EBA11701F9DFF11AA0502DA
/16F01017DF6408BF209400304B54BE16550140C8B5
/17001009551C08C4150304B915050154BE1665949D
/1710100A0F54BE1655030854BE1655050154BE16AF
/1720100B550302546A236408BF150220BA55032087
/1730100CCB11701E9DFF14321911AACDAA641840D1
/1740100D69006448026910 4E1ABA6C00641840AAA6
/1750100E6900BA60FCC76448026910AAC6AA6458D1
/1760100F02691074C0906393209005900F01907080
/17701010790F8064480154BE166408BF64181064B1
/1780101108EF54D4167069108047014E2530994EB1
/1790101289309A4E855503024E80645A40FC644ABF
/17A0101340FC690070791080701F1080719C021593
/17B0101403020502BF450310C60503EF54CE16559E
```

/17C010150302546A23654200D1701F1080746B007E
/17D01016C9701E97FF719C034E3A714202758E00CA
/17E01017DD5A03CD0503FB5F05B805057F151C08CE
/17F01018B801115501084174F81254B616CC01118F
/1800100A5501084174F81254201840OB2EC354AD9F
/1810100B18719C01150302546A235A0354B616B896
/1820100C550202547E18758E00C9580554B61605A4
/1830100D05FEB9550302546A233469FF0189AC07C6
/1840100E107700C76458024039lAC664480240399O
/1850100F1A01115501084174E0126396409D20407A
/186010107A206909340000403D1E40E91900150282
/18701011401470177O1E99FF5A0354B616B86449BB
/188010122O4E090502F515020454201830 91D8307D
/1890101392D54057031403004O602F0502FD15037F
/18A0101402719C04546A235A0354B616B8645940A3
/18B01015C9150302719C05546A236409EF1400289F
/18C01016701E91FF1502026419105A0354B616B8A3
/18D0101710116303710809216418O2C36408FDB088
/18E01018B168FF3469FF01891BAC07101A0B4107CA
/18F010191FAC071060FA7194004E3B68FF64097FD7
/1900100B6880B0B168FF0503DF6449404E4E7069D2
/1910100C10805701D2701F1080746B00D07069178C
/1920100D8074F812C54E3C40501E71420064198OA1
/1930100E4E5CB0B168FF0503F76449404E1E7069D6
/1940100F108057014E4D701F1080746B004E3F70A0
/195010106917807 4E812CF7142004E3240501E69AA
/196010110063426419805D02C8644840C464480194
/19701012FC3469FF0189AC6408FD571064180240CB
/19801013C121701E97FF150302719C034E474056AB
/199010141A4E3740561A3469FF0189AC07107700B3
/19A01015C66458024E38C56448024E32A140E919B8
/19B01016D8B13469FF01891BAC07101A0B41071FC3
/19C01017AC071060FA150308C1B1208F058F0F01AC
/19D010188F70790E80A1A01110150380AA62405092
/19E010191E15031040391A4FE1758E01CD1503209D
/19F0101A44FB18349DFF48934E2C018941071F34D3
/1A00100C69FFAC44D818471044DC18349DFF4893F2
/1A10100D4432195E02C774FD701F9DFFD71174FDEE
/1A20100E701F9DFF11CE5E02C5701F9DFFC61170F3
/1A30100F1F9DFF11758E01B9B85D02D3644840CFE9
/1A401010644801FC116C0111641002719 4FFB864A6
/1A501011100271940 0B8018941071F638920120179
/1A60101212638A0113638B701F14FF701E8CFF30C4
/1A7010138EB80504FD5A03D105037F018E702F8ACD
/1A801014FF703F8CFF5F03DBEF658E00B864490101
/1A901015C45C04B8C4550410B8018E702F8AFF70D0
/1AA010163F8CFF701F0CFFA574BFC1B874E71401FF
/1AB010170074ADC1B81E010B74FD4E316A045A1BC9
/1AC010186A02750CA04E24750D014E1F350B02B8B0
/1AD010190C5260FAB869225501084160E5750B00A0
/1AE0101A461C5501084174C00A4E1E60C260E437A7
/1AF0101B03B86700CF6A1C5C1B6A225501084277B3
/1B00100D0148260A74C00A60E55A03C760FEB815BA
/1B10100E0402B960BEB8150402B96A01540012408D
/1B20100F0529B86A0275A3E56A03401D1E718E00B3
/1B301010701F0AFF701E12FF701F0CFF701E14FFF0
/1B401011692040AB20B87165007142297196013086
/1B5010124B00407A20409D20402E21B81410004076
/1B601013A02869F3340000403D1E407C2CC5409DAF
/1B7010141EC1E93400001410002403027 5A3E5247D
/1B8010150502702E49FF407228304BC4405B03B9AD
/1B90101640F72B545D2A4FC4400529B8405921B8C0
/1BA010176A0A75A3E66A0B401D1E718E00701F0AC2
/1BB01018FF701E12FF701F0CFF701E14FF692140E5
/1BC01019AB20B871422A719601304B00407A204089
/1BD0101A9D20402E21B834000014100024030275 66
/1BE0101BA3E6240502702E49FF408A28141000409A
/1BF0101CA028693134000 0403D1E407C2CC6409DA2
/1C00100E1EC24FE8304BC4405B03B940F72B545DD5
/1C10100F2A4FD9400529B86A04C9400529B80504B5
/1C201010FB6A05401D1E718E00701F0AFF701E12C6
/1C301011FF701F0CFF701E14FF692040AB20B855E1
/1C4010120404D0701F06FF701E14FF0108631301A0
/1C50101309631205O3FE71650071423971960140 83
/1C6010147A20409D20402E21B86900580301A71A95
/1C7010156B1040A02869F3340000403D1E407C2C9A
/1C801016C5409D1EC1E36900580301A71A40C228B0
/1C9010174400001 4FFFF65A3054E186408BF6418C0
/1CA01018406458014E0D1374FDF7691A6408BF40C6
/1CB010195B03B86408BF405B03B9400529B86A06BA
/1CC0101A401D1E718E00701F0AFF701E12FF701FCC
/1CD0101B0CFF701E14FF692040AB20B871650071BD
/1CE0101C4239719601407A20409D20402E21B8148C
/1CF0101D100040A02869F3340000403D1E407C2C89
/1D00100FC5409D1EC1E914FF01701E49FF140000C8
/1D1010103400004072284 05B03B9400529B8405982
/1D20101121B86A0CCD400529B8405921B80504FBBD
/1D3010126A0D401D1E718E00701F0AFF701E12FFD2
/1D401013701F0CFF701E14FF692140AB20B801A7CC
/1D5010141A40C22814FFFF4400006408BF641840B3
/1D601015645801CA1374FDF8691A6408BFB86408DB
/1D701016BF550404D0701F06FF701E14FF010863BF
/1D8010171301096312050 3FD71650071420271967 8
/1D90101801407A20409D20402E21B8550302C80182
/1DA01019A71A6B0040A0286931340000403D1E4086
/1DB0101A7C2CC5409D1EC1EF405B03B9400529B8D7
/1DC0101B405921B86A0E401D1E718E00701F0AFFC4
/1DD0101C701E12FF701F0CFF701E14FF692140ABDC
/1DE0101D20B814FF01701E49FF34000014000040 8A
/1DF0101E8A28714202719601407A20409D20402E8B
/1E00101021B814000040A0286931340000403D1E70
/1E101011407C2CC5409D1EC1E9405B03B901A807C8
/1E201012C0609A6300B83469FF01891BAC07101ABC
/1E3010130B41071FAC071060FA719400B84022289E
/1E40101401127079178034118001963F01423BB886
/1E50101524A8614400007069108047 01B87069127E
/1E6010168007F0706A1280740AF060FA4E0867B0B5
/1E7010174E2067004E1C2374FE4FDB247017644AC5
/1E80101840C52374FEF8CB247017645A40C42374C2
/1E901019FEF8690070791080701F1080B8644940B1
/1EA0101A542B20B0B140501EA1A067004E33701E97
/1EB0101B46FF0B6700542B205780CE57704E3257BC
/1EC0101C044E1C57024EB34E1C745A044E23745ABF
/1ED0101D084E6C745A104E07745A034E0A4E0669C0
/1EE0101E12691C6911691D691E691430444E7B4EC0
/1EF0101F50405B03403D2B4E4D4503024E2C7704A0
/1F0010114E17691014D60F40682DC1E840570314AD
/1F101012030040602F405E2E00051ADF40D821C59E
/1F201013406 92C4FCF405E2E00EF6704D0691065CC
/1F30101444004E0D405703140300 40602FA1B8698A
/1F40101519A1405B03B85A044F9F4062204F9A75BD
/1F5010164401CD40570314030040602F550302C77A
/1F6010173044C469154FDA5A04B9405B030120409F
/1F701018AB204FCD402E214FC8B95504204F6401C3
/1F80101900073F6702B86703B8244EFF34000014A0
/1F90101A0500701E49FF14000140DB286B05344EA1
/1FA0101BFF690070FDC353FBB8016274B865C1D4E4
/1FB0101C344EFF2454FF6A052D70FAC82252F915E5
/1FC0101D01104E1D344EFF2454FF6B0531400831B0
/1FD0101E30454F960501EF016274B865C469114FB7
/1FE0101F602466FF703F5AFF140200701E49FF14C9
/1FF01020100040DB280166749 05C63660167749090
/200010035D6367016874905E63682466FF703F5ACD
/20101004FF140200701E49FF14100040F128712498
/2020100598150104150401714B00B8012040AB206F
/20301006C1B9A1B8701F1480746B036BFFA5081BD4
/20401007091A701E0EFF701E21FF70691680070FC8
/2050100863100120B071201D6B0240EF2D00A06386
/2060100920B84034203414FF4883701F0EFF74FDCD
/2070100AB90113070F74F810B9B83419804B3332AC
/2080100B690E551B10691E3B341480011507033D95
/2090100C01143D01133B690270791280B83454FF9D
/20A0100D6A0569003D52FD40692CB871A9056320B6
/20B0100E0113631048254825482548257O1F14FF95
/20C0100F701E0EFF740A0F609A1A701E21FF4060CB
/20D010102A550302151C106B026520236B00040C277
/20E010112CC4641910B9550408B86704B8771BCCC6
/20F010125503024FBB30A94FB76904B8405E2E4FD3
/21001004AF67014E1267034E1767024E1367084EB2
/211010050B67064F9B4F99151C204F94051ADFC3DA
/21201006151A2040D821C24F87405E2E00EE6900B1
/213010071470626459204E1C6449404E0F53F452AB
/21401008F251F0405703140300 40602F012040B06E
/2150100920B84FDA645940B9F35E1BB9750CFFC4FA
/2160100A650DFFB96917B840501E05023F5902D0C2
/2170100B690014BC6640682DCC405B030502F9B9BA
/2180100C550204F5B9405703140300 40602F690481
/2190100DB8488F0224A0016A2274BE6A1C550108B1
/21A0100E422B4160EAC23BB869003D2B416A045AB9
/21B0100F1B6A0260EAC23BB869003D4883A84893CB
/21C01010B8018F5100070F70790E8064182064089B
/21D01011DF018F70790E80B815040801A91A0120A8
/21E010121BB1701F12FFB1701F14FFB15D1AD371D7
/21F0101320266B00151C1040C22C4E4A690914F09B

/220010059CCA408F104E3F691014D60F6449404ECF
/221010063540682D4E306449404E2B40FD304E26B5
/222010076449404E21551A20051CFD591CC8406DBB
/223010080FD4644940D0140000701E0EFF71100098
/2240100940602A6A00C26A01A3703E14FFA3703EB2
/2250100A12FFA30F63200E63A90504F7711A0074AF
/2260100B7A00B8B96920691BB801936395018A74B9
/2270100CE812D0701F8AFF701E12FF701F8CFF70F4
/2280100D1E14FF644940CF659B01C5659B04C3C6DD
/2290100E692169154E7C69FF659B026900701F10C1
/22A0100F8015042034B522B3409D1E4E024E18A3A2
/22B010100504DF4E4E0504DF5501404E5577194EC3
/22C0101151401F234E4CCAA30504DF2044007195A9
/22D010120040561C1501045E044E10701F8AFF709F
/22E010131E12FF701F8CFF701E14FF5501044E22D7
/22F010143412FF409121304BCA405B030504BF05A0
/2300100603FEB9714201484300405B030504BF5499
/23101007EB12150401405B030504BF0503FEB8159F
/2320100804407069168037C04E2107304821482180
/2330100948214821551B04CC2701C6151401660286
/2340100AC30514FE631301116312D5149202701E8C
/2350100B14FF7113000112271BC6661C6312201385
/2360100C405B03012040AB20B8B90503D70502FB99
/2370100D018A74E812D0701F12FF701E8AFF701FD9
/2380100E14FF701E8CFF5D02C8644840C4644801D4
/2390100FFC01893469FFAC63956459404E03719CDC
/23A0101005551C08C6550140C24EC1759C01C24EB4
/23B0101106759C04C94E026921691554CE2569FFD2
/23C01012659C026900701F108034D323B3409D1EA4
/23D01013004E1255014054CE25771954CE25401FA4
/23E010142354CE25C4A3204400400A2840881D5499
/23F01015CE255E044E130504BF701F8AFF701E12D1
/24001007FF701F8CFF701E14FF40261E3412FF40E7
/241010089121208905891F701F12FF701E8AFF70CB
/242010091F14FF701E8CFF308E003469FF0189ACF0
/2430100A6408FD5710641802018F70790E806418A8
/2440100B206408DF41070F638F70790E80754BFFD1
/2450100C54AF25758E0054AF255F05C605057F15C5
/2460100D1C08405B030503FD0505FEB9759C01CAC3
/2470100E718E005A034FE254A025759C04CD6915C0
/2480100F405B03012040AB20004E2169FF659C0299
/249010106900701F108034A024B3409D1E004E0897
/24A010117719D9401F23D5C4A3204400400A28409C
/24B01012881DC95E044E8C0504BF4E2415044071C1
/24C01013A20F40E1254E15701F8AFF701E12FF70D2
/24D010141F8CFF701E14FF40B726C1C4406A2700D3
/24E01015701F8AFF701E12FF701F8CFF701E14FF00
/24F010165E044E4F019070790E806418206408DFB6
/25001008641002340000693340222834188001155A
/251010093B01143B01137498A23B01123B40580D8D
/2520100A4E0B64100240C1210504BF4E1664100287
/2530100B40C1210504BF5A03C4150580C3151C0896
/2540100C409F27701F8AFF701E12FF701F8CFF70F3
/2550100D1E14FF40261E3412FF40912120890589AF
/2560100E1F701F12FF701E8AFF701F14FF701E8CF2
/2570100FFF308E003469FF0189AC6408FD571064D8
/258010101802018F70790E806418206408DF41079F
/259010110F638F70790E805A03544D24758E00CFCB
/25A010125F054E0605057F151C080503FB4E2B40B1
/25B010135B03692140AB2000140028701E91FF1593
/25C0101402027142024843000503FD54BE1615047E
/25D01015010505FE718E006408BF405B030503FDAD
/25E01016B8014B63A1150420711300551B04C3057D
/25F0101714FE711200405B03692040AB2000402E84
/260010092100716500714281407A20409D20011163
/2610100A4174E01263960112634B69F33400004081
/2620100B3D1E407C2C4E53B0011141B1706A1980A6
/2630100C60E26312A1744B80CB744A08C7A07069BA
/2640100D16804E1A74E84BC6714503714403A034A6
/2650100E7026B3409D1E4E03A34FB3A34E124821BA
/2660100F482148214821070340502765A2004E3C81
/26701010011274E811C420124F7B2013551B044E93
/268010111127513024F6C5514014E0D151401711381
/26901012004F5F7513044F5A018A74F811CE018BC2
/26A01013551B04C5558C01460240502701A1634B8C
/26B010140504DF405B03B965A200B8018B1A018CAE
/26C010156314551B04C557017442026900746A0083
/26D01016CD746A01CB746A02C9746A03C7B86901D2
/26E0101769026904690874D8A2C7482537106901A8
/26F01018F56701C96702C86704C76708C6690069C3
/2700100A0169026903551B04CB0514FE2701C566A3
/2710100B02151401631301116312405B0369214057
/2720100CAB200040881D4E180113551B04C5581496
/2730100DC246024825482548254825174063A2B99B
/2740100E0113551B04C55814C246024050274F678E
/2750100F6700C96701C86702C76703C669FE69FDDF
/2760101069FB69F77488A263A2B8149202701E14CA
/27701011FF711300018A6312271BC6661C63122097
/278010121340 5B03692140AB200040881D0071A27E
/27901013C05A03C4150580C3151C08409F27B914A9
/27A01014FFFF701E14FF711300711208019070 79B5
/27B010150E806418206408DF641002340000693382
/27C0101640222824FF01702E49FF34188069FF3BCC
/27D010173049FC304AF934000069334022283418 92
/27E0101880018D3B018C3B018B3B018A3B405B03A9
/27F01019692140AB20000504FE40881D0020122581
/2800100B120BEA150401641002B83469FF0189ACAD
/2810100C644802CA5710B8641002719400B8571090
/2820100DF6B86AE0707A088014FF01701E028070B9
/2830100E3E0080707908 80B84060283D3049F930A2
/2840100F4AF6B82D404E283049F9304AF6B86408D8
/285010107F70790C80641A20640ADF644A80FCB8D6
/28601011641880641A20640ADF644A80FC70690CBF
/287010128 0B840A028693140222824188 02A002A87
/28801013404E283049F9304AF6B840A028693340B2
/289010142228241880406028 3A3049F9304AF6B8A7
/28A0101569E070790880744A10C4641802C36408A4
/28B01016FD740AEF0A609B70790E806418206408C6
/28C01017DFB8744A10C46408FDC3641802740AEFDD
/28D01018707A0F806418106408EFB840A0286931B0
/28E010194022283418802B002B3C3049FB304AF8A5
/28F0101AB840A0286933402228341 8802C3B304996
/2900100CFB304AF8B81504047124804014 2AB805A6
/2910100D01F755A8101501083406FF4885701F16A5
/2920100EFF74BD4EA908670369FF1869075A1B69F4
/2930100F0370BDC3545D2A2B3711545D2A550102A5
/29401010CD3464025A1B34670274BF545D2A3408B8
/29501011FF0867FFC614A00174BDD42D1A2D745AEA
/29601012014611 55A8204148223D0A3D4893B974A1
/29701013E524D30074BE4EE548A434E53174C7B7DA
/298010142D44A0017041B62B4825448B335A1B44A3
/29901015A7337041B74883B701081A4825482548A4
/29A0101625482560C274C00960476A035A1B6A019E
/29B010170E742F1BCB74671C4160AAF5690022F1C8
/29C010181E55A82032703E0AFF702E0CFFB914FFEA
/29D010190374FD4E882D77004E832D37114E7E55D2
/29E0101AA7FE4E793D69003D44FFFF489301A367F6
/29F0101B084E68670A4E646737B96738B9673EB9E4
/2A00100D673FB94E58551B01C54057034E47551ABF
/2A10100E014E40B9551B01C54057034E38551B029B
/2A20100F4E065A1A4E314E2B551A02C5551A014EB7
/2A30101022581CC5051CFE4E2065A300B9591AB9CB
/2A401011051AE0690014CB6640682DC1B9405703AA
/2A5010126904B869046905690969 0A69336921B8B8
/2A6010133414FF488314A00174BDCB5C1B4E1505C5
/2A7010141BEF711122CE0867FFF1551B10C6151BCF
/2A80101510711 11CB8241E8069006A00707A198091
/2A90101648 8C48924602424720F2660252707A199E
/2AA0101780488C702F1E8074FE4FDA7700ECB824EA
/2AB010181E8069006A00707A19804882489C4602A3
/2AC01019424720F2B8690070791A8034004140AF99
/2AD0101A2A691070791A8034204140AF2A70691094
/2AE0101B80B8690070791A8034FB2F40852A6910B3
/2AF0101C70791A8034DB2F40852A70691080B869B8
/2B00100E0070791A80343B3040852A691070791A91
/2B10100F80341B3040852A70691080B8451B10C695
/2B201010345B306900C5347B3069107079 1A804094
/2B301011852A70691080B8BA400907AAB8011141A3
/2B40101263480120B040A12B0142634371960169 7D
/2B5010132340AB20C5402E21C1C6A063206904B9A3
/2B601014A0632071428540972BC967004E18745BA9
/2B701015304E13706B1780744BFF4E0A407A2001AD
/2B801016436342545B0330484FD9407A2001436392
/2B901017424 05B036910B96933403D1E407C2CB8B1
/2BA01018B93419804B33326907551B1069173B69A8
/2BB01019027079128 0B814000040A0286909340073
/2BC0101A004022286902707912806 5A3E8C3690192
/2BD0101BC30111417079118055018040FF2A65A391
/2BE0101C40401C2B3419804B2032690E551B106994
/2BF0101D1E3B70691080B840692C20120111550183
/2C00100F084174F8124E506419107112000113 4173
/2C1010106F036409EF5A1B6F01608F6313707916C1
/2C2010118077004E32340EFF4883A848933414FFCB
/2C301012489314A00174FDC9691E70791A804060B6

/2C4010132A550102CB348E025A1B34920274EFB8B9
/2C501014341480083D093D44000024FFFF645920A9
/2C601015C72374FEF8546622B971450355004071AE
/2C701016450071440355008071440OB814C03F447C
/2C80101700007069108047014E191374FD4FF3409B
/2C901018501E6900701F10805942C7645940C369A4
/2CA01019FFCEB969FF701F10805942C7645940C3EB
/2CB0101A6B00B9747B00B96900B84FFE645A204FD6
/2CC0101BFBB83420FF6A05B1B3401D2DC6051CEFE5
/2CD0101CA3A1B97713D3551C10C9405E2ECB4075C9
/2CE0101D036904051CEFA3A1B8A36B05B1405B03B6
/2CF0101E14030040602FA16459204E1753EE405796
/2D0010100314030040602F6459204E07051CEF6997
/2D1010111BA1B8A1524FB0691BB83420FF440000B7
/2D2010122466034CC15720C62374FEF74E374740C0
/2D3010134E31CE2466034CC15720C62374FEF74ED7
/2D401014246419102D4DD82466034CC14720CA23AA
/2D5010154CC14720C474FEF2CC6409EF4740C453E2
/2D6010164FD1B96913691BB8645920C953FA52F8E4
/2D70101751F6691BB8B96409EF44000024FC2148C5
/2D80101869C62374FEF94E1A641910486B4E134CDB
/2D901019D9245700645920C62374FEF84E046409C1
/2DA0101AEFB9405B03691BB86409EF44000024FCCF
/2DB0101B21644920C62374FEF84FE74DD8245700D2
/2DC0101C645920C62374FEF84FD8641910245700BF
/2DD0101D644920C62374FEE84FC86409EFB94076EA
/2DE0101E2DB81F40762DB81A0F1BB963206B0040BF
/2DF0101FC22CB869001434084068 2DB8B9712017AC
/2E0010116B0040C22CB840DE2DB8B97112001502AC
/2E10101208011341 6F035A1B6F01608F631363108F
/2E2010137700B9703F14FF32703E14FF44A00174BC
/2E301014FFCD691E70791A8071111C151B10D6A7CD
/2E401015703F18FF74EFD3348E025A1B34920274D1
/2E501016FFC35901C5703E0EFFB90502F7B86B32EB
/2E6010176900141A0440682D00B140832EC5670996
/2E701018C2A1B9405B0314030040602FA1534FE9A4
/2E801019691BB864191044000064492 04E25645995
/2E90101A40CC405B036900143B0140682DD569049C
/2EA0101B4DD82466034CC14720CC234CC14720C6BE
/2EB0101C74FEF2691BB84740FA40762DF6B94016E3
/2EC0101D2FB8591AB9690014A86140682DC4051ABF
/2ED0101EFDB9405703B8400529B8701F0AFF701ED2
/2EE0101F12FF701F0CFF701E14FF40162FB8591AE3
/2EF01020B955A880CB14F401701E1DFF151A01B9D0
/2F001012690014A86140682DC4051AFDB9405703B1
/2F1010136904051AFDB8701F14FFA5703F0EFF70E7
/2F2010141E0EFF74FFCA011374F810C4051AFDB9F2
/2F3010156310712001011348254825482548257 06D
/2F4010161F14FF740A0F609A1A701E21FF6B0240C9
/2F501017C22CB840602A151A02B9A4483A483AC0B8
/2F601018B0695F407C2FACC0C0C0A013B4440000B5
/2F70101974FD545A2FA4B8483A483AC05154772FDD
/2F80101AB85DA4C5645901B8C5644901B8C01505C3
/2F90101B023428FF240EFF690C4883B548824895D5
/2FA0101CA5489451F4641101 0505FDB869E07079BB
/2FB0101D09803408803D69EE3D690F3D69023B34C7
/2FC0101E10804B0024198034D62F6B043134138087
/2FD0101F4B0140E22AB8000E03CAD233623361FFB2
/2FE010200D6201FE01000400023303FF0D6201F88E
/2FF0102101C80000073303330833013377 3377FF80
/30001004106201FE01000400023303FF106201F876
/3010100501C800000733033308330133A033A0FF78
/302010060D6201FE01000400023303FF0D6201F88E
/3030100701C800000733033308330133C233C2FF80
/30401008106201FE01000400023303FF106201F876
/3050100901C80000073303330833013362 3361FF73
/3060100A006201FE01000400023303FF0D6201F881
/3070100B01C879000733033308330133773377FF90
/3080100C006201FE01000400023303FF106201F875
/3090100D01C881000733033308330171 64FF346383
/30A0100EFF01622707C54B003266081A69FF746AC3
/30B0100F00C4482152F83BB87120126B0040C22C9C
/30C01010B8146900690040762D5466227721D23496
/30D010116702703E16FF349202703E18FF051BFBCA
/30E01012D1346402703E16FF348E02703E18FF15C2
/30F010131B04051BEF71112240C109B8B9051BF7B4
/3100100540B830C1B96904B8440810014E1A014FA4
/311010061B01501C01511D01521E01531F747A0080
/31201007D10B1A0C1B0D1C0E1D0F1E6F00690870C3
/3130100841EB097700C50867004E8DA948224833B7
/314010090C48311C0D48311D0E48311E0F48311FB0
/3150100A480AD274128C74130C74140A74152874A2
/3160100B16187417080A609D609E609F77004FC2BB
/3170100C0B74D8634FBC0C74D8644FB6094707CDEC
/3180100D48230C48311C0D48311DA94FEF48A048CA
/3190100EA048A0345AFF48950B3D0C3D0D3B6A08D8
/31A0100F0B40CB31CA0C40CB31C50D40CB31000AB2
/31B010101F6A200D40D831CA0C40D831C50B40D8C9
/31C0101131000A60E76365B869FFFA7146074825C2
/31D01012481AB8423046F7B97146074821481AB8B9
/31E01013523046F7B900000101020203030404 0658
/31F0101405070608070908 0A090C0A0D0B0E0C0F9C
/320010060D11001201130214031504170518061951
/3210100707 1A081B091D0A1E0B1F0C200D22002395
/3220100801240225032604280529062A072B082C75
/32301009092E0A2F0B300C310D330034013502 3680
/3240100A03370439053A063B073C083D093F0A409A
/3250100B0B410C420D44004501460247034804 4A79
/3260100C054B064C074D084E09500A510B520C53A0
/3270100D0D5500560157025803590 45B055C065D91
/3280100E075E085F09610A620B630C640D660067A8
/3290100F0168026903 6A046C056D066E076F0870A6
/32A0101009720A730B740C750D77007801 79027AA2
/32B01011037B047D057E067F07800881 09830A84AD
/32C010120B850C860D880089018A028B038C048EB9
/32D01013058F0690079108920994 0A950B960C97B3
/32E010140D99009A019B029C039D049F05A006A1B3
/32F0101507A208A309A50AA60BA70CA80DAA00ABCA
/3300100701AC02AD03AE04B005B106B207B308B4AA
/3310100809B60AB70BB80CB90DBB00BC01BD02BEE2
/3320100903BF04C105C206C307C408C509C70AC8C0
/3330100A0BC90CCA0DCC00CD01CE02CF03D004D2DB
/3340100B05D306D407D508D609D80AD90BDA0CDBE4
/3350100C0DDD00DE01DF02E003E104E305E406E5C6
/3360100D07E608E709E90AEA0BEB0CEC0DEE00EF0A
/3370100E01F002F103F204F405F506F607F708F8BD
/3380100F09FA0AFB0BFC0CFD0DFF000000180014CD
/33901010011002 0C030800040100021802140310 36
/33A01011000C010802040300000C00180008011441
/33B010120104001000000 10C01180108001400042F
/33C01013011001000000000000000000000000000003
/33D010140000000000000000000000000000000000
/33E010150000000000000000000000000000000000
/33F010160000000000000000000000000000000000
/340010080000000000000000000000000000000000
/341010090000000000000000000000000000000000
/3420100A0000000000000000000000000000000000
/3430100B0000000000000000000000000000000000
/3440100C0000000000000000000000000000000000
/3450100D0000000000000000000000000000000000
/3460100E0000000000000000000000000000000000
/3470100F0000000000000000000000000000000000
/348010100000000000000000000000000000000000
/349010110000000000000000000000000000000000
/34A010120000000000000000000000000000000000
/34B010130000000000000000000000000000000000
/34C010140000000000000000000000000000000000
/34D010150000000000000000000000000000000000
/34E010160000000000000000000000000000000000
/34F010170000000000000000000000000000000000
/350010090000000000000000000000000000000000
/3510100A0000000000000000000000000000000000
/3520100B0000000000000000000000000000000000
/3530100C0000000000000000000000000000000000
/3540100D0000000000000000000000000000000000
/3550100E0000000000000000000000000000000000
/3560100F0000000000000000000000000000000000
/357010100000000000000000000000000000000000
/358010110000000000000000000000000000000000
/359010120000000000000000000000000000000000
/35A010130000000000000000000000000000000000
/35B010140000000000000000000000000000000000
/35C010150000000000000000000000000000000000
/35D010160000000000000000000000000000000000
/35E010170000000000000000000000000000000000
/35F010180000000000000000000000000000000000
/3600100A0000000000000000000000000000000000
/3610100B0000000000000000000000000000000000
/3620100C0000000000000000000000000000000000
/3630100D0000000000000000000000000000000000
/3640100E0000000000000000000000000000000000
/3650100F0000000000000000000000000000000000
/366010100000000000000000000000000000000000
/367010110000000000000000000000000000000000

```
/368010120000000000000000000000000000000000
/369010130000000000000000000000000000000000
/36A010140000000000000000000000000000000000
/36B010150000000000000000000000000000000000
/36C010160000000000000000000000000000000000
/36D010170000000000000000000000000000000000
/36E010180000000000000000000000000000000000
/36F010190000000000000000000000000000000000
/3700100B0000000000000000000000000000000000
/3710100C0000000000000000000000000000000000
/3720100D0000000000000000000000000000000000
/3730100E0000000000000000000000000000000000
/3740100F0000000000000000000000000000000000
/375010100000000000000000000000000000000000
/376010110000000000000000000000000000000000
/377010120000000000000000000000000000000000
/378010130000000000000000000000000000000000
/379010140000000000000000000000000000000000
/37A010150000000000000000000000000000000000
/37B010160000000000000000000000000000000000
/37C010170000000000000000000000000000000000
/37D010180000000000000000000000000000000000
/37E010190000000000000000000000000000000000
/37F0101A0000000000000000000000000000000000
/3800100C0000000000000000000000000000000000
/3810100D0000000000000000000000000000000000
/3820100E0000000000000000000000000000000000
/3830100F0000000000000000000000000000000000
/384010100000000000000000000000000000000000
/385010110000000000000000000000000000000000
/386010120000000000000000000000000000000000
/387010130000000000000000000000000000000000
/388010140000000000000000000000000000000000
/389010150000000000000000000000000000000000
/38A010160000000000000000000000000000000000
/38B010170000000000000000000000000000000000
/38C010180000000000000000000000000000000000
/38D010190000000000000000000000000000000000
/38E0101A0000000000000000000000000000000000
/38F0101B0000000000000000000000000000000000
/3900100D0000000000000000000000000000000000
/3910100E0000000000000000000000000000000000
/3920100F0000000000000000000000000000000000
/393010100000000000000000000000000000000000
/394010110000000000000000000000000000000000
/395010120000000000000000000000000000000000
/396010130000000000000000000000000000000000
/397010140000000000000000000000000000000000
/398010150000000000000000000000000000000000
/399010160000000000000000000000000000000000
/39A010170000000000000000000000000000000000
/39B010180000000000000000000000000000000000
/39C010190000000000000000000000000000000000
/39D0101A0000000000000000000000000000000000
/39E0101B0000000000000000000000000000000000
/39F0101C0000000000000000000000000000000000
/3A00100E0000000000000000000000000000000000
/3A10100F0000000000000000000000000000000000
/3A2010100000000000000000000000000000000000
/3A3010110000000000000000000000000000000000
/3A4010120000000000000000000000000000000000
/3A5010130000000000000000000000000000000000
/3A6010140000000000000000000000000000000000
/3A7010150000000000000000000000000000000000
/3A8010160000000000000000000000000000000000
/3A9010170000000000000000000000000000000000
/3AA010180000000000000000000000000000000000
/3AB010190000000000000000000000000000000000
/3AC0101A0000000000000000000000000000000000
/3AD0101B0000000000000000000000000000000000
/3AE0101C0000000000000000000000000000000000
/3AF0101D0000000000000000000000000000000000
/3B00100F0000000000000000000000000000000000
/3B1010100000000000000000000000000000000000
/3B2010110000000000000000000000000000000000
/3B3010120000000000000000000000000000000000
/3B4010130000000000000000000000000000000000
/3B5010140000000000000000000000000000000000
/3B6010150000000000000000000000000000000000
/3B7010160000000000000000000000000000000000
/3B8010170000000000000000000000000000000000
/3B9010180000000000000000000000000000000000
/3BA010190000000000000000000000000000000000
/3BB0101A0000000000000000000000000000000000
/3BC0101B0000000000000000000000000000000000
/3BD0101C0000000000000000000000000000000000
/3BE0101D0000000000000000000000000000000000
/3BF0101E0000000000000000000000000000000000
/3C0010100000000000000000000000000000000000
/3C1010110000000000000000000000000000000000
/3C2010120000000000000000000000000000000000
/3C3010130000000000000000000000000000000000
/3C4010140000000000000000000000000000000000
/3C5010150000000000000000000000000000000000
/3C6010160000000000000000000000000000000000
/3C7010170000000000000000000000000000000000
/3C8010180000000000000000000000000000000000
/3C9010190000000000000000000000000000000000
/3CA0101A0000000000000000000000000000000000
/3CB0101B0000000000000000000000000000000000
/3CC0101C0000000000000000000000000000000000
/3CD0101D0000000000000000000000000000000000
/3CE0101E0000000000000000000000000000000000
/3CF0101F0000000000000000000000000000000000
/3D0010110000000000000000000000000000000000
/3D1010120000000000000000000000000000000000
/3D2010130000000000000000000000000000000000
/3D3010140000000000000000000000000000000000
/3D4010150000000000000000000000000000000000
/3D5010160000000000000000000000000000000000
/3D6010170000000000000000000000000000000000
/3D7010180000000000000000000000000000000000
/3D8010190000000000000000000000000000000000
/3D90101A0000000000000000000000000000000000
/3DA0101B0000000000000000000000000000000000
/3DB0101C0000000000000000000000000000000000
/3DC0101D0000000000000000000000000000000000
/3DD0101E0000000000000000000000000000000000
/3DE0101F0000000000000000000000000000000000
/3DF010200000000000000000000000000000000000
/3E0010120000000000000000000000000000000000
/3E1010130000000000000000000000000000000000
/3E2010140000000000000000000000000000000000
/3E3010150000000000000000000000000000000000
/3E4010160000000000000000000000000000000000
/3E5010170000000000000000000000000000000000
/3E6010180000000000000000000000000000000000
/3E7010190000000000000000000000000000000000
/3E80101A0000000000000000000000000000000000
/3E90101B0000000000000000000000000000000000
/3EA0101C0000000000000000000000000000000000
/3EB0101D0000000000000000000000000000000000
/3EC0101E0000000000000000000000000000000000
/3ED0101F0000000000000000000000000000000000
/3EE010200000000000000000000000000000000000
/3EF010210000000000000000000000000000000000
/3F0010130000000000000000000000000000000000
/3F1010140000000000000000000000000000000000
/3F2010150000000000000000000000000000000000
/3F3010160000000000000000000000000000000000
/3F4010170000000000000000000000000000000000
/3F5010180000000000000000000000000000000000
/3F6010190000000000000000000000000000000000
/3F70101A0000000000000000000000000000000000
/3F80101B0000000000000000000000000000000000
/3F90101C0000000000000000000000000000000000
/3FA0101D0000000000000000000000000000000000
/3FB0101E0000000000000000000000000000000000
/3FC0101F0000000000000000000000000000000000
/3FD010200000000000000000000000000000000000
/3FE010210000000000000000000000000000000000
/3FF01022000000000000000000000000000000AD17
/00000000
```

The following hexadecimal listing is in Tektronics format and is resident within the firmware ROM 296 of the base unit 12.

```
/00001001548201005436030010112100000000002F
/0010100254B7FF0000000000005406FF000000000066
/0020100354A403000000000054FB000000000000003D
/003010040404436F707972696768742031393837A0
/004010052C383820504C5553204465762E20436F9D
/0050100672702E640AEF641A2005037F01037079A1
/0060100700A0641F2001774174B876CC637740E8AE
/007010080C40B01840F812CF717700701F7AFF12BC
/00801009701E78FF40DB0D590ACC403212150380B9
/0090100A0103707900A06407EF5E02CF40C803CBB5
/00A0100B690140E1036409FB544A03641A1004FFA5
/00B0100CFFAA54F10664190405037F0103707900A2
/00C0100DA0B040DF126905402F1500001503800179
/00D0100E03707900A06409FB04FFFFAA54F10669D3
/00E0100F01542103B020050001035A05C307FBC278
/00F01010170463037079 00A0A0AA620502FD641A97
/0100100220641F20486B4E4B24ACFF3453044CD9CF
/011010033C550A40C5AC63B04E316704F8150A80B8
/01201004640ACF4E44690F644A08C951FA550208CF
/0130100540F812F1641A10690F4869C951FB5502BE
/01401006 0840F812F2486BCB4CD93C640AEF30B0DF
/01501007 4FD3C6690440E103D0640AEF6407FF64D5
/0160100806FF04FFFFAA407C04550980C85B0254DD
/01701009410254A40240EC03641A1055020840DF8B
/0180100A12F9690E4DD4690F4DD164022069084DCD
/0190100BD068FF04FFFF6ACC75B754C5750654C101
/01A0100C4269006BFE3400FF2401FF3B31710101A9
/01B0100D707A00FF7102017069 00C047201502027A
/01C0100E69266303707900A040AD03701F30007083
/01D0100F1EC1FFBA6407FF6406FF69504DCC6400F3
/01E0101080640140640220690 04DD269034DD36996
/01F010110E4DD4690F4DD1AA1068FF1071B75471DA
/02001003065470690 0C04701C847024E3457804E9D
/0210100430 5902DF40C803CC71AC1E140C05701EBB
/02201005ADFF4F3571AC2214F401701EADFF71AFF7
/02301006324F260502FE40EC03641A1040AD034EAB
/02401007340502FE40EC03641A10550B404E434098
/02501008AD03706900C047014E254702D270690093
/02601009C04702CB5780F640C803F240AD03D014B5
/0270100A320040131570690 0C04702F95780F6558D
/0280100B02024FA06908150B4040E10340EC03648E
/0290100C1A10706900C05702F9050BBF143200408C
/02A0100D13154F9D40C803C840AD03690140E103A6
/02B0100E40EC0344000034A4FF489548954895 48B6
/02C0100F9571980071AC00050CFB69F734A11C64BE
/02D010101A10703EB8FF4843004DC740EB126902BD
/02E01011402F156900402F1540F812706900C04089
/02F01012C8034E1740AD035502024F1C69015B029F
/030010044F8440E10340EC03641A1040541101 9287
/03101005411A4CC1744A01482560924702 4FC469AA
/03201006026300641F0855020254D3010502F7647C
/03301007194069034F505809C8645A08548201AAAB
/03401008626 45A08548201 6409FB640A7F05037FB2
/03501009010370790 0A0641F205A024E210502FB88
/0360100A15030201037079 00A0550A10CE0509EF8A
/0370100B5B09C8690040E80C40B01854A4024844A7
/0380100C0048430040A30D1503060503E701037068
/0390100D7900A05B025441020503FB010370790079
/03A0100EA054A402B04CE340FE12A0AA62706900AF
/03B0100FC04704B8010307DF707900A06901402F9B
/03C010101501037079 00A0B8B0706900C04704CC92
/03D0101140AD03A0550220B8150220B9A00502DF94
/03E01012B85E0A6304640ACF150A40B8A1BA69FDDE
/03F010134DCA690F4DC904FFFF6407FF6406FDAA1A
/040010052106 05F40D46053D05280507053D085E98
/041010060 85A0788087308 4308E00744095209D39D
/0420100709780A870A9C0AA90AB00AB70ACB0AD2D8
/043010080ADE0AA808CF08AE09BC09DA08070BCCF6
/044010090CB006DB069A0BCB06D408E308690603C0
/0450100A0BD90C0002010000000000002000000032
/0460100B000000000000000000000000010202000106
/0470100C02020002020300020200000355 0980C942
/0480100D0503FD0103707900A055020840F812407F
/0490100EC40440EF04703F7AFF703E78FF5809D2EB
/04A0100F44000014A8615809C91374FDF9690654B2
/04B01010210355020 4B8550980B81503020103706D
/04C010117900A0B8700EBAFF55020840F8124401B0
/04D010120401AC48257041145 30474BDC5B74883A8
/04E01013482869 2071BBFF700FBAFF40E103B85BE5
/04F0101402B85B09B8550910B8690040E80C40B0AC
/0500100618580940F812B85B02C640EB12640EFEC9
/05101007340000440040690070C574FFFB641E0197
/052010086700B8690754E4045F0AC6050A7F6909C2
/05301009C8050ABF010471040040730DB83409FFAA
/0540100A690340630DB840DF0C15020158AD05029F
/0550100BFEC315AD0115094040F8126900637740A5
/0560100CE80C40B01840F8125B094E565802C540B2
/0570100D20164E4E40111814FD000509BF4057069B
/0580100E15094040FC05346009703EBDFF717700B1
/0590100F407A1235BC28C6403C06F24E25407A12AE
/05A0101001BB74B8BCC6403C06F34E1640111814B6
/05B01011FFFF405706403212401118403E1405028E
/05C01012FEB80509F740111814C80015094055029B
/05D010130140570640FC0501845892C6690059929A
/05E0101469FF63870184559201C669FF59926900CF
/05F01015638814FAFF4057060502FEB80509FD34D3
/06001007200340971167004E2015090240CD114070
/061010082E0640CD11402E0671AE0171AD46405DAF
/06201009070184638E401419B86905542103209289
/0630100A059203018858920187638EB871AD1471AA
/0640100BAE01405D0734BDFF4883691470614893C4
/0650100C14000074EDB9B8240000702E78FF701EB2
/0660100D7AFF403E1440DB0DB8706900C05701C4C4
/0670100E550301C5690854E4040503FB0103707992
/0680100F00A06400606409BF14200340C803C35484
/06901010F40269F9402F1553F252F0407C146392B6
/06A01011018858920187638F638E150208548605A4
/06B0101240DF0C40190E050AFD150204345300489A
/06C010134400703EB8FF6407EF4E2640DF0C0177D4
/06D0101440E80C40B0184014194FDB050ADF40DFC7
/06E010150C40190E5A0AC25D0B403212150A024F9D
/06F01016C8641A10590AC91503800103707900A08D
/070010084CC01D6903589269014DC81C6902402FBC
/07101009150C4DC84CE074E08E5992483A74C091D7
/0720100A4DC0550380C96901402F15483A4FE260B4
/0730100BE5461026DFCB6900402F15483A483A4FC8
/0740100CD064190405037F0103707900A06409FB5
/0750100D690640E10320C3004FB740DF0C01ADB0B0
/0760100E15090245AE010509FD4E6A1509046901A2
/0770100F459202C5483A0509FB1A550902CA483AB7
/078010101A0109160463090A74C08E638E0A74C0A9
/079010118F638F40DF12018474E08E450904483AC5
/07A0101274B0844E30550B084E2B407C1474E892BB
/07B010134E2363923487FF559201324CC074E091B9
/07C01014459202483A70C3638E0190459202483A9D
/07D0101574C08E638F30AD4F92A063AD401419B8D5
/07E0101640DF0C40EB07B5406A0DB869504DCC44D9
/07F01017FFFF48D2484500341208703EB8FF40CFE6
/0800100912700EB1FF5802C630BFFD30C0FA40DFE4
/0810100A12FC69544DCC700FB1FF343208703EB8DE
/0820100BFF40CF12AA5802C630BFFD30C0FA40DFF6
/0830100C12FC48C0700FB1FF40DB12AAB8019C40D6
/0840100D730DB85B02C640EB12640EFE34007869C8
/0850100E07B06BFF40630DA051F7641E01B85B02C0
/0860100FC640EB12640EFE3400FF6BFF40630D64DF
/087010101E01B85B02C640EB12640EFE3400FF6BD2
/08801011EF40490D641E01B840DF0C450908CB01C6
/089010127740E80C40B018401419407811407A128C
/08A01013701FBBFF406A0DB840DF0C40190E5A0AE0
/08B01014C25D0B403212150A0215020434B5007073
/08C010153EB8FF4843006407F7641A1054F10664BB
/08D010161A804FD4641A8054DB06701FADFF701EDD
/08E010177AFFB801AE1D740D03482148211C0103B3
/08F01018747D00C507FD1704CC1706745D0107FDC6
/0900100A745D0207FB707900A0402D090103747DA0
/0910100B00C5170207FBC21706707900A0402D0995
/0920100C743401C24FC80103707900A0B801AD519E
/0930100D1A6B4A5B02C440DF12C56907402F1553B9
/0940100EF252EEB840DF0C401118701F87FF406ADA
/0950100F0DB840DF0C349909703EB8FF40CF1240DD
/09601010DF1271BB7F71BC0071BD0040DF126480C7
/09701011096904402F154CE074A0BC20BD63BC30BE
/09801012BBE940DB1240DF1234BCFF488348A408E4
/0990101363BB450B0240730DB8B040DF1240DF12B4
/09A010146480096904402F15A0484300AA6240DFA2
/09B010150C01771D4034152B40730DB840DF0C01A2
/09C01016771D40E80C40B01840341501AD3B7079A8
/09D010170080B840DF0C6905150B02B0344B0A48A5
```

```
/09E0101825488C40C803C354F4027177000509BFAD
/09F0101969047041B6702E78FF6903B0702F78FFD6
/0A00100B23702E78FF40DB0D403212A051ED6903BB
/0A10100C580B6901B063771D40E80C40B01840329F
/0A20100D125577FF40570A40481501771D40341597
/0A30100E019B77FF3BA0514FDBA0514F9E140000C9
/0A40100F701E78FF40DB0D050BFDB84000C00040BF
/0A50101001C00140028802701F78FF40FF140A48A7
/0A6010112560C274C077513461FF6047018E74E0B3
/0A7010128F559202483A3BB840DF0C1509086900BA
/0A80101340E80C40B018B80509F740DF0C050AFBCA
/0A901014719500017740E80C40B018B840DF0C69B1
/0AA0101540580B692140730DB840DF0C050BF7B8C1
/0AB0101640DF0C150B08B840DF0C01AD639B1509C8
/0AC010170245AE010509FD40CD11B840DF0C1509BB
/0AD0101810B8706B00C0706A03FF406A0DB801ADBC
/0AE0101977FFC405097FB863034701C34710CC5BCE
/0AF0101A02C90502F7641F28641E011509807079A0
/0B00100C00A0B8150240B8050BBF0502F71503028E
/0B10100D706900C05701DE6419406909402F15059A
/0B20100E03FE0103707900A0408B0D01AD14E8039F
/0B30100F40131551F814B80BBA1503100103707988
/0B40101000A0AAB15C02408B0DA1401315BA050397
/0B501011EF0103707900A0AA140500401315BA1589
/0B60101203080103707900A0AA706BAEFF6A0040A6
/0B7010131315BA0503F70103707900A0AA40A30D94
/0B801014706900C05702B86963402F15706900C098
/0B9010155702B8143200401315B8050BBFA0
/0BA01016150302706900C047014EE44702B8578091
/0BB01017B8BA1503080103707900A0AA408B0D409A
/0BC01018AD03691E706A00C0744A014E3840C803AD
/0BD01019C24E12146400401315706A00C0744A027E
/0BE0101A4E1F514FDF14B80BBA0503F701037079C8
/0BF0101B00A0AAB1140500401315A1690563AE4F95
/0C00100D3714E803E3550B04C9701FADFF401315C1
/0C10100E4E4D01AE1A07F04821482148211C0A07A8
/0C20100F0F48251D01AD1EB2A2B20C1B6A00746BC1
/0C30101000CEBA1503080103707900A0AA40131587
/0C4010110D1B6A00746B00CEBA0503F701037079AD
/0C50101200A0AA401315746601747E004FCAA2BAAE
/0C6010130503F70103707900A0AA1405004013156F
/0C701014BA1503100103707900A0AA706BAFFF6AB7
/0C80101500401315BA0503EF0103707900A0AA558B
/0C9010160210CBBA0503FB0103707900A0AABA15A5
/0CA0101703010103707900A0AA550201D26900346F
/0CB0101809FF240AFF6BB63B3171B75471065415C9
/0CC01019020140EA1A0502FE150208B814F4017091
/0CD0101A1EADFF71AF32549A0B150B04549D0B55DA
/0CE0101B0208B8690254E404B0402A0DA01C1D07A1
/0CF0101C036409E757016419085702641910403482
/0D00100E152B07FE5B0C413400803B6900744CFFBD
/0D10100FD5701F78FF40FF140A482560C260C451CA
/0D2010103461FF60472B63900CB83478FF488314CB
/0D301011A00174BDC85B0C4E0F050CF7CB0867FFF0
/0D401012F4550C08C3150C08B843640AEF645A08C6
/0D501013FC53C1B84849FD641A104CD93D644A08E4
/0D601014FCE8B82D40730D53FAB80B40730D0A40D6
/0D701015730DB8640AEF645A08FC4DD8644A08FCF8
/0D801016641A10645A08FC640AEFB869504DCC64DD
/0D9010171F2014E400701E07FF44102740931D159A
/0DA010180210B869504DCC484500641F2014DF00A5
/0DB01019701E07FF010317046303707900A005027F
/0DC0101AEFB864800B6904402F154CE0050AFB05C7
/0DD0101B09F771950037801509B8150C4040DFA7
/0DE0101C12400C1340FF1340D713401E0E5E0CB8AC
/0DF0101D5809B8FC050CBF0509BF701FADFF0A74F8
/0E00100F0A0F746A0F6AFF701E78FF4821482148DE
/0E101010214821707977FF4FC5150C404FD940DFD8
/0E201011122478FF488434C80064192074BF6409B7
/0E301012DFB5746AFF6419204884701E7AFF74FDFF
/0E401013CA150B200509FE40681AB8050BDF74E5CE
/0E501014080509FD4780C914FFFF7495A8150902D7
/0E601015050AFB150901719500B240E717A255099C
/0E701016404EDB14010074AD4ED414A80274BD4EC7
/0E801017CD641A4069E8590969184DC0050C7F14CF
/0E901018060074AD4E91150C80B2B4017740E80CAF
/0EA01019A4A2690114640074BD4E26690214500091
/0EB0101A74BD4E1D6903143C0074BD4E14690414BB
/0EC0101B320074BD4E0B690514120074BD4E2369AA
/0ED0101C05706148A0A94894481AA87041489459B1
/0EE0101D09C844171114DA104E2644DA1014171195
/0EF0101E4E1E706148A0A94894481AA870414894BF
/0F0010105909C744161114D910C644D91014161196
/0F1010114894A548921114B80F24000034221F118B
/0F20101215090440 3D0FB8A911B6640ABF14DE1DCB
/0F30101311648000692C402F15403D0FB869964DB1
/0F401014DA6485906485804841006 40FFDB83400B6
/0F501015007 19B0614010074ED4E25B54822483399
/0F601016019B482160AB460160BB6601370A690AA0
/0F70101727046904482563 9B40CD1147FFC24E34BF
/0F80101869015909483A74C092070363920188589E
/0F90101992018763 8EA974FF4FC1150C100509FED4
/0FA0101A550210641F2040681A550210408B0D057C
/0FB0101B0CEF69000509FEB8690358926 9014DC8D5
/0FC0101C4CC107031A482260926393 14F20F5509A0
/0FD0101D025100070374F89214B80F6901402F1591
/0FE0101E4CE074B886C5321011AA6274A88514B8C1
/0FF0101F0FF401931B4CC107031A482260926393A3
/1000100260E35909483A07035703C844A31F74BFBE
/10101003C26904A65A09C37041C27061B62B60E5B7
/10201004461E701F80FFA57041B54CC044000070AC
/10301005E94E24639770B9CF483A44FFFF192970F7
/104010064148A048A009CB1929706148A048A009A9
/10501007483A74C0974DC06480005A094E6D701FC3
/106010087CFFA574BE4E62146E101011AA620193C4
/107010091B4CC107031A48226092639360E35909A2
/1080100A483A07035703C844A31F74BFC26904A6C1
/1090100B7041B66918590969E84DC0701F7CFFA5E5
/10A0100CA874E6701F7EFF74C5B6A548A434FC1F03
/10B0100D488E69037061B7701F82FF701E80FF05D4
/10C0100E09FB14F20F1011AA6232F744060074AEB3
/10D0100FC714DE1D1011AA6233E8D0C8C8C8C8C8ED
/10E01010C8C8C8C8FFFCF0E4D8CCC0B4A89C90842E
/10F01011786C6054483C3024180C00000000000069
/1100100300000000000000000000000000000000
/1110100400000000000000000000000000000000
/11201005000004101C2834404C5864707C8894A08F
/11301006ACB8C4D0DCE8F4FFFFFFFFFFFFFFFFFF96
/11401007FFFFFFFFFFFFFFFFFFFFFFFFFFFFFFFFE0
/11501008FFFFFFFF4CC074A0A420A563A420A7B805
/116010090 1A563A674E891C674B891C930916900BF
/1170100A63A463A5B82091F640EB12690063A763B5
/1180100BA463A5402F15C340F81240541175A7009A
/1190100CC501A66391B8F0150920703EBFFF719BD4
/11A0100D0240CD1177004E2169015909483A74C09B
/11B0100E92070363920188589201876 38E638F30A4
/11C0100FBF4FDE30C04FDA69000509DFB8550C20E5
/11D0101071BF3240EB12019B5992483A55090248AF
/11E010113A74C08E638E638F6900402F15409914BE
/11F010125D09CB4CC074E0914630269F4E315D0CD2
/12001004C630BFC369FFB84011180188589201 87C6
/1210100574E08455920248 3A550902483A27804FA7
/12201006B2059203407F1474E8924FA76900B869C0
/12301007FFB85B09B871BD0C719500050CFB6407DB
/12401008FF703FB8FFB3050AF734DF00703E07FFFB
/1250100934A11C40CF1240DF125B0AFA641F2040B7
/1260100ADB12559504CB30BD4FDC018E64491863D5
/1270100B8F6407FFA3703EB8FFB80509FB349112EB
/1280100C40CF1240DF125A09FA40DB12AA40DF12CC
/1290100DB8B0B16901402F15C040A312484300A193
/12A0100EA0AA626480096907402F154CE063BB48BB
/12B0100F3A483A483A483A6480096904402F154CB1
/12C01010E063BC15090440EB126904402F15B870A9
/12D010113EB8FF484300640FF7AAB8641F08B840E4
/12E01012EB126903402F1540FC12B8589254F412B5
/12F01013648003B8648001B84CC84DC84CE074E0CE
/130010058E459202483A74C0914DC0B820A225A2B7
/1310100609B871A2006A0320A3C1D201A36A0C67A5
/1320100740CE6A306780C66AC060FAB8C3404E13CF
/13301008345BFF71B3052B1B608A60EA4E0A0A48D1
/1340100921608A60C3B13BA13230B34FE9B83473B9
/1350100AFF69F06B05483826016601483874330 1A8
/1360100BB8744B01F232EE40FF140A6AF057016ACD
/1370100C0F48213473FF6047B8719901050AFB01B6
/1380100D9940E80C40B01840141940321 2701F7A97
/1390100EFF40FF140A482560C21A74C099513461BE
/13A0100FFF6047018E74E08F559202483A3B2099C8
/13B010106904580B690274F8994FC4701F7AFF40DD
/13C01011671374 12FF2B608A3B0177639940E80CC0
/13D0101240B018401419B840271840A01E63897092
/13E010131F78FF40FF143455FF0A60472B63A070D5
/13F010141F78FF345BFF40EE1463A12B639FB870F3
/14001006 1F7AFFA55A0A4E29B44011183425FF40D2
/1410100738 18018F55920101873D018F58920188A3
```

/142010083BA1B1345BFF40EE1416FF1A2B608A3BE2
/14301009A140FF143455FF0A604701913BB8017ABA
/1440100A07031B702F87FF746B00CB0C1A0D40F4C9
/1450100B171C0A1D53F16B173425FF0D3D0C3D1ACE
/1460100C0D1C0A40F4171D534FF16B0501913D53B5
/1470100DFD69FF6B05345BFF3D53FDB840111871F2
/1480100EB100018874A88771B10340F4176A02749C
/1490100FB8876A030A7490B1B8B1B46A004CC84DD2
/14A01010C84CE074B08E6AFF1BA514FFFF559202FF
/14B01011C37495A801917041086700C92780C369AA
/14C0101200C469FFC1094DC0A4A1B83478FF4883E7
/14D0101324080074BEC209B824860274BEC36908BC
/14E01014B824F00374BEC409667DB86900B840FFDF
/14F01015146B0351C50A60470BB848274827F40BB1
/15001007070374 6AFF1400004827 4836B8A4483AAC
/15101008483AC0B0695F402F15ACC0C0C0A013B4C5
/1520100944000074FD540D15A4B8483A483AC051B0
/1530100A542A15B8701F78FF40FF140D48264826CE
/1540100B60C2340DFF6047B869A0639B70790080BF
/1550100C4055091A66A6460226FBC1B80A27A64EC1
/1560100D3966A6482148216700411A019B60B24E9D
/1570100E72639B70790080405509 1A66A646022697
/1580100FFBC1B80A37A64FD9CC019B7079008040D7
/15901010550937A6B8209BF14E3A66A6483A4821C9
/15A010114821670041 1A019B60A24E28639B7079A3
/15B0101200804055091A66A6460226FBC1B80A27A7
/15C01013A64FD7CC019B707900804055 0927A6B8C6
/15D01014309BF1CF69FF639B7079008040550937CC
/15E01015A6EEB86901639B7079008040550927A6BB
/15F010164FA3719BFFB866304821670041 1A019BBD
/1600100860B2B8B96630483A4821670041 1A019BA3
/1610100960A2B8B9407A1201BB74C0BC48311AB8C4
/1620100A69A0639B707900804014166630461 02687
/1630100BDFC24E6C0A27304E3440F615B8639B70D3
/1640100C790080401416663046 1026DFC24E510A96
/1650100D3730E6209BC1B8019B3400803B40141699
/1660100E6630461026DFC24E370A2730E6400416A1
/1670100FB8639B3400803B4014166630461026DF9B
/16801010C24E1D0A2730E6309BC1B8019B707900BB
/16901011804014166630461026DFC1C40A3730E79F
/16A01012019B63BE71BD0671AE0071AD02401416AE
/16B0101301BB74B0BC483A40BF174E6001BB63BFD5
/16C0101474B8BC4E2E01BC63BF405D0740141640C3
/16D01015BF174E4801BC74B8BF40CC1701BC63BFEF
/16E0101674B0BBC701BC40D3174FDE40CC1730BDE0
/16F01017D54E29405D0740141640BF174E1E01BBBA
/1700100974B8BF40CC1701BB63BF74B0BCC701BBED
/1710100A40D3174FDE40CC1730BD4FEA019B240DDC
/1720100BFF3C340DFF6B1631150B02404815050BB4
/1730100CFD019B67FF4E0B240DFF3C340DFF6B1603
/1740100D31B901BE639B70790080401416663046 97
/1750100E0226FBC4019B4FDF0A27304E3140F615C3
/1760100FB8639B707900804014166630460226FB9C
/17701010C4019B4FC20A37304FE3209BC1B8019BCC
/17801011707900804014162730F0019B4FA940048D
/1790101216B8639B707900804014166630460226 89
/17A01013FBC4019B4F910A27304FE3309BC1B801CE
/17B010149B707900804014163730F0019B4F780197
/17C01015BB74B0BC483A460A26EBB9B801AE1601D9
/17D0101663AEB84400001848A048A048A0483E69B3
/17E01017207061 0963ADB8702F9DFF702E87FF01DD
/17F01018A06391B8B4B1701F84FF6A00A548A470CC
/1800100A61B50B746A00C76900742A8069FFA1A4C4
/1810100BB86480006904402F154CE063876904 40A0
/1820100C2F154CE16388B8701F78FF3425FF4038E1
/1830100D182D639D2B639EB840FF14482648266 0CC
/1840100E1A48260A6047B8550910B8459504B840A6
/1850100FF8124598034E21701F78FF40FF140A48CD
/186010102560C21A74C098513461FF6047018E74B3
/18701011E08F559202483A3B719500050CFB050AB3
/18801012FB01986A03580B6A0141608A639840E8B9
/189010130C40B018759800B8159505050AFE150AA9
/18A0101404701F78FF4067137412FF2B608A3BB8CF
/18B01015019055920248 3A74C08F638E0185460AA9
/18C0101674A88EC70186760A74B88E638EB85595EA
/18D0101704B86A0057806A80460226FBC24E2640AD
/18E01018F812759500CA719502745A80159580B8B3
/18F01019019560924780B8559501CA159501019599
/1900100B16806395B871950564591 8B8150A04019D
/1910100C8E638FB871B3FF64097F40EB12718B00E1
/1920100D718C0071B60A4CC0639430B3C24EE101B2
/1930100E92411A4CC1744A014825609257024E729F
/1940100F40991474E094460326F94FD730B64FDAD3
/195010104CE074E08E460426F7C8B80B460E26E3DC
/196010114FC171B60A30B3C24FC34CC84DC84CE0EB
/1970101274E08E459202483A1B6A00745B806AFFCB
/19801013348BFF488374C5085780C924780074AED4
/19901014CD2091C82488FF74BEC4309174E64893E5
/19A010150B74C0914DC00B460426F74FAE30B64FD2
/19B01016B4B85C0C4E7A4CC107031A4822609263BE
/19C010179341070374E892CE41070374F8924F70B7
/19D010186940718D01C569C0718DFF4DC071BBFFF1
/19E0101971BC194CC107031A48226092 1A74F893B5
/19F0101AC830BBEF30BCEC4E3274E0935702C420DA
/1A00100C8D00C3308D00658D004F350A63934FCDC2
/1A10100D71B61430B6C1B8409914019241 1A4CC1A6
/1A20100E744A014825609247024FE8690454210396
/1A30100F6480006905402F15140000701E8BFF7195
/1A401010B60A6902402F1540A41D248BFF488214B9
/1A5010111000 74C514DEFF74A54FE430B6E41400C5
/1A60101200701E8BFF541419702F9DFF702E87FFEF
/1A7010134 07F14450B206392018858920187550995
/1A80101408C5550B20018F638F550C80C5017740AA
/1A901015E80C40B018401419050C7F5B09B85C09BA
/1AA01016C4403212B85E0C4E3701A11A019F608AB2
/1AB0101760FA4E1D018F638E690040E80C401419BE
/1AC01018403212 40FF13017740E80C40B018401488
/1AD010191970 1F78FF4067132B608A60EA407913BE
/1AE0101A150A0171980071 9500B83001CF40DB1291
/1AF0101B0502FE710101641940 54F402698063918E
/1B00100D6384690063AD15094063A763A863A463AC
/1B10100EA563A67185B071865064800F6904402FAC
/1B20100F154CE07176024780C6150B017176040590
/1B30101000BF150C086400806409BF69A03400809B
/1B4010113B40C20D5509084E43406D1C407C1463AA
/1B50101292018858920187638E638F550210641FAA
/1B6010132040141955021064 0FDF343C000509FD97
/1B701014409711 16FF639C57FF4E111509023400AF
/1B8010150040971157FF4E04209C00F26400A01497
/1B901016FFC40C803C354F4026902402F1553F2C3
/1BA0101752F0407C146392018858920187638F63A8
/1BB010188E40771C019234991C4825488C3487FFCE
/1BC010194893340DFF69A06B173D53FD01921490CA
/1BD0101A016043150C2015094040570647FFD11588
/1BE0101B090244FF00404E0F47FFF7050CDF4FB2E2
/1BF0101C050CDF40781140C803C354F4020509FDB4
/1C00100E719B0140CD11719203018774C088483199
/1C10100F638640CD117192020187638E638F40CDB7
/1C2010101171920101877 4C0884831638574C08698
/1C30101148316384638E638F0191B0550210641FA1
/1C401012204014195502106 40FDFA0639140C8038F
/1C501013C354F4025C02CC40A30D0503FB010370A3
/1C6010147900A04052057101050 50AFBB848430087
/1C7010154843FD4843FDB871B30140C803C354F4CE
/1C8010160248430048 43FD1414004013156909 4078
/1C9010172F154843EF30B3E2B88000FF8080FF00CF
/1CA0101880484300AAB0B1B2B3B45B094EABC048C8
/1CB010193A690040A31240F8124CC0639644844EA8
/1CC0101A40931D019674E0916396460426F74EB2B4
/1CD0101B40EB1201BB74C0BC48311A37FF4E7A27D4
/1CE0101C0D4E7601BB457A0101BC4400001848A09D
/1CF0101D48A048A0483E40F8120966204592024 8A0
/1D00100F3A1A01965992483A60C2B040CE18A074B5
/1D101010C08E58954E0F74E88ECB6A0174A88E6A00
/1D201011FF0A74C08E638E0185460A74A88EC701DD
/1D30101286760A74B88E638E645918C7018E550AD7
/1D40101304638F40F8125509104E2B75AC004E26B1
/1D501014550A0140471840F812400C13550A014E86
/1D60101515701F78FF4067132B608A078860CAC6C9
/1D701016150A01719500150A0840F812A4A3A2A18F
/1D801017A062550C044F49150C044078115509108B
/1D901018E54FC648D269004DCC48450069044DCCDC
/1DA01019640FDFB840A61E6480001C348AFF2B60D4
/1DB0101AE41B6A0057806AFF0C3D488374C54895D9
/1DC0101BB544000001911974E5086700CD2780C59B
/1DD0101C69004DC0B869FF4DC0B8094DC0B840A6E9
/1DE0101D1E648000638A69B44DDA018974E08A55C9
/1DF0101E0902483A6C011A6902743A4041743AC098
/1E0010104160BD6C000A1D4CC0483A4DC0641980BB
/1E1010111640ABF4E5840A61E6480001A74E08A55C2
/1E2010120902483A57806900A67061B648A448A4AA
/1E30101348A448A41B0834801EAC4400001970639E

/1E40101448A448A448A434FFFF450902C37497A8E1
/1E50101569807041B70F746E00C76900742E8069B7
/1E601016FF4DC00A638AA634200074AFC714151ECA
/1E7010171110AA62641F02AA40681A0509FE4FF0B9
/1E80101800020304050608090 90A0A0B0D0E0F0F86
/1E9010191010101111121212121313141415151537
/1EA0101A019E1B019DC54CE11B4CE034BA2274B0CB
/1EB0101B844E361A0B74B084D6602ACC44000018AD
/1EC0101C483EAE6640483AB86B00A5483DAEB848E4
/1ED0101D3A602ACA44000018483EAE4640B86B00AD
/1EE0101EA5483DAE6680483AB8483A1A0B74B084D4
/1EF0101FD6602ACA44000018483EAE6640B86B00B5
/1F001011A5483DAE483AB8483A602ACC44000018C3
/1F101012483EAE66C0483AB86B00A5483DAE4680DF
/1F201013B80000000000000000000000000001010116
/1F3010140101020202020303030404050505060636
/1F401015070708080909 0A0A0B0B0C0D0D0E0E0FAB
/1F501016101111121314141516171818191A1B1C6B
/1F6010171D1E1F202122232425262728292A2B2D96
/1F7010182E2F303133343536383 93A3B3D3E4041A2
/1F801019424445474 84A4B4D4E50515354565759AF
/1F90101A5B5C5E6061636567686A6C6E70717375CB
/1FA0101B77797B7D7F818284868 88A8D8F919395F9
/1FB0101C97999B9D9FA2A4A6A8ABADAFB1B4B6B824
/1FC0101DBBBDBFC2C4C7C9CCCED0D3D5D8DBDDE044
/1FD0101EE2E5E7EAEDEFF2F5F7FAFD000205080B12
/1FE0101F0E101316191C1F2225282B2E3134373A95
/1FF010203D40434649 4C4F5356595C5F211F2D1FCD
/20001003321F361F391F3B1F3E1F401F421F441FCB
/20101004461F481F4A1F4B1F4D1F4F1F501F511FE2
/20201005531F541F551F571F581F591F5A1F5C1FE2
/203010065D1F5E1F5F1F601F611F621F631F641FE1
/20401007651F661F671F681F691F6A1F6B1F6C1FF4
/205010086D1F6E1F6F1F6F1F701F711F721F731FF3
/20601009741F741F751F761F771F781F781F791FEB
/2070100A7A1F7B1F7C1F7C1F7D1F7E1F7E1F7F1F1D
/2080100B801F811F811F821F831F831F841F851FD3
/2090100C851F861F871F871F881F891F891F8A1FFD
/20A0100D8B1F8B1F8C1F8D1F8D1F8E1F8F1F8F1F28
/20B0100E901F901F911F921F921F931F931F941FD7
/20C0100F951F951F961F961F971F971F981F991FFD
/20D01010991F9A1F9A1F9B1F9B1F9C1F9C1F9D1F20
/20E010119E1F9E1F9F1F9F1FA01FA01FA11FA11F08
/20F01012A21FA21FA31FA31FA41FA41FA51FA51FEC
/21001004A61FA71FA71FA81FA81FA91FA91FAA1F10
/21101005AA1FAB1FAB1FAB1FAC1FAC1FAD1FAD1F2D
/21201006AE1FAE1FAF1FAF1FB01FB01FB11FB11F10
/21301007B21FB21FB31FB31FB41FB41FB51FB51FF4
/21401008B51FB61FB61FB71FB71FB81FB81FB91F10
/21501009B91FB91FBA1FBA1FBB1FBB1FBC1FBC1F2C
/2160100ABD1FBD1FBD1FBE1FBE1FBF1FBF1FC01F3A
/2170100BC01FC01FC11FC11FC21FC21FC31FC31FEC
/2180100CC31FC41FC41FC51FC51FC51FC61FC61F06
/2190100DC71FC71FC71FC81FC81FC91FC91FCA1F21
/21A0100ECA1FCA1FCB1FCB1FCC1FCC1FCC1FCD1F3B
/21B0100FCD1FCD1FCE1FCE1FCF1FCF1FCF1FD01F44
/21C01010D01FD11FD11FD11FD21FD21FD31FD31FF5
/21D01011D31FD41FD41FD41FD51FD51FD61FD61F0D
/21E01012D61FD71FD71FD71FD81FD81FD91FD91F25
/21F01013D91FDA1FDA1FDA1FDB1FDB1FDB1FDC1F3C
/22001005DC1FDD1FDD1FDD1FDE1FDE1FDE1FDF1F54
/22101006DF1FDF1FE01FE01FE01FE11FE11FE21F10
/22201007E21FE21FE31FE31FE31FE41FE41FE41F09
/22301008E51FE51FE51FE61FE61FE61FE71FE71F1F
/22401009E71FE81FE81FE81FE91FE91FE91FEA1F34
/2250100AEA1FEA1FEB1FEB1FEB1FEC1FEC1FEC1F49
/2260100BED1FED1FED1FEE1FEE1FEE1FEF1FEF1F5F
/2270100CEF1FF01FF01FF01FF11FF11FF11FF21F0B
/2280100DF21FF21FF31FF31FF31FF41FF41FF41F11
/2290100EF51FF51FF51FF61FF61FF61FF71FF71F27
/22A0100FF71FF71FF81FF81FF81FF91FF91FF91F39
/22B01010FA1FFA1FFA1FFB1FFB1F000000000000CF
/22C0101100010101010101020202020202030303 1B
/22D01012030303030404040404040505050505 0542
/22E0101306060606060606070707070707080808 6C
/22F010140808080809090909090909 0A0A0A0A0A91
/230010060A0B0B0B0B0B0B0B0C0C0C0C0C0C0C0DB8
/231010070D0D0D0D0D0D0E0E0E0E0E0E0E0F0F0FDD
/232010080F0F0F0F0F1010101010101011111111 5A
/23301009111111111112121212121212131313131331
/2340100A13131314141414141414141515151551
/2350100B15151515161616161616161617171776F
/2360100C17171717171718181818181818198B
/2370100D19191919191919191A1A1A1A1A1A1AA8
/2380100E1A1A1B1B1B1B1B1B1B1B1B1B1C1C1CC1
/2390100F1C1C1C1C1C1C1C1D1D1D1D1D1D1D1D1DD9
/23A010101D1D1D1E1E1E1E1E1E1E1E1E1E1F1FEF
/23B010111F1F1F1F1F1F1F1F1F20000000000000A2
/23C010120000000000000000000000000000000000
/23D010130000000000000000000000000000000000
/23E010140000000000000000000000000000000000
/23F010150000000000000000000000000000000000
/240010070000000000000000000000000000000000
/241010080000000000000000000000000000000000
/242010090000000000000000000000000000000000
/2430100A0000000000000000000000000000000000
/2440100B0000000000000000000000000000000000
/2450100C0000000000000000000000000000000000
/2460100D0000000000000000000000000000000000
/2470100E0000000000000000000000000000000000
/2480100F0000000000000000000000000000000000
/249010100000000000000000000000000000000000
/24A010110000000000000000000000000000000000
/24B010120000000000000000000000000000000000
/24C010130000000000000000000000000000000000
/24D010140000000000000000000000000000000000
/24E010150000000000000000000000000000000000
/24F010160000000000000000000000000000000000
/250010080000000000000000000000000000000000
/251010090000000000000000000000000000000000
/2520100A0000000000000000000000000000000000
/2530100B0000000000000000000000000000000000
/2540100C0000000000000000000000000000000000
/2550100D0000000000000000000000000000000000
/2560100E0000000000000000000000000000000000
/2570100F0000000000000000000000000000000000
/258010100000000000000000000000000000000000
/259010110000000000000000000000000000000000
/25A010120000000000000000000000000000000000
/25B010130000000000000000000000000000000000
/25C010140000000000000000000000000000000000
/25D010150000000000000000000000000000000000
/25E010160000000000000000000000000000000000
/25F010170000000000000000000000000000000000
/260010090000000000000000000000000000000000
/2610100A0000000000000000000000000000000000
/2620100B0000000000000000000000000000000000
/2630100C0000000000000000000000000000000000
/2640100D0000000000000000000000000000000000
/2650100E0000000000000000000000000000000000
/2660100F0000000000000000000000000000000000
/267010100000000000000000000000000000000000
/268010110000000000000000000000000000000000
/269010120000000000000000000000000000000000
/26A010130000000000000000000000000000000000
/26B010140000000000000000000000000000000000
/26C010150000000000000000000000000000000000
/26D010160000000000000000000000000000000000
/26E010170000000000000000000000000000000000
/26F010180000000000000000000000000000000000
/2700100A0000000000000000000000000000000000
/2710100B0000000000000000000000000000000000
/2720100C0000000000000000000000000000000000
/2730100D0000000000000000000000000000000000
/2740100E0000000000000000000000000000000000
/2750100F0000000000000000000000000000000000
/276010100000000000000000000000000000000000
/277010110000000000000000000000000000000000
/278010120000000000000000000000000000000000
/279010130000000000000000000000000000000000
/27A010140000000000000000000000000000000000
/27B010150000000000000000000000000000000000
/27C010160000000000000000000000000000000000
/27D010170000000000000000000000000000000000
/27E010180000000000000000000000000000000000
/27F010190000000000000000000000000000000000
/2800100B0000000000000000000000000000000000
/2810100C0000000000000000000000000000000000
/2820100D0000000000000000000000000000000000
/2830100E0000000000000000000000000000000000
/2840100F0000000000000000000000000000000000
/285010100000000000000000000000000000000000
/286010110000000000000000000000000000000000
/287010120000000000000000000000000000000000

```
/28801013000000000000000000000000000000000
/28901014000000000000000000000000000000000
/28A01015000000000000000000000000000000000
/28B01016000000000000000000000000000000000
/28C01017000000000000000000000000000000000
/28D01018000000000000000000000000000000000
/28E01019000000000000000000000000000000000
/28F0101A000000000000000000000000000000000
/2900100C000000000000000000000000000000000
/2910100D000000000000000000000000000000000
/2920100E000000000000000000000000000000000
/2930100F000000000000000000000000000000000
/29401010000000000000000000000000000000000
/29501011000000000000000000000000000000000
/29601012000000000000000000000000000000000
/29701013000000000000000000000000000000000
/29801014000000000000000000000000000000000
/29901015000000000000000000000000000000000
/29A01016000000000000000000000000000000000
/29B01017000000000000000000000000000000000
/29C01018000000000000000000000000000000000
/29D01019000000000000000000000000000000000
/29E0101A000000000000000000000000000000000
/29F0101B000000000000000000000000000000000
/2A00100D000000000000000000000000000000000
/2A10100E000000000000000000000000000000000
/2A20100F000000000000000000000000000000000
/2A301010000000000000000000000000000000000
/2A401011000000000000000000000000000000000
/2A501012000000000000000000000000000000000
/2A601013000000000000000000000000000000000
/2A701014000000000000000000000000000000000
/2A801015000000000000000000000000000000000
/2A901016000000000000000000000000000000000
/2AA01017000000000000000000000000000000000
/2AB01018000000000000000000000000000000000
/2AC01019000000000000000000000000000000000
/2AD0101A000000000000000000000000000000000
/2AE0101B000000000000000000000000000000000
/2AF0101C000000000000000000000000000000000
/2B00100E000000000000000000000000000000000
/2B10100F000000000000000000000000000000000
/2B201010000000000000000000000000000000000
/2B301011000000000000000000000000000000000
/2B401012000000000000000000000000000000000
/2B501013000000000000000000000000000000000
/2B601014000000000000000000000000000000000
/2B701015000000000000000000000000000000000
/2B801016000000000000000000000000000000000
/2B901017000000000000000000000000000000000
/2BA01018000000000000000000000000000000000
/2BB01019000000000000000000000000000000000
/2BC0101A000000000000000000000000000000000
/2BD0101B000000000000000000000000000000000
/2BE0101C000000000000000000000000000000000
/2BF0101D000000000000000000000000000000000
/2C00100F000000000000000000000000000000000
/2C101010000000000000000000000000000000000
/2C201011000000000000000000000000000000000
/2C301012000000000000000000000000000000000
/2C401013000000000000000000000000000000000
/2C501014000000000000000000000000000000000
/2C601015000000000000000000000000000000000
/2C701016000000000000000000000000000000000
/2C801017000000000000000000000000000000000
/2C901018000000000000000000000000000000000
/2CA01019000000000000000000000000000000000
/2CB0101A000000000000000000000000000000000
/2CC0101B000000000000000000000000000000000
/2CD0101C000000000000000000000000000000000
/2CE0101D000000000000000000000000000000000
/2CF0101E000000000000000000000000000000000
/2D001010000000000000000000000000000000000
/2D101011000000000000000000000000000000000
/2D201012000000000000000000000000000000000
/2D301013000000000000000000000000000000000
/2D401014000000000000000000000000000000000
/2D501015000000000000000000000000000000000
/2D601016000000000000000000000000000000000
/2D701017000000000000000000000000000000000
/2D801018000000000000000000000000000000000
/2D901019000000000000000000000000000000000
/2DA0101A000000000000000000000000000000000
/2DB0101B000000000000000000000000000000000
/2DC0101C000000000000000000000000000000000
/2DD0101D000000000000000000000000000000000
/2DE0101E000000000000000000000000000000000
/2DF0101F000000000000000000000000000000000
/2E001011000000000000000000000000000000000
/2E101012000000000000000000000000000000000
/2E201013000000000000000000000000000000000
/2E301014000000000000000000000000000000000
/2E401015000000000000000000000000000000000
/2E501016000000000000000000000000000000000
/2E601017000000000000000000000000000000000
/2E701018000000000000000000000000000000000
/2E801019000000000000000000000000000000000
/2E90101A000000000000000000000000000000000
/2EA0101B000000000000000000000000000000000
/2EB0101C000000000000000000000000000000000
/2EC0101D000000000000000000000000000000000
/2ED0101E000000000000000000000000000000000
/2EE0101F000000000000000000000000000000000
/2EF01020000000000000000000000000000000000
/2F001012000000000000000000000000000000000
/2F101013000000000000000000000000000000000
/2F201014000000000000000000000000000000000
/2F301015000000000000000000000000000000000
/2F401016000000000000000000000000000000000
/2F501017000000000000000000000000000000000
/2F601018000000000000000000000000000000000
/2F701019000000000000000000000000000000000
/2F80101A000000000000000000000000000000000
/2F90101B000000000000000000000000000000000
/2FA0101C000000000000000000000000000000000
/2FB0101D000000000000000000000000000000000
/2FC0101E000000000000000000000000000000000
/2FD0101F000000000000000000000000000000000
/2FE01020000000000000000000000000000000000
/2FF01021000000000000000000000000000000000
/30001004000000000000000000000000000000000
/30101005000000000000000000000000000000000
/30201006000000000000000000000000000000000
/30301007000000000000000000000000000000000
/30401008000000000000000000000000000000000
/30501009000000000000000000000000000000000
/3060100A000000000000000000000000000000000
/3070100B000000000000000000000000000000000
/3080100C000000000000000000000000000000000
/3090100D000000000000000000000000000000000
/30A0100E000000000000000000000000000000000
/30B0100F000000000000000000000000000000000
/30C01010000000000000000000000000000000000
/30D01011000000000000000000000000000000000
/30E01012000000000000000000000000000000000
/30F01013000000000000000000000000000000000
/31001005000000000000000000000000000000000
/31101006000000000000000000000000000000000
/31201007000000000000000000000000000000000
/31301008000000000000000000000000000000000
/31401009000000000000000000000000000000000
/3150100A000000000000000000000000000000000
/3160100B000000000000000000000000000000000
/3170100C000000000000000000000000000000000
/3180100D000000000000000000000000000000000
/3190100E000000000000000000000000000000000
/31A0100F000000000000000000000000000000000
/31B01010000000000000000000000000000000000
/31C01011000000000000000000000000000000000
/31D01012000000000000000000000000000000000
/31E01013000000000000000000000000000000000
/31F01014000000000000000000000000000000000
/32001006000000000000000000000000000000000
/32101007000000000000000000000000000000000
/32201008000000000000000000000000000000000
/32301009000000000000000000000000000000000
/3240100A000000000000000000000000000000000
/3250100B000000000000000000000000000000000
/3260100C000000000000000000000000000000000
/3270100D000000000000000000000000000000000
/3280100E000000000000000000000000000000000
/3290100F000000000000000000000000000000000
/32A01010000000000000000000000000000000000
/32B01011000000000000000000000000000000000
```

```
/32C0101200000000000000000000000000000000000
/32D0101300000000000000000000000000000000000
/32E0101400000000000000000000000000000000000
/32F0101500000000000000000000000000000000000
/3300100700000000000000000000000000000000000
/3310100800000000000000000000000000000000000
/3320100900000000000000000000000000000000000
/3330100A00000000000000000000000000000000000
/3340100B00000000000000000000000000000000000
/3350100C00000000000000000000000000000000000
/3360100D00000000000000000000000000000000000
/3370100E00000000000000000000000000000000000
/3380100F00000000000000000000000000000000000
/3390101000000000000000000000000000000000000
/33A0101100000000000000000000000000000000000
/33B0101200000000000000000000000000000000000
/33C0101300000000000000000000000000000000000
/33D0101400000000000000000000000000000000000
/33E0101500000000000000000000000000000000000
/33F0101600000000000000000000000000000000000
/3400100800000000000000000000000000000000000
/3410100900000000000000000000000000000000000
/3420100A00000000000000000000000000000000000
/3430100B00000000000000000000000000000000000
/3440100C00000000000000000000000000000000000
/3450100D00000000000000000000000000000000000
/3460100E00000000000000000000000000000000000
/3470100F00000000000000000000000000000000000
/3480101000000000000000000000000000000000000
/3490101100000000000000000000000000000000000
/34A0101200000000000000000000000000000000000
/34B0101300000000000000000000000000000000000
/34C0101400000000000000000000000000000000000
/34D0101500000000000000000000000000000000000
/34E0101600000000000000000000000000000000000
/34F0101700000000000000000000000000000000000
/3500100900000000000000000000000000000000000
/3510100A00000000000000000000000000000000000
/3520100B00000000000000000000000000000000000
/3530100C00000000000000000000000000000000000
/3540100D00000000000000000000000000000000000
/3550100E00000000000000000000000000000000000
/3560100F00000000000000000000000000000000000
/3570101000000000000000000000000000000000000
/3580101100000000000000000000000000000000000
/3590101200000000000000000000000000000000000
/35A0101300000000000000000000000000000000000
/35B0101400000000000000000000000000000000000
/35C0101500000000000000000000000000000000000
/35D0101600000000000000000000000000000000000
/35E0101700000000000000000000000000000000000
/35F0101800000000000000000000000000000000000
/3600100A00000000000000000000000000000000000
/3610100B00000000000000000000000000000000000
/3620100C00000000000000000000000000000000000
/3630100D00000000000000000000000000000000000
/3640100E00000000000000000000000000000000000
/3650100F00000000000000000000000000000000000
/3660101000000000000000000000000000000000000
/3670101100000000000000000000000000000000000
/3680101200000000000000000000000000000000000
/3690101300000000000000000000000000000000000
/36A0101400000000000000000000000000000000000
/36B0101500000000000000000000000000000000000
/36C0101600000000000000000000000000000000000
/36D0101700000000000000000000000000000000000
/36E0101800000000000000000000000000000000000
/36F0101900000000000000000000000000000000000
/3700100B00000000000000000000000000000000000
/3710100C00000000000000000000000000000000000
/3720100D00000000000000000000000000000000000
/3730100E00000000000000000000000000000000000
/3740100F00000000000000000000000000000000000
/3750101000000000000000000000000000000000000
/3760101100000000000000000000000000000000000
/3770101200000000000000000000000000000000000
/3780101300000000000000000000000000000000000
/3790101400000000000000000000000000000000000
/37A0101500000000000000000000000000000000000
/37B0101600000000000000000000000000000000000
/37C0101700000000000000000000000000000000000
/37D0101800000000000000000000000000000000000
/37E0101900000000000000000000000000000000000
/37F0101A00000000000000000000000000000000000
/3800100C00000000000000000000000000000000000
/3810100D00000000000000000000000000000000000
/3820100E00000000000000000000000000000000000
/3830100F00000000000000000000000000000000000
/3840101000000000000000000000000000000000000
/3850101100000000000000000000000000000000000
/3860101200000000000000000000000000000000000
/3870101300000000000000000000000000000000000
/3880101400000000000000000000000000000000000
/3890101500000000000000000000000000000000000
/38A0101600000000000000000000000000000000000
/38B0101700000000000000000000000000000000000
/38C0101800000000000000000000000000000000000
/38D0101900000000000000000000000000000000000
/38E0101A00000000000000000000000000000000000
/38F0101B00000000000000000000000000000000000
/3900100D00000000000000000000000000000000000
/3910100E00000000000000000000000000000000000
/3920100F00000000000000000000000000000000000
/3930101000000000000000000000000000000000000
/3940101100000000000000000000000000000000000
/3950101200000000000000000000000000000000000
/3960101300000000000000000000000000000000000
/3970101400000000000000000000000000000000000
/3980101500000000000000000000000000000000000
/3990101600000000000000000000000000000000000
/39A0101700000000000000000000000000000000000
/39B0101800000000000000000000000000000000000
/39C0101900000000000000000000000000000000000
/39D0101A00000000000000000000000000000000000
/39E0101B00000000000000000000000000000000000
/39F0101C00000000000000000000000000000000000
/3A00100E00000000000000000000000000000000000
/3A10100F00000000000000000000000000000000000
/3A20101000000000000000000000000000000000000
/3A30101100000000000000000000000000000000000
/3A40101200000000000000000000000000000000000
/3A50101300000000000000000000000000000000000
/3A60101400000000000000000000000000000000000
/3A70101500000000000000000000000000000000000
/3A80101600000000000000000000000000000000000
/3A90101700000000000000000000000000000000000
/3AA0101800000000000000000000000000000000000
/3AB0101900000000000000000000000000000000000
/3AC0101A00000000000000000000000000000000000
/3AD0101B00000000000000000000000000000000000
/3AE0101C00000000000000000000000000000000000
/3AF0101D00000000000000000000000000000000000
/3B00100F00000000000000000000000000000000000
/3B10101000000000000000000000000000000000000
/3B20101100000000000000000000000000000000000
/3B30101200000000000000000000000000000000000
/3B40101300000000000000000000000000000000000
/3B50101400000000000000000000000000000000000
/3B60101500000000000000000000000000000000000
/3B70101600000000000000000000000000000000000
/3B80101700000000000000000000000000000000000
/3B90101800000000000000000000000000000000000
/3BA0101900000000000000000000000000000000000
/3BB0101A00000000000000000000000000000000000
/3BC0101B00000000000000000000000000000000000
/3BD0101C00000000000000000000000000000000000
/3BE0101D00000000000000000000000000000000000
/3BF0101E00000000000000000000000000000000000
/3C00101000000000000000000000000000000000000
/3C10101100000000000000000000000000000000000
/3C20101200000000000000000000000000000000000
/3C30101300000000000000000000000000000000000
/3C40101400000000000000000000000000000000000
/3C50101500000000000000000000000000000000000
/3C60101600000000000000000000000000000000000
/3C70101700000000000000000000000000000000000
/3C80101800000000000000000000000000000000000
/3C90101900000000000000000000000000000000000
/3CA0101A00000000000000000000000000000000000
/3CB0101B00000000000000000000000000000000000
/3CC0101C00000000000000000000000000000000000
/3CD0101D00000000000000000000000000000000000
/3CE0101E00000000000000000000000000000000000
/3CF0101F00000000000000000000000000000000000
```

/3D0010110000000000000000000000000000000000
/3D1010120000000000000000000000000000000000
/3D2010130000000000000000000000000000000000
/3D3010140000000000000000000000000000000000
/3D4010150000000000000000000000000000000000
/3D5010160000000000000000000000000000000000
/3D6010170000000000000000000000000000000000
/3D7010180000000000000000000000000000000000
/3D8010190000000000000000000000000000000000
/3D90101A0000000000000000000000000000000000
/3DA0101B0000000000000000000000000000000000
/3DB0101C0000000000000000000000000000000000
/3DC0101D0000000000000000000000000000000000
/3DD0101E0000000000000000000000000000000000
/3DE0101F0000000000000000000000000000000000
/3DF010200000000000000000000000000000000000
/3E0010120000000000000000000000000000000000
/3E1010130000000000000000000000000000000000
/3E2010140000000000000000000000000000000000
/3E3010150000000000000000000000000000000000
/3E4010160000000000000000000000000000000000
/3E5010170000000000000000000000000000000000
/3E6010180000000000000000000000000000000000
/3E7010190000000000000000000000000000000000
/3E80101A0000000000000000000000000000000000
/3E90101B0000000000000000000000000000000000
/3EA0101C0000000000000000000000000000000000
/3EB0101D0000000000000000000000000000000000
/3EC0101E0000000000000000000000000000000000
/3ED0101F0000000000000000000000000000000000
/3EE010200000000000000000000000000000000000
/3EF010210000000000000000000000000000000000
/3F0010130000000000000000000000000000000000
/3F1010140000000000000000000000000000000000
/3F2010150000000000000000000000000000000000
/3F3010160000000000000000000000000000000000
/3F4010170000000000000000000000000000000000
/3F5010180000000000000000000000000000000000
/3F6010190000000000000000000000000000000000
/3F70101A0000000000000000000000000000000000
/3F80101B0000000000000000000000000000000000
/3F90101C0000000000000000000000000000000000
/3FA0101D0000000000000000000000000000000000
/3FB0101E0000000000000000000000000000000000
/3FC0101F0000000000000000000000000000000000
/3FD010200000000000000000000000000000000000
/3FE010210000000000000000000000000000000000
/3FF010220000000000000000000000000000001D0E
/00000000

Having thus described an embodiment of the invention, it will now be appreciated that the objects of the invention have been fully achieved in realizing a removable and transportable hard disk subsystem for use with one or more host computers, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

We claim:

1. Apparatus for controlling a disk drive data storage subsystem for use with a computing system, said data storage subsystem including a controller unit enabling connection of said subsystem to data, address and control buses of a host computing system, at least one base unit connected to said controller unit by a single cable, and a removable data storage module for plug-in connection with said base unit, said module including:

an enclosed module frame having a multi-contact plug-in connection means at a back endwall thereof, an enclosed head and disk assembly shock mounted within said enclosed module frame and including a base, a spindle motor attached to the base for rotating at least one data storage disk at a predetermined angular velocity in response to disk rotation signals, and an electromechanical head transducer actuator structure for positioning at least one data transducer head at selected ones of multiple concentric data tracks of a data storage surface in response to track seeking signals and for maintaining the transducer head in alignment with a selected data track in response to track following signals, and wherein track location head positioning information generated within said assembly includes track following servo information prerecorded on the disk data storage surface and is readable in time-sampled arrangement by the data transducer head, the base unit including:

a base unit frame defining an interior space for receiving said module therein, and multi-contact plug in connection means for mating with said plug-in connection means of said module when it is received therein, base unit programmed microprocessor means connected through said plug-in connection means to said actuator structure and responsive to said track following servo information for commanding said structure to seek to a particular track location during track seeking and for commanding said structure to follow a particular track during track following, the controller unit including:

host bus interface means for receiving commands and blocks of user data from said computing system via its buses and for sending subsystem status and blocks of user data from said storage disk of a said module to said computing system via its buses, cache memory means for caching user data blocks received from and sent to said host computing system via said host bus interface means, user data signal and clock path means between said controller unit and said base unit via said cable, sequencer means connected through said user data signal and clock path means to said base unit for transferring blocks of user data between said cache memory means and said storage disk, cache memory controller means for controlling addressing of said cache memory means, controller microprocessor means connected to supervise said host bus interface means, said sequencer means, said cache memory controller means and said base unit microprocessor means in response to commands received from said host computing system via said buses and said host bus interface means, serial command and data path means directly connected between said base unit microprocessor means and said controller microprocessor means via said cable, said controller microprocessor means being programmed to generate head positioning command bytes and send said operational commands comprising command bytes to said base unit programmed microcontroller means via said serial command and data path means in response to commands received from said host computing system, said base unit microprocessor means being programmed to receive and acknowledge each command byte, decode and execute each operational command, and report status information to said controller microprocessor means via said serial command and data path means.

2. The apparatus set forth in claim 1 wherein said base unit is installable entirely within a well of the computer nominally allotted to receive a 5¼ inch half height disk drive and wherein said head and disk assembly comprises a micro-Winchester head and disk assembly.

3. The apparatus set forth in claim 2 wherein said micro-Winchester head and disk assembly comprises a base casting and a cover for enclosing and sealing an interior space defined by said base casting, a direct drive, D C brushless spindle motor mounted within an opening defined through a bottom wall of the base casting and connected to a speed control spindle motor driver and regulator circuit heat sumped to said base casting, at least one data storage disk mounted to and rotated by said spindle motor, a rotary voice coil head transducer arm actuator structure mounted to said base casting for moving plural head transducers among selected ones of multiple data track cylinder locations defined on storage surfaces of said disk, optical position encoder means having a moving scale attached to said actuator structure and connected to encoder circuitry, head transducer preamplifier and select circuitry connected to said plural head transducers; and, wherein electrical conductor paths lead from said assembly are collected along a single sidewall thereof.

4. The apparatus set forth in claim 1 wherein the base unit includes an electromechanical load/unload mechanism for mechanically loading, and unloading the disk module.

5. The apparatus set forth in claim 4 wherein the base unit comprises sensing means for sensing when a module has been partially loaded into the base unit and wherein the base unit microprocessor is programmed to report the sensed presence of the module to the controller microprocessor via the serial command and data path means and is further programmed to operate the electromechanical load/unload mechanism in response to commands generated by the controller microprocessor and sent to the base unit microprocessor means via the serial command and data path means.

6. The apparatus set forth in claim 4 wherein the load/unload mechanism is formed in a single sidewall of the base unit.

7. The apparatus set forth in claim 6 wherein the load/unload mechanism comprises a bidirectionally rotatable brushed DC motor axially aligned with the longitudinal axis of the said single sidewall, a worm driven by the DC motor, a spur gear transmission mounted to the sidewall and including a worm gear and a pinion, and a rack slideably moveable along a race aligned with the longitudinal axis of the sidewall, the rack for driving releasable engagement means for pulling the module into the base unit during a load operation and eject means for pushing the module out of the base unit during an unload operation.

8. The apparatus set forth in claim 7 wherein the module defines a latch recess formed in a sidewall of the module oppositely facing the sidewall of the base unit containing the load/unload mechanism, and wherein the releasable engagement means of the load/unload mechanism comprises a spring loaded latch pivotally mounted to the rack and having a follower wheel for following a race defined along the inside surface of the said sidewall, the latch having at least one extensible protrusion for engaging said recess formed in the oppositely facing sidewall of the module, the latch protrusion being automatically retracted by a retraction pin when the rack is positioned at a forwardmost position of its travel and the latch protrusion being extended so as to enter the recess and thereupon engage the module when the rack moves the latch rearwardly away from the retraction pin.

9. The apparatus set forth in claim 7 wherein said DC motor is located at a rear end portion of said single sidewall and overhangs slightly into the interior space available for said module, and wherein the frame of said module defines a recess in a rear end portion of sidewall oppositely facing said single sidewall of said base unit for accommodating the overhang of said DC motor.

10. The apparatus set forth in claim 1 wherein said track location head positioning information includes information generated by an optical position encoder having a moving scale attached to said actuator structure for generating plural optical phase information to said base unit microprocessor, and said base unit microprocessor is programmed to process said plural optical phase information to carry out track seeking and track following.

11. The apparatus set forth in claim 10 wherein said servo information recorded on the data surface comprises a single sector containing thermal drift compensation information.

12. The apparatus set forth in claim 1 comprising two base units directly connected by said cable to said controller unit and wherein said controller microprocessor is programmed to supervise the base unit microprocessors of said base units via said serial command and data path means.

13. The apparatus set forth in claim 1 wherein said module comprises a generally rectangular box shaped housing having a front wall, a rear wall, two opposite sidewalls, a top cover and a bottom cover; the module further comprising sidewall shock mounts including visco-elastic copolymer pads for mounting the head and disk assembly to the opposite sidewalls of the housing.

14. The apparatus set forth in claim 13 wherein said module further comprises a plurality of shock mount pads compressibly sandwiched between each of the top cover and the head and disk assembly, and the bottom cover and the head and disk assembly.

15. The apparatus set forth in claim 1 wherein said head and disk assembly includes a plurality of disks, at least one of which is a data storage disk and an aerodynamically powered release latch mechanism including an airvane movably mounted to a base of the assembly and moveable in an airflow region between two of the disks; including a spring for biasing the airvane against the direction of airflow; and, further including a latch for releasably engaging the transducer actuator structure of said assembly at a head parking position in the absence of sufficient airflow generated by disk rotation to overcome the bias force of the spring.

16. The apparatus set forth in claim 15 comprising switching circuitry for switching kinetic electrical energy generated by a spindle motor due to rotation of said disks to move said actuator to said head parking position in the event that power is removed from said module.

17. The apparatus set forth in claim 1 wherein said module includes user operable module switch means for selecting said module as a boot device for said host computing system, thereby enabling download from said module of a disk based operating system to said host computing system whenever the host computing system is reset, and wherein said base unit includes switch sense means for sensing the position of the module switch means and wherein its said base unit microprocessor means is programmed to report the sensed position of the module switch means to the controller microprocessor via the serial command and data path means.

18. The apparatus set forth in claim 1 wherein said module includes user operable module switch means for indicating the user's desire to prevent data writing operations to occur at the module, and wherein said base unit includes switch sense means for sensing the position of the module switch means and wherein its said base unit microprocessor means is programmed to report the sensed position of the module switch means to the controller microprocessor via the serial command and data path means.

19. The apparatus set forth in claim 1 wherein said serial command and data path means between said base unit microprocessor means and said controller microprocessor means via said cable comprises a controller to base unit serial data transmit line, a base unit to controller serial data transmit line, a controller to base unit acknowledge line, a base unit to controller acknowledge line and an attention line and wherein command and status data bytes are passed over said transmit lines as coordinated by signals presented on said acknowledge lines.

20. The apparatus set forth in claim 1 wherein said base unit microprocessor means is programmed to operate in a command mode in order to receive and act upon command bytes received from said controller microprocessor means and is programmed to operate in an input/output mode in which it commands the actuator to follow a data track during data transfers to and from the storage surface.

21. The apparatus set forth in claim 20 wherein said base unit microprocessor means is programmed to respond while in input/output mode to a signal sent by the controller microprocessor via the serial command and data path means by advancing the assembly to the next track location by commanding one of a head select in the event that there are multiple data transducer heads in the module and a one track seek operation without leaving the input/output mode of operation.

* * * * *